United States Patent
Ueki et al.

(10) Patent No.: US 9,210,412 B2
(45) Date of Patent: Dec. 8, 2015

(54) ACTIVE SHUTTER GLASSES AND A STEREOSCOPIC IMAGE PROJECTION SYSTEM WHEREIN VIEWING ANGLES OF A SHUTTER SECTION FOR THE LEFT AND RIGHT EYES ARE WIDER ON RIGHT AND LEFT SIDES THAN ON UPPER AND LOWER SIDES

(75) Inventors: Shun Ueki, Osaka (JP); Takahiro Nakahara, Osaka (JP); Kozo Nakamura, Osaka (JP); Akira Sakai, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 484 days.

(21) Appl. No.: 13/640,093
(22) PCT Filed: Mar. 18, 2011
(86) PCT No.: PCT/JP2011/056593
§ 371 (c)(1),
(2), (4) Date: Nov. 20, 2012
(87) PCT Pub. No.: WO2011/125462
PCT Pub. Date: Oct. 13, 2011

(65) Prior Publication Data
US 2013/0063670 A1    Mar. 14, 2013

(30) Foreign Application Priority Data
Apr. 9, 2010   (JP) ................... 2010-090703

(51) Int. Cl.
*G02F 1/1335* (2006.01)
*H04N 13/04* (2006.01)
*G02B 27/26* (2006.01)

(52) U.S. Cl.
CPC ............ *H04N 13/0438* (2013.01); *G02B 27/26* (2013.01); *G02F 2001/133531* (2013.01); *G02F 2413/08* (2013.01); *H04N 2213/008* (2013.01)

(58) Field of Classification Search
CPC .................. G02B 27/26; G02F 2001/133531; G02F 2413/08; H04N 13/0438
USPC .......................................... 349/15
See application file for complete search history.

(56) References Cited

U.S. PATENT DOCUMENTS 5,515,186 A     5/1996 Fergason et al.
5,572,343 A *  11/1996 Okamura et al. ............... 349/74

(Continued)

FOREIGN PATENT DOCUMENTS

JP      61-227498       10/1986
JP      10-232365       9/1998

(Continued)

OTHER PUBLICATIONS

International Search Report for PCT/JP2011/054923, mailed Apr. 19, 2011.

(Continued)

*Primary Examiner* — Paul Lee
(74) *Attorney, Agent, or Firm* — Nixon & Vanderhye, P.C.

(57) ABSTRACT

The present invention provides active shutter glasses and a stereoscopic image projection system that allow a stereoscopic image of excellent display quality to be viewed. The present invention provides active shutter glasses for a stereoscopic image projection system in which the active shutter glasses include a shutter section for the right eye and a shutter section for the left eye, the shutter section for the right eye and the shutter section for the left eye each include a liquid crystal cell, and when the glasses are worn, viewing angles of the shutter section for the right eye and the shutter section for the left eye each are wider on the right and left sides than on the upper and lower sides.

26 Claims, 21 Drawing Sheets

(56) References Cited

U.S. PATENT DOCUMENTS

| | | | |
|---|---|---|---|
| 2001/0038491 A1* | 11/2001 | Fergason | 359/466 |
| 2002/0105483 A1* | 8/2002 | Yamazaki et al. | 345/7 |
| 2004/0012851 A1 | 1/2004 | Sato et al. | |
| 2005/0083573 A1 | 4/2005 | Itoh et al. | |
| 2005/0264904 A1 | 12/2005 | Sato et al. | |
| 2010/0302634 A1 | 12/2010 | Jung | |
| 2011/0317082 A1 | 12/2011 | Saitoh et al. | |
| 2013/0083261 A1 | 4/2013 | Nakahara et al. | |

FOREIGN PATENT DOCUMENTS

| | | |
|---|---|---|
| JP | 10-243420 | 9/1998 |
| JP | 11-98537 | 4/1999 |
| JP | 2001-330731 | 11/2001 |
| JP | 2003-75773 | 3/2003 |
| JP | 2008-083115 | 4/2008 |
| WO | WO 2010/037940 | 3/2009 |
| WO | WO 2010/098341 | 9/2010 |

OTHER PUBLICATIONS

International Search Report for PCT/JP2011/056593, mailed Jun. 21, 2011.

Written Opinion for PCT/JP2011/056593, mailed Jun. 21, 2011.

Journal of the Institute of Television Engineers of Japan, 1989, vol. 43, No. 8, pp. 755-762.

Office Action mailed Aug. 18, 2014 in U.S. Appl. No. 13/640,124.

Notice of Allowance mailed Dec. 5, 2014 in U.S. Appl. No. 13/640,124.

* cited by examiner

ACTIVE SHUTTER GLASSES AND A STEREOSCOPIC IMAGE PROJECTION SYSTEM WHEREIN VIEWING ANGLES OF A SHUTTER SECTION FOR THE LEFT AND RIGHT EYES ARE WIDER ON RIGHT AND LEFT SIDES THAN ON UPPER AND LOWER SIDES

This application is the U.S. national phase of International Application No. PCT/JP2011/056593 filed 18 Mar. 2011 which designated the U.S. and claims priority to JP Patent Application No. 2010-090703 filed 9 Apr. 2010, the entire contents of each of which are hereby incorporated by reference.

TECHNICAL FIELD

The present invention relates to active shutter glasses and a stereoscopic image projection system, and more particularly, to active shutter glasses suitable for use in a stereoscopic image projection system including a video display device having a landscape oriented screen and a stereoscopic image projection system.

BACKGROUND ART

An anaglyph scheme, passive scheme, active scheme or the like are known as a stereoscopic image projection system using glasses. The anaglyph scheme has extremely low display quality and is prone to so-called crosstalk. Both the passive scheme and the active scheme use polarized glasses.

The passive scheme allows lightweight polarized glasses to be manufactured at low cost, but requires different pixels to be used to generate an image for the left eye and an image for the right eye. Therefore, a stereoscopic image display requires spatial resolution two times as high as that of a normal two-dimensional image display, and the stereoscopic image generally has lower resolution. Furthermore, its display quality is also lower than that of the active scheme. Moreover, the passive scheme requires a polarizer such as λ/2 plate to be patterned in each pixel, resulting in a cost increase of the video display device.

The active scheme has excellent display performance and when, for example, spatial resolution of a video display device for a stereoscopic image projection system (hereinafter also referred to as "3D display device") is full HD (1920× 1080), stereoscopic display is possible with full HD resolution as is. Furthermore, the principal performance required for an active scheme 3D display device is a high frame rate and high image processing capacity and current high-end video display devices can also satisfy these requirements. That is, the high-end video display device can be developed as a 3D display device even in a stage prior to popularization of 3D contents without the necessity for introducing a special member into the video display device itself.

Hereinafter, polarized glasses used for the active scheme will also be referred to as "active shutter glasses."

As a stereoscopic image projection system based on the active scheme, for example, a technology using active shutter glasses having a pair of polarizers and a liquid crystal interposed between the pair of polarizers is disclosed (e.g., see Patent Literature 1).

CITATION LIST

Patent Literature

Patent Literature 1: JP61-227498A

Non Patent Literature

Non Patent Literature 1: Hatada, Saita, "Depth Factor Perception and Mechanism," Institute of Television Engineers magazine, 1989, Vol. 43, No. 8, p. 755-762

SUMMARY OF INVENTION

Technical Problem

However, especially when a landscape oriented 3D display device is used, display quality of a conventional stereoscopic image projection system based on an active scheme may degrade in right and left regions of a screen in particular. To be more specific, light leakage, deterioration of a contrast ratio (CR), chromatic change, crosstalk or the like may occur.

The present invention has been implemented in view of the above-described circumstances and it is an object of the present invention to provide active shutter glasses and a stereoscopic image projection system capable of viewing stereoscopic images of excellent display quality.

Solution to Problem

After studying various kinds of active shutter glasses capable of viewing stereoscopic images of excellent display quality, the present inventor et al. focused attention on a viewing angle characteristic of active shutter glasses having a liquid crystal cell. The present inventor et al. came up with the present invention by taking notice of the fact that it is possible to excellently solve the above-described problems by adopting (1) a mode in which viewing angles of right and left shutter sections are wider on right and left sides than on upper and lower sides, (2) a mode in which viewing angles of the right and left shutter sections are wider on a side opposite to a connecting part of the right and left shutter sections than on the connecting part side, (3) a mode in which viewing angle characteristics of the right and left shutter sections are substantially symmetric, or a mode combining these modes as appropriate.

That is, the present invention provides active shutter glasses for a stereoscopic image projection system, the active shutter glasses having a shutter section for the right eye and a shutter section for the left eye, and the shutter section for the right eye and the shutter section for the left eye each having a liquid crystal cell, wherein when the glasses are worn, viewing angles of the shutter section for the right eye and the shutter section for the left eye each are wider on right and left sides than on upper and lower sides (hereinafter also referred to as "first glasses of the present invention").

The configuration of the first glasses of the present invention is not especially limited by other components as long as it essentially includes such components.

Preferred embodiments of the first glasses of the present invention will be described in detail below.

Viewing angle characteristics of the shutter section for the right eye and the shutter section for the left eye each are preferably substantially symmetric with respect to an axis along a 90° azimuth and 270° azimuth. This allows the display quality at both right and left ends of the screen in particular to be equally improved. As a result, higher display quality can be realized in the entire region of the screen.

When the glasses are worn, the viewing angles of the shutter section for the right eye and the shutter section for the left eye each are preferably wider on the lower side than the upper side. It is thereby possible to set the viewing angles of the shutter section for the right eye and the shutter section for the left eye so as to match a human effective field of view and thereby realize higher display quality.

When the glasses are worn, the viewing angles of the shutter section for the right eye and the shutter section for the left eye each are preferably wider at the 270° azimuth than at the 90° azimuth. It is thereby possible to more reliably set the viewing angles of the shutter sections for the right and left eyes so as to match the human effective field of view and thereby more reliably realize higher display quality.

For the shutter section for the right eye and the shutter section for the left eye, it is preferable to adopt a mode (hereinafter referred to as "first mode") in which each shutter section is provided with a λ/4 plate and the λ/4 plate is provided outside the liquid crystal cell. It is thereby possible to solve the problem that is likely to occur when a liquid crystal display device is used as a 3D display device. The first mode is particularly suitable for a stereoscopic image projection system using a liquid crystal display device as the 3D display device.

When light leakage of the shutter section for the right eye and the shutter section for the left eye in a light-shielded state is measured at a predetermined polar angle (hereinafter also referred to as "at the time of a first measurement"), the amount of light leakage at a 0° azimuth and a 180° azimuth is preferably smaller than an average amount of light leakage at four or more azimuths. However, the above four or more azimuths are arranged uniformly among all azimuths. It is thereby possible to view clear stereoscopic images with less double image on the entire screen.

At the time of a first measurement, the amount of light leakage at the 270° azimuth is preferably smaller than the amount of light leakage at the 90° azimuth. It is thereby possible to set the viewing angles of the shutter sections for the right and left eyes so as to match the human effective field of view and thereby realize higher display quality.

When light leakage of the shutter section for the right eye and the shutter section for the left eye in a light-shielded state is measured at eight or more azimuths and at a predetermined polar angle (hereinafter also referred to as "at the time of a second measurement"), an average amount of light leakage at a −45° to 45° azimuth and/or 135° to 225° azimuth is preferably smaller than an average amount of light leakage at a 45° to 135° azimuth and 225° to 315° azimuth. However, the above-described eight or more azimuths are arranged uniformly among all azimuths. Thus, it is possible to view a clear stereoscopic image with less double image on the entire screen.

At the time of a second measurement, the average amount of light leakage at the 225° to 315° azimuth is preferably smaller than the average amount of light leakage at the 45° to 135° azimuth. It is thereby possible to set the viewing angles of the shutter sections for the right and left eyes so as to match the human effective field of view and thereby realize higher display quality.

When a contrast ratio of the shutter section for the right eye and the shutter section for the left eye is measured at a predetermined polar angle (hereinafter also referred to as "at the time of a third measurement"), the contrast ratio at the 0° azimuth and 180° azimuth is preferably higher than the average of contrast ratios at four or more azimuths. However, the four or more azimuths are arranged uniformly among all azimuths. It is thereby possible to view clear stereoscopic images with less double image on the entire screen.

At the time of a third measurement, the contrast ratio at the 270° azimuth is preferably higher than the contrast ratio at the 90° azimuth. Thus, it is possible to set the viewing angles of the shutter sections for the right and left eyes so as to match the human effective field of view and realize higher display quality.

When the contrast ratio of the shutter section for the right eye and the shutter section for the left eye is measured at eight or more azimuths and at a predetermined polar angle (hereinafter also referred to as "at the time of a fourth measurement"), the average of contrast ratios at the −45° to 45° azimuth and/or 135° to 225° azimuth is preferably higher than the average of contrast ratios at the 45° to 135° azimuth and 225° to 315° azimuth. However, the eight or more azimuths are arranged uniformly among all azimuths. It is thereby possible to view clear stereoscopic images with less double image on the entire screen.

At the time of a fourth measurement, the average of contrast ratios at the 225° to 315° azimuth is preferably higher than the average of contrast ratios at the 45° to 135° azimuth. It is thereby possible to set the viewing angles of the shutter sections for the right and left eyes so as to match the human effective field of view and thereby realize higher display quality.

The liquid crystal cell is a TN or STN type and when no voltage is applied, liquid crystal molecules located at a center in a thickness direction of the liquid crystal cell are preferably aligned in a direction along the 90° azimuth and 270° azimuth. It is thereby possible to view clear stereoscopic images with less double image on the entire screen.

When a chromatic change is measured, with the shutter section for the right eye and the shutter section for the left eye being driven at a predetermined polar angle (hereinafter also referred to as "at the time of a fifth measurement"), a chromatic change at the 0° azimuth and 180° azimuth is preferably smaller than an average of chromatic changes at four or more azimuths. However, the four or more azimuths are arranged uniformly among all azimuths. It is thereby possible to view clear stereoscopic images with less chromatic change on the entire screen.

At the time of a fifth measurement, a chromatic change at the 270° azimuth is preferably smaller than a chromatic change at the 90° azimuth. It is thereby possible to set the viewing angles of the shutter sections for the right and left eyes so as to match the human effective field of view and thereby realize higher display quality.

When a chromatic change is measured, with the shutter section for the right eye and the shutter section for the left eye being driven at eight or more azimuths and at a predetermined polar angle (hereinafter also referred to as "at the time of a sixth measurement"), the average of chromatic changes at the −45° to 45° azimuth and/or 135° to 225° azimuth is preferably smaller than the average of chromatic changes at the 45° to 135° azimuth and 225° to 315° azimuth. However, the eight or more azimuths are arranged uniformly among all azimuths. It is thereby possible to view clear stereoscopic images with less chromatic change on the entire screen.

At the time of a sixth measurement, the average of chromatic changes at the 225° to 315° azimuth is preferably smaller than the average of chromatic changes at the 45° to 135° azimuth. It is thereby possible to set the viewing angles of the shutter sections for the right and left eyes so as to match the human effective field of view and thereby realize higher display quality.

The present invention also provides a stereoscopic image projection system (hereinafter also referred to as "first system of the present invention") configured by including the first glasses of the present invention and a video display device.

The configuration of the first system of the present invention is not especially limited by other components as long as it essentially includes such components.

In the first system of the present invention, the video display device is preferably a liquid crystal display device and is preferably provided with a liquid crystal cell and a λ/4 plate provided outside (front side) the liquid crystal cell (liquid crystal cell of the video display device). It is thereby possible to solve the problem that is likely to occur when a liquid crystal display device is used as a 3D display device. This mode is particularly suitable when the first glasses of the present invention employ the above-described first mode.

The present invention also provides active shutter glasses for a stereoscopic image projection system (hereinafter also referred to as "second glasses of the present invention"), the active shutter glasses including a shutter section for the right eye and a shutter section for the left eye, and the shutter section for the right eye and the shutter section for the left eye each including a liquid crystal cell, wherein viewing angles of the shutter section for the right eye and the shutter section for the left eye each are wider on a side opposite to a connecting part of the shutter section for the right eye and the shutter section for the left eye than on the connecting part side.

The configuration of the second glasses of the present invention is not especially limited by other components as long as it essentially includes such components.

A preferred embodiment of the second glasses of the present invention will be described in detail below.

For the shutter section for the right eye and the shutter section for the left eye, it is preferable to adopt a mode (hereinafter also referred to as "second mode") in which each shutter section is provided with a λ/4 plate and the λ/4 plate is provided outside the liquid crystal cell. It is thereby possible to solve the problem that is likely to occur when a liquid crystal display device is used as a 3D display device. The second mode is particularly suitable for a stereoscopic image projection system using a liquid crystal display device as the 3D display device.

When light leakage of the shutter section for the right eye and the shutter section for the left eye in a light-shielded state is measured at four or more azimuths and at a predetermined polar angle, an average amount of light leakage of the shutter section for the right eye at a −90° to 90° azimuth is preferably smaller than an average amount of light leakage of the shutter section for the right eye at a 90° to 270° azimuth and an average amount of light leakage of the shutter section for the left eye at the 90° to 270° azimuth is preferably smaller than an average amount of light leakage of the shutter section for the left eye at the −90° to 90° azimuth. However, the four or more azimuths are arranged uniformly among all azimuths.

When light leakage of the shutter section for the right eye and the shutter section for the left eye in a light-shielded state is measured at eight or more azimuths and at a predetermined polar angle, an average amount of light leakage of the shutter section for the right eye at a −45° to 45° azimuth is preferably smaller than an average amount of light leakage of the shutter section for the right eye at a 45° to 135° azimuth and 225° to 315° azimuth, and an average amount of light leakage of the shutter section for the left eye at a 135° to 225° azimuth is preferably smaller than an average amount of light leakage of the shutter section for the left eye at the 45° to 135° azimuth and 225° to 315° azimuth. However, the eight or more azimuths are arranged uniformly among all azimuths.

It is thereby possible to view clear stereoscopic images with less double image on the entire screen.

When a contrast ratio of the shutter section for the right eye and the shutter section for the left eye is measured at four or more azimuths and at a predetermined polar angle, an average of contrast ratios of the shutter section for the right eye at the −90° to 90° azimuth is preferably higher than an average of contrast ratios of the shutter section for the right eye at the 90° to 270° azimuth, and an average of contrast ratios of the shutter section for the left eye at the 90° to 270° azimuth is preferably higher than an average of contrast ratios of the shutter section for the left eye at the −90° to 90° azimuth. However, the four or more azimuths are arranged uniformly among all azimuths.

When a contrast ratio of the shutter section for the right eye and the shutter section for the left eye is measured at eight or more azimuths and at a predetermined polar angle, an average of contrast ratios of the shutter section for the right eye at the −45° to 45° azimuth is preferably higher than the average of contrast ratios of the shutter section for the right eye at the 45° to 135° azimuth and 225° to 315° azimuth, and an average of contrast ratios of the shutter section for the left eye at the 135° to 225° azimuth is preferably higher than an average of contrast ratios of the shutter section for the left eye at the 45° to 135° azimuth and 225° to 315° azimuth. However, the eight or more azimuths are arranged uniformly among all azimuths.

It is thereby possible to view clear stereoscopic images with less double image on the entire screen.

When a chromatic change is measured, with the shutter section for the right eye and the shutter section for the left eye being driven at four or more azimuths and at a predetermined polar angle, an average of chromatic changes of the shutter section for the right eye at the −90° to 90° azimuth is preferably smaller than an average of chromatic changes of the shutter section for the right eye at the 90° to 270° azimuth, and an average of chromatic changes of the shutter section for the left eye at the 90° to 270° azimuth is preferably smaller than an average of chromatic changes of the shutter section for the left eye at the −90° to 90° azimuth. However, the four or more azimuths are arranged uniformly among all azimuths.

When a chromatic change is measured, with the shutter section for the right eye and the shutter section for the left eye being driven at eight or more azimuths and at a predetermined polar angle, an average of chromatic changes of the shutter section for the right eye at the −45° to 45° azimuth is preferably smaller than an average of chromatic changes of the shutter section for the right eye at the 45° to 135° azimuth and 225° to 315° azimuth, and an average of chromatic changes of the shutter section for the left eye at the 135° to 225° azimuth is preferably smaller than an average of chromatic changes of the shutter section for the left eye at the 45° to 135° azimuth and 225° to 315° azimuth. However, the eight or more azimuths are arranged uniformly among all azimuths.

It is thereby possible to view clear stereoscopic images with less chromatic change on the entire screen.

The present invention also provides a stereoscopic image projection system configured by including the second glasses of the present invention and a video display device (hereinafter also referred to as "second system of the present invention").

The configuration of the second system of the present invention is not especially limited by other components as long as it essentially includes such components.

In the second system of the present invention, the video display device is preferably a liquid crystal display device and is preferably provided with a liquid crystal cell and a λ/4 plate provided outside (front side) the liquid crystal cell (liquid crystal cell of the video display device). It is thereby possible to solve the problem that is likely to occur when a liquid crystal display device is used as the 3D display device. This mode is particularly suitable when the second glasses of the present invention employ the above-described second mode.

The present invention also provides active shutter glasses for a stereoscopic image projection system, the active shutter glasses including a shutter section for the right eye and a shutter section for the left eye, and the shutter section for the right eye and the shutter section for the left eye each including a liquid crystal cell, wherein a viewing angle characteristic of the shutter section for the right eye is substantially symmetric to a viewing angle characteristic of the shutter section for the left eye (hereinafter also referred to as "third glasses of the present invention").

The configuration of the third glasses of the present invention is not especially limited by other components as long as it essentially includes such components.

A preferred mode of the'third glasses of the present invention will be described in detail below.

It is preferable to adopt a mode (hereinafter also referred to as "third mode") in which the shutter section for the right eye and the shutter section for the left eye each include a λ/4 plate and the λ/4 plate is provided outside the liquid crystal cell. It is thereby possible to solve the problem that is likely to occur when a liquid crystal display device is used as the 3D display device. The third mode is particularly suitable for a stereoscopic image projection system using a liquid crystal display device as the 3D display device.

The shutter section for the right eye and the shutter section for the left eye preferably have configurations substantially symmetric to each other.

A liquid crystal alignment in the liquid crystal cell of the shutter section for the right eye is preferably substantially symmetric to a liquid crystal alignment in the liquid crystal cell of the shutter section for the left eye.

The present invention also provides a stereoscopic image projection system configured by including the third glasses of the present invention and a video display device (hereinafter also referred to as "third system of the present invention").

The configuration of the third system of the present invention is not especially limited by other components as long as it essentially includes such components.

In the third system of the present invention, the video display device is preferably a liquid crystal display device and is preferably provided with a liquid crystal cell and a λ/4 plate provided outside (front side) the liquid crystal cell (liquid crystal cell of the video display device). It is thereby possible to solve the problem that is likely to occur when a liquid crystal display device is used as the 3D display device. This mode is particularly suitable when the third glasses of the present invention employ the above-described third mode.

Advantageous Effects of Invention

According to the active shutter glasses and stereoscopic image projection system of the present invention, it is possible to view stereoscopic images of excellent display quality.

DESCRIPTION OF EMBODIMENTS

Figure 1:
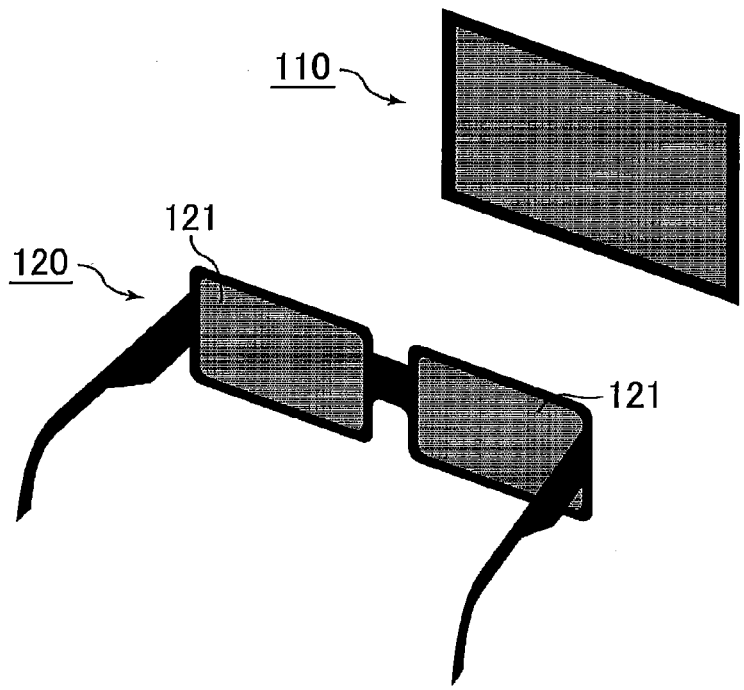
FIG. 1 is a schematic perspective view illustrating a configuration of a stereoscopic image projection system according to Embodiment 1.

In the present description, regarding "inside" and "outside" of glasses, the observer (user) side of the glasses worn by the observer is defined as "inside" and the opposite side thereof is defined as "outside."

On the other hand, regarding "front" and "back" of a video display device, the observer side is defined as "front" and the opposite side thereof is defined as "back."

In the present description, regarding azimuths of the glasses, the right direction (3 o'clock direction) seen from the observer when the observer is wearing the glasses is assumed to be a 0° azimuth and the counterclockwise direction is assumed to be positive. Regarding azimuths of a display device, the right direction (3 o'clock direction) when its screen is viewed from the front is assumed to be a 0° azimuth and the counterclockwise direction is assumed to be positive. Furthermore, regarding azimuths of both the glasses and display device, the direction along the 0° azimuth and 180° azimuth is also referred to as a "lateral direction" and the direction along the 90° azimuth and 270° azimuth is also referred to as a "longitudinal direction."

A linear polarizer has a function of converting natural light to linearly polarized light, and unless otherwise noted, the "linear polarizer" herein includes only an element having a polarizing function but does not include a protective film.

In the present description, a λ/4 plate is a layer including retardation of approximately ¼ wavelength with respect to at least light having a wavelength of 550 nm. The retardation of the λ/4 plate is exactly 137.5 nm for light having a wavelength of 550 nm, but the retardation can be 100 nm or above and 180 nm or below, preferably 120 nm or above and 160 nm or below, and more preferably 130 nm or above and 145 nm or below.

An in-plane phase difference R is an in-plane phase difference (unit: nm) defined as $R=|nx-ny| \times d$ when principal refractive indexes of a birefringent layer (including liquid crystal cell, λ/4 plate and λ/2 plate) in the in-plane direction are defined as nx and ny, a principal refractive index in the out-of-plane direction (thickness direction) is defined as nz and the thickness of the birefringent layer is defined as d. By contrast, a thickness direction phase difference Rth is an out-of-plane (thickness direction) phase difference (unit: nm) defined by $Rth=(nz-(nx+ny)/2) \times d$. The measured wavelength of the phase difference in the present description is 550 nm unless specified otherwise.

Here, nx is a refractive index of the birefringent layer in a direction in which its in-plane refractive index reaches a maximum (that is, slow axis direction) and ny is a refractive index in a direction orthogonal to the slow axis (nx) within the plane.

The present invention will be mentioned in more detail referring to the drawings in the following embodiments, but is not limited to these embodiments.

(Embodiment 1)

A stereoscopic image projection system based on an active scheme of the present embodiment is configured by including a video display device (3D display device) 110 and active shutter glasses 120 as shown in FIG. 1.

Figure 2:
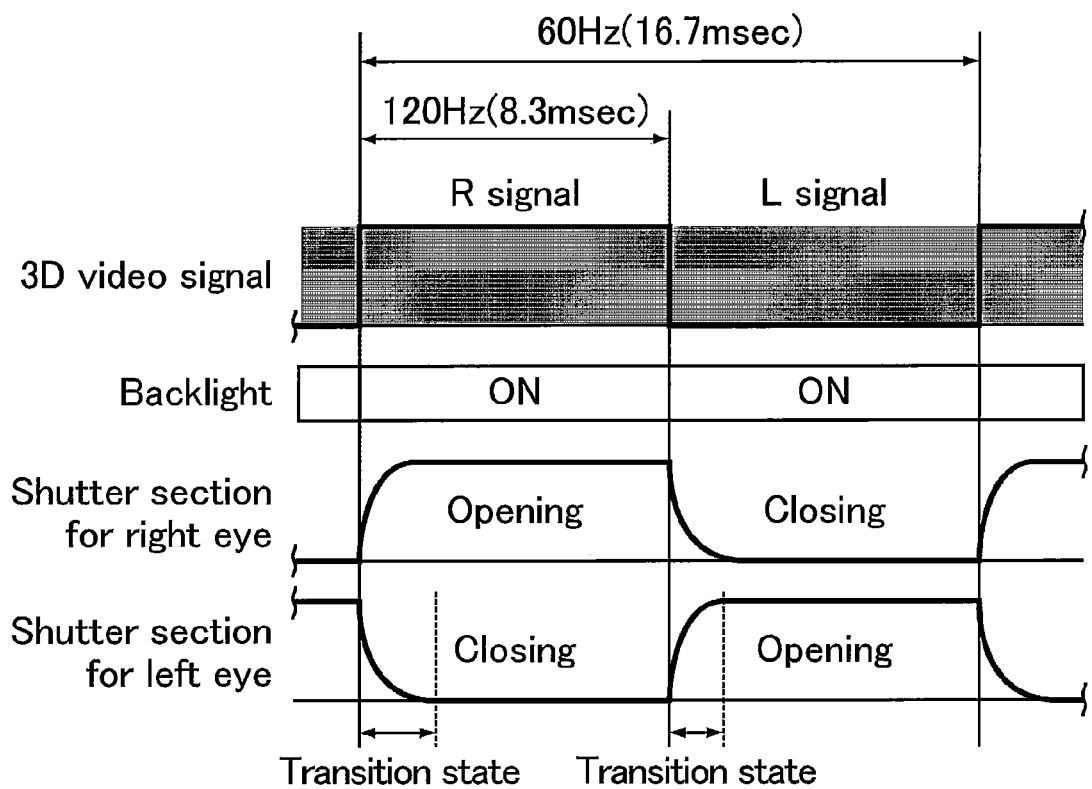
FIG. 2 is a diagram illustrating an operation principle of the stereoscopic image projection system of Embodiment 1.

The display device 110 is alternately supplied with a video signal for the right eye (R signal) and a video signal for the left eye (L signal) as shown in FIG. 2, and an image for the right eye and an image for the left eye with parallax are alternately displayed on a screen of the display device 110 on a time-division basis.

The display device 110 is not particularly limited and examples thereof include a liquid crystal display device, plasma display, organic or inorganic EL display, CRT display or a device combining a projector and screen. When a liquid crystal display device is used as the display device 110, a backlight may be always lit as shown in FIG. 2.

The glasses 120 include a shutter section for the right eye and a shutter section for the left eye (hereinafter also referred to as "right and left shutter sections") 121. Light transmission and light-shielding (opening/closing) of the right and left shutter sections 121 are alternately switched. As shown in FIG. 2, the switching timing is in synchronization with the R signal and L signal. Thus, the image for the right eye is projected into the right eye of the observer and the image for the left eye is projected into the left eye and the observer can thereby recognize a stereoscopic image.

Figure 3:
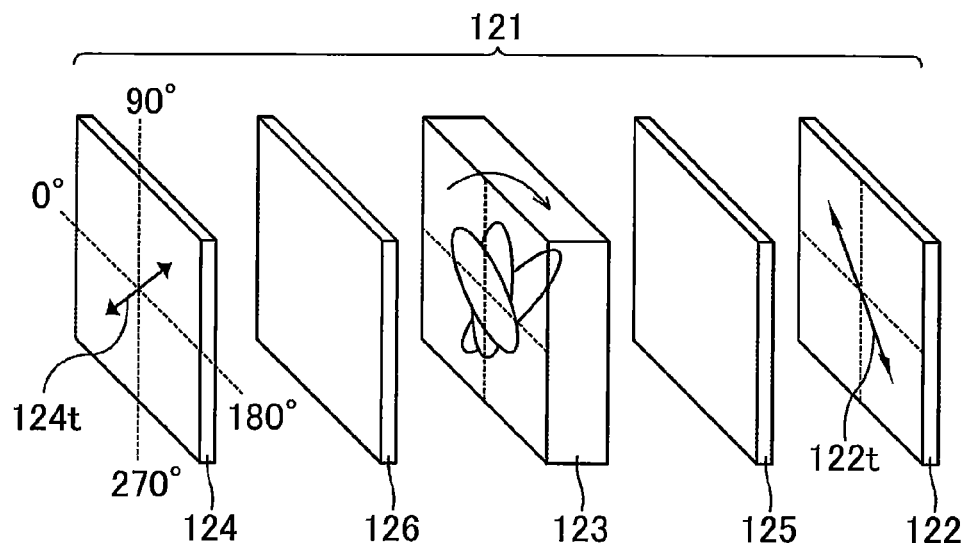
FIG. 3 is a schematic perspective view illustrating a configuration of active shutter glasses of Embodiment 1.

Furthermore, the right and left shutter sections 121 are each provided with a linear polarizer (inside polarizer) 122, a viewing angle compensation film 125, a liquid crystal cell 123, a viewing angle compensation film 126 and a linear polarizer (outside polarizer) 124 in the stated order from the inside as shown in FIG. 3.

The polarizers 122 and 124 may be disposed in a parallel Nicol state but are normally disposed in a cross-Nicol state. To be more specific, the angle formed between a transmission axis 122t of the inside polarizer 122 and a transmission axis 124t of the outside polarizer 124 is set to be within a range of 90°±15° (preferably 90°±5°). The transmission axis 122t of the inside polarizer 122 is set to be within a range of ±15° (preferably ±5°) from the direction along the 45° azimuth and 225° azimuth and the transmission axis 124t of the outside polarizer 124 is set to be within a range of ±15° (preferably ±=5°) from the direction along the 135° azimuth and 315° azimuth. These numerical value ranges include boundary values.

The viewing angle compensation films 125 and 126 have a function of compensating a viewing angle during light-shielding of the right and left shutter sections 121, and include, for example, a negative C plate. The optical indicatrix of the negative C plate is disk-shaped and the negative C plate satisfies a relationship of nx≈ny>nz.

The liquid crystal mode of the liquid crystal cell 123 is a twisted nematic (TN) mode and the liquid crystal cell 123 is provided with two transparent substrates, a liquid crystal layer interposed between the two substrates and two transparent electrodes formed in the two substrates respectively. The liquid crystal layer contains nematic liquid crystal molecules whose dielectric anisotropy is positive. The liquid crystal molecules are aligned in an aligning treatment direction (e.g., rubbing direction) on the substrate surface and aligned so as to be twisted by approximately 90° in a thickness direction of the liquid crystal layer. Furthermore, when viewed from the outside, the liquid crystal molecules are twisted clockwise (along the light traveling direction). That is, the liquid crystal molecules located at the center in the thickness direction of the liquid crystal cell 123 (hereinafter also referred to as "central molecules") are aligned in a longitudinal direction (direction along the 90° azimuth and 270° azimuth). Furthermore, the aligning treatment direction of the outside substrate is substantially orthogonal to the transmission axis 124t of the outside polarizer 124, the aligning treatment direction of the inside substrate is substantially orthogonal to the transmission axis 122t of the inside polarizer 122. To be more specific, the angle formed between the aligning treatment direction of the outside substrate and the transmission axis 124t of the outside polarizer 124 is set to be within a range of 90°±15° (preferably 90°±5°) and the angle formed between the aligning treatment direction of the inside substrate and the transmission axis 122t of the inside polarizer 122 is set to be within a range of 90°±15° (preferably 90°±5°). These numerical value ranges include boundary values.

The liquid crystal cell 123 is not particularly limited as long as it can secure a degree of response time that allows synchronization with the frame rate of the display device 110. The liquid crystal mode of the liquid crystal cell 123 may be not only a TN mode but also super twisted nematic (STN) mode, optically compensated birefringence (OCB) mode, vertical alignment (VA) mode, in-plane switching mode (IPS), ferroelectric liquid crystal (FLC) or the like.

Figure 4:
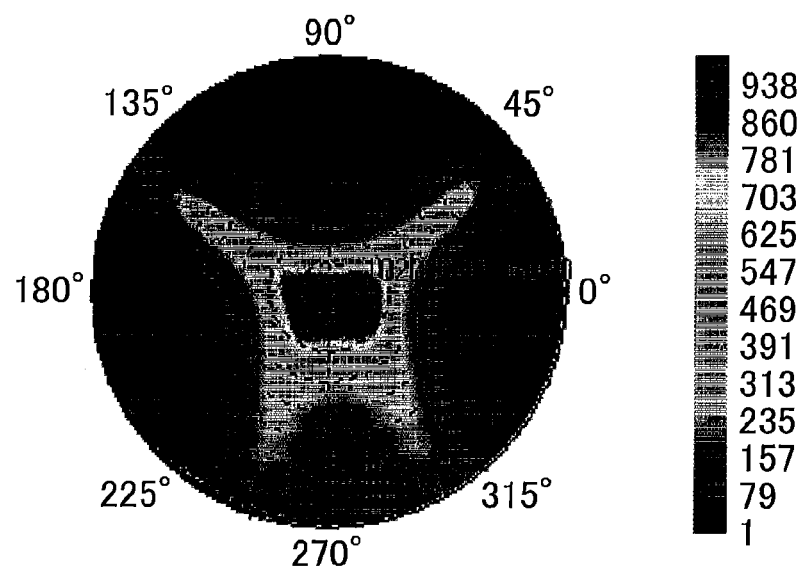
FIG. 4 is a diagram illustrating a viewing angle characteristic (CR ratio) of the active shutter glasses of Embodiment 1.

Active shutter glasses using liquid crystal generally have a viewing angle characteristic which is asymmetric in vertical and horizontal directions caused by asymmetry of liquid crystal alignment. The right and left shutter sections 121 of the present embodiment also have a viewing angle characteristic (CR characteristic) which is asymmetric in vertical and horizontal directions as shown in FIG. 4, for example. Therefore, according to the present embodiment, when the glasses 120 are worn, viewing angles of the right and left shutter sections 121 each are wider on the right and left sides than on the upper and lower sides. In other words, the left side viewing angle of the shutter section for the right eye is wider than the upper and lower side viewing angles of the shutter section for the right eye, and the right side viewing angle of the shutter section for the right eye is wider than the upper and lower side viewing angles of the shutter section for the right eye. Furthermore, the left side viewing angle of the shutter section for the left eye is wider than the upper and lower side viewing angles of the shutter section for the left eye and the right side viewing angle of the shutter section for the left eye is wider than the upper and lower side viewing angles of the shutter section for the left eye. Especially when the display device 110 is provided with a landscape oriented screen such as a TV or movie theater screen, it is possible to view stereoscopic images of excellent display quality especially in the right and left regions of the screen.

Figure 5:
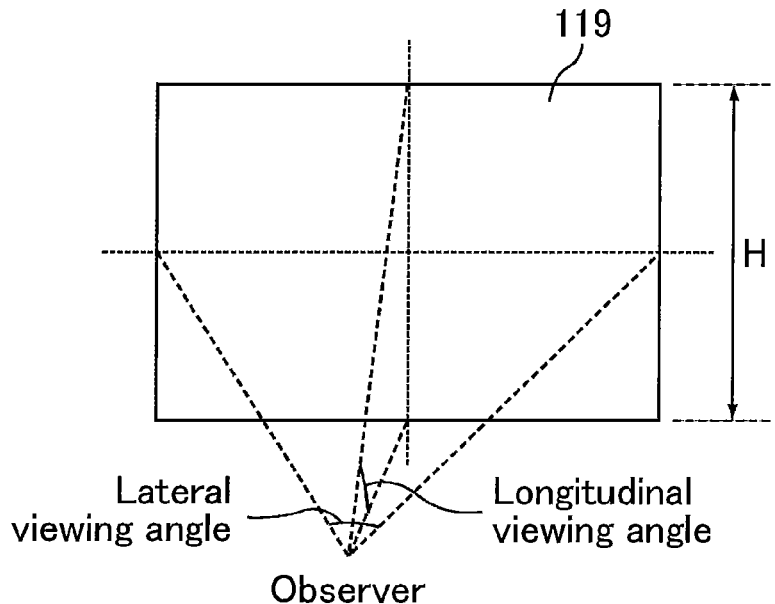
FIG. 5 is a schematic plan view illustrating a configuration of a video display device of Embodiment 1.
Figure 6:
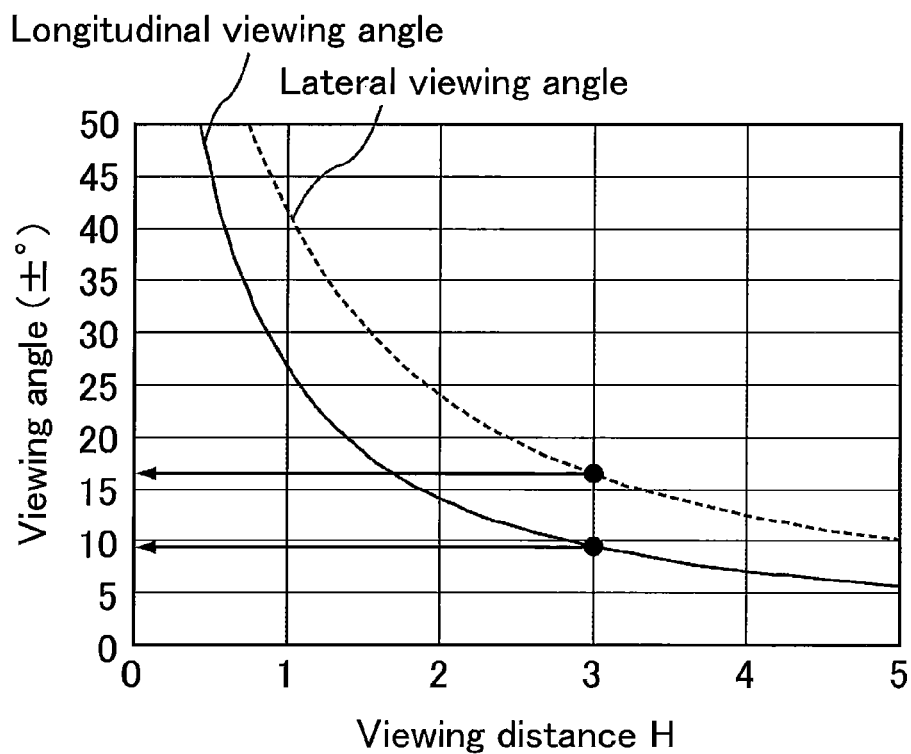
FIG. 6 is a graph illustrating a relationship between a viewing distance and a viewing angle.

As shown, for example, in FIG. 5, when an observer is positioned in the vertical direction in the center of the screen and observes a full HD TV at a viewing distance 3 H (H is a length of a screen 119 in the longitudinal direction), the viewing angle of the observer (a range within which the observer observes) as shown in FIG. 6, is a range of approximately ±17° in the lateral direction and approximately ±10° in the longitudinal direction. In consideration of not only full HD TV but also a movie theater screen or super HD TV, images for the right eye and the left eye are generally displayed on a landscape oriented screen. As described above, the viewing angle of the glasses 120 is preferably wider in the lateral direction than in the longitudinal direction, and a sufficiently high CR ratio is preferably realized within a range of the viewing angle of the observer (the range within which the observer observes). Furthermore, the observer often observes the screen symmetrically in the horizontal direction and the viewing angle characteristic of the glasses 120 is preferably symmetric especially in the lateral direction where a wider viewing angle is required.

Figure 7:
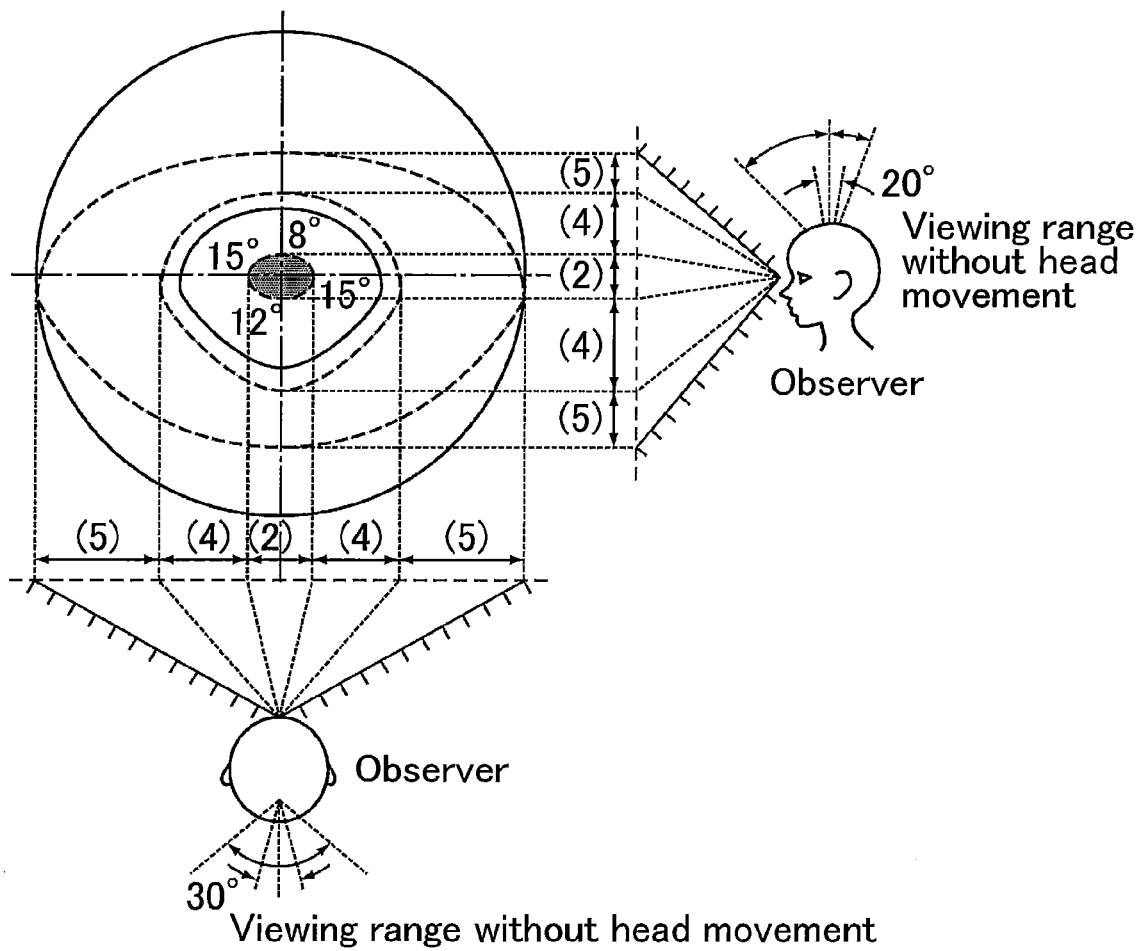
FIG. 7 is a schematic diagram illustrating a human effective field of view.

Furthermore, non-Patent Literature 1 describes that the human effective field of view (range within which information can be instantaneously captured and observed through only eyeball movement) falls within a range of (2) in FIG. 7. To be more specific, the human effective field of view is within 15° on each of the left and right sides, 8° on the upper side, and 12° on the lower side. That is, the field of view is widest in the lateral direction, the next widest in the downward direction and the narrowest in the upward direction. Therefore, the viewing angle characteristic of the glasses 120 is also preferably determined with reference to the width of this range and the region of the glasses 120 where the viewing angle is wide is preferably arranged on the right side and the left side. Furthermore, the region of the glasses 120 where the viewing angle is narrow may be arranged on the upper side.

Furthermore, when light leakage of the shutter section for the right eye in a light-shielded state is measured at a predetermined polar angle, the amount of light leakage at the 0° azimuth and 180° azimuth, that is, the amount of light leakage at the 0° azimuth and the amount of light leakage at the 180° azimuth is preferably smaller than the average amount of light leakage at four or more azimuths, the amount of light leakage at the 90° azimuth and/or 270° azimuth (more preferably, 90° azimuth and 270° azimuth), that is, the amount of light leakage at the 90° azimuth and/or the amount of light leakage at the 270° azimuth (more preferably, amount of light leakage at the 90° azimuth and amount of light leakage at the 270° azimuth) is preferably greater than an average amount of light leakage at four or more azimuths.

On the other hand, when light leakage of the shutter section for the left eye in a light-shielded state is measured at a predetermined polar angle, the amount of light leakage at the 0° azimuth and 180° azimuth, that is, the amount of light leakage at the 0° azimuth and the amount of light leakage at the 180° azimuth is preferably smaller than the average amount of light leakage at four or more azimuths, the amount of light leakage at the 90° azimuth and/or 270° azimuth (more preferably, 90° azimuth and 270° azimuth), that is, the amount of light leakage at the 90° azimuth and/or the amount of light leakage at the 270° azimuth (more preferably, amount of light leakage at the 90° azimuth and amount of light leakage at the 270° azimuth) is preferably greater than an average amount of light leakage at four or more azimuths.

In this way, it is possible to view clear stereoscopic images with less double image on the entire screen.

In these modes, the amount of light leakage at the 270° azimuth is preferably smaller than the amount of light leakage at the 90° azimuth. This makes it possible to set the viewing angles of the right and left shutter sections 121 so as to match the human effective field of view and thereby realize higher display quality.

Furthermore, when light leakage of the shutter section for the right eye in a light-shielded state is measured at eight or more azimuths and at a predetermined polar angle, the average amount of light leakage at the −45° to 45° azimuth and/or 135° to 225° azimuth (more preferably, the −45° to 45° azimuth and 135° to 225° azimuth), that is, the average amount of light leakage at the −45° to 45° azimuth and/or the average amount of light leakage at the 135° to 225° azimuth (more preferably, average amount of light leakage at the −45° to 45° azimuth and average amount of light leakage at the 135° to 225° azimuth) is preferably smaller than the average amount of light leakage at the 45° to 135° azimuth and 225° to 315° azimuth, that is, the average amount of light leakage at the 45° to 135° azimuth and the average amount of light leakage at the 225° to 315° azimuth.

Furthermore, when light leakage of the shutter section for the left eye in a light-shielded state is measured at eight or more azimuths and at a predetermined polar angle, the average amount of light leakage at the −45° to 45° azimuth and/or 135° to 225° azimuth (more preferably, −45° to 45° azimuth and 135° to 225° azimuth), that is, the average amount of light leakage at the −45° to 45° azimuth and/or the average amount of light leakage at the 135° to 225° azimuth (more preferably, average amount of light leakage at the −45° to 45° azimuth and average amount of light leakage at the 135° to 225° azimuth) is preferably smaller than the average amount of light leakage at the 45° to 135° azimuth and 225° to 315° azimuth, that is, the average amount of light leakage at the 45° to 135° azimuth and the average amount of light leakage at the 225° to 315° azimuth.

In this way, it is possible to view clear stereoscopic images with less double image on the entire screen.

In these modes, the average amount of light leakage at the 225° to 315° azimuth is preferably smaller than the average amount of light leakage at the 45° to 135° azimuth. This makes it possible to set the viewing angles of the right and left shutter sections 121 so as to match the human effective field of view and thereby realize higher display quality.

Furthermore, when a CR ratio of the shutter section for the right eye is measured at a predetermined polar angle, the CR ratio at the 0° azimuth and 180° azimuth, that is, the CR ratio at the 0° azimuth and the CR ratio at the 180° azimuth are preferably higher than the average of the CR ratios at four or more azimuths and the CR ratio at the 90° azimuth and/or 270° azimuth (more preferably, 90° azimuth and 270° azimuth), that is, the CR ratio at the 90° azimuth and/or the CR ratio at the 270° azimuth (more preferably CR ratio at the 90° azimuth and the CR ratio at the 270° azimuth) is preferably lower than the average of CR ratios at four or more azimuths.

Furthermore, when a CR ratio of the shutter section for the left eye is measured at a predetermined polar angle, the CR ratio at the 0° azimuth and 180° azimuth, that is, the CR ratio at the 0° azimuth and the CR ratio at the 180° azimuth are preferably higher than the average of the CR ratios at four or more azimuths and the CR ratio at the 90° azimuth and/or 270° azimuth (more preferably, 90° azimuth and 270° azimuth), that is, the CR ratio at the 90° azimuth and/or the CR ratio at the 270° azimuth (more preferably CR ratio at the 90° azimuth and the CR ratio at the 270° azimuth) is preferably lower than the average of CR ratios at four or more azimuths.

In this way, it is possible to view clear stereoscopic images with less double image on the entire screen.

In these modes, the contrast ratio at the 270° azimuth is preferably higher than the contrast ratio at the 90° azimuth. This makes it possible to set the viewing angles of the right and left shutter sections 121 so as to match the human effective field of view and thereby realize higher display quality.

On the other hand, when the CR ratio of the shutter section for the right eye is measured at eight or more azimuths and at a predetermined polar angle, the average of CR ratios at the −45° to 45° azimuth and/or 135° to 225° azimuth (more preferably, −45° to 45° azimuth and 135° to 225° azimuth), that is, the average of CR ratios at the −45° to 45° azimuth and/or the average of CR ratios at the 135° to 225° azimuth (more preferably, the average of CR ratios at the −45° to 45° azimuth and average of CR ratios at the 135° to 225° azimuth) is preferably higher than the average of CR ratios at the 45° to 135° azimuth and 225° to 315° azimuth, that is, the average of CR ratios at the 45° to 135° azimuth and the average of CR ratios at the 225° to 315° azimuth.

Furthermore, when the CR ratio of the shutter section for the left eye is measured at eight or more azimuths and at a predetermined polar angle, the average of CR ratios at the −45° to 45° azimuth and/or 135° to 225° azimuth (more preferably, −45° to 45° azimuth and 135° to 225° azimuth), that is, the average of CR ratios at the −45° to 45° azimuth and/or the average of CR ratios at the 135° to 225° azimuth (more preferably, the average of CR ratios at the −45° to 45° azimuth and average of CR ratios at the 135° to 225° azimuth) is preferably higher than the average of CR ratios at the 45° to 135° azimuth and 225° to 315° azimuth, that is, the average of CR ratios at the 45° to 135° azimuth and the average of CR ratios at the 225° to 315° azimuth.

In this way, it is possible to view clear stereoscopic images with less double image on the entire screen.

Furthermore, in these modes, the average of contrast ratios at the 225° to 315° azimuth is preferably higher than the average of contrast ratios at the 45° to 135° azimuth. This makes it possible to set the viewing angles of the right and left shutter sections 121 so as to match the human effective field of view and thereby realize higher display quality.

Furthermore, when a chromatic change of the shutter section for the right eye is measured, with the shutter section for the right eye being actually driven at a predetermined polar angle, a chromatic change at the 0° azimuth and 180° azimuth, that is, a chromatic change at the 0° azimuth and a chromatic change at the 180° azimuth is preferably smaller than the average of chromatic changes at four or more azimuths, and a chromatic change at the 90° azimuth and/or 270° azimuth (more preferably, 90° azimuth and 270° azimuth), that is, a chromatic change at the 90° azimuth and/or a chromatic change at the 270° azimuth (more preferably, a chromatic change at the 90° azimuth and a chromatic change at the 270° azimuth) is preferably greater than the average of chromatic changes at four or more azimuths.

Furthermore, when a chromatic change of the shutter section for the left eye is measured, with the shutter section for the left eye being actually driven at a predetermined polar angle, a chromatic change at the 0° azimuth and 180° azimuth, that is, a chromatic change at the 0° azimuth and a chromatic change at the 180° azimuth are preferably smaller than an average of chromatic changes at four or more azimuths, a chromatic change at the 90° azimuth and/or 270° azimuth (more preferably, 90° azimuth and 270° azimuth), that is, a chromatic change at the 90° azimuth and/or a chromatic change at the 270° azimuth (more preferably, a chromatic change at the 90° azimuth and a chromatic change at the 270° azimuth) are preferably greater than the average of chromatic changes at four or more azimuths.

Thus, it is possible to view clear stereoscopic images with less chromatic change on the entire screen.

Furthermore, in these modes, the chromatic change at the 270° azimuth is preferably smaller than the chromatic change at the 90° azimuth. This makes it possible to set the viewing angles of the right and left shutter sections 121 so as to match the human effective field of view and thereby realize higher display quality.

Furthermore, when a chromatic change of the shutter section for the right eye is measured, with the shutter section for the right eye being actually driven at eight or more azimuths and at a predetermined polar angle, the average of chromatic changes at the −45° to 45° azimuth and/or 135° to 225° azimuth (more preferably, −45° to 45° azimuth and 135° to 225° azimuth), that is, the average of chromatic changes at the −45° to 45° azimuth and/or the average of chromatic changes at the 135° to 225° azimuth (more preferably, average of chromatic changes at the −45° to 45° azimuth and average of chromatic changes at the 135° to 225° azimuth) is preferably smaller than the average of chromatic changes at the 45° to 135° azimuth and 225° to 315° azimuth, that is, the average of chromatic changes at the 45° to 135° azimuth and the average of chromatic changes at the 225° to 315° azimuth.

Furthermore, when a chromatic change of the shutter section for the left eye is measured, with the shutter section for the left eye being actually driven at eight or more azimuths and at a predetermined polar angle, the average of chromatic changes at the −45° to 45° azimuth and/or 135° to 225° azimuth (more preferably, −45° to 45° azimuth and 135° to 225° azimuth), that is, the average of chromatic changes at the −45° to 45° azimuth and/or the average of chromatic changes at the 135° to 225° azimuth (more preferably, average of chromatic changes at the −45° to 45° azimuth and average of chromatic changes at the 135° to 225° azimuth) is preferably smaller than the average of chromatic changes at the 45° to 135° azimuth and 225° to 315° azimuth, that is, the average of chromatic changes at the 45° to 135° azimuth and the average of chromatic changes at the 225° to 315° azimuth.

Thus, it is possible to view clear stereoscopic images with less chromatic change on the entire screen.

Furthermore, in these modes, the average of chromatic changes at the 225° to 315° azimuth is preferably smaller than the average of chromatic changes at the 45° to 135° azimuth. This makes it possible to set the viewing angles of the right and left shutter sections 121 so as to match the human effective field of view and thereby realize higher display quality.

However, the above-described four or more azimuths and eight or more azimuths are arranged uniformly among all azimuths.

The above-described four or more azimuths are preferably eight or more azimuths, more preferably 12 or more azimuths, and further preferably 24 or more azimuths.

Furthermore, the above-described eight or more azimuths are preferably 12 or more azimuths, and more preferably 24 or more azimuths.

The above-described predetermined polar angle is not particularly limited, but is normally determined within a range greater than 0° and smaller than 90° and preferably determined within a range of 5° to 45° (more preferably 8° to 30°).

Furthermore, when the liquid crystal mode of the liquid crystal cell 123 is a TN mode or STN mode, center molecules may be aligned along the lateral direction. It is thereby also possible to view clear stereoscopic images with less chromatic change on the entire screen.

The alignment direction of the center molecules need not exactly match the lateral direction, but the angle formed between these directions is preferably 15° or below and more preferably 5° or below.

Furthermore, the alignment direction of the center molecules can be determined from the aligning treatment direction (e.g., rubbing directions) of the two substrates of the liquid crystal cell 123.

Furthermore, the viewing angle characteristic of the shutter section for the right eye is preferably substantially symmetric with respect to the axis along the 90° azimuth and 270° azimuth, and the viewing angle characteristic of the shutter section for the left eye is preferably substantially symmetric with respect to the axis along the 90° azimuth and 270° azimuth. This allows the display quality at both right and left ends of the screen in particular to be equally improved. As a result, it is possible to realize higher display quality in the entire region of the screen.

These viewing angle characteristics need not exactly be symmetric with respect to the above-described axis, but the viewing angle characteristics preferably satisfy the following conditions, for example.

Figure 36:
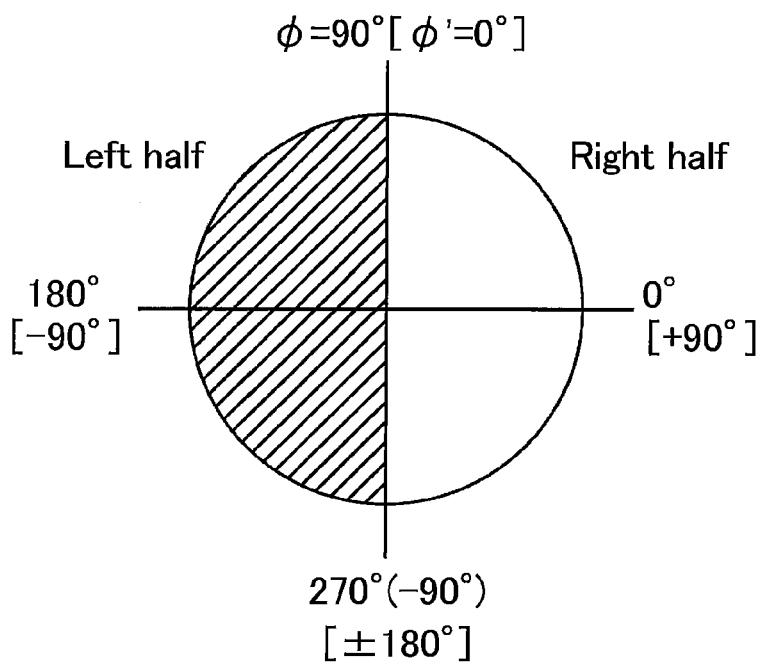
FIG. 36 is a diagram illustrating azimuths φ and φ' in the active shutter glasses.

First, the CR ratio of each shutter section is measured at 12 or more azimuths (however, these azimuths are arranged uniformly among all azimuths) and at a plurality of predetermined polar angles. Next, a graph representing curves of CR ratios of the respective shutter sections with respect to azimuths is created from the measurement result. Here, as shown in FIG. 36, azimuth $\phi'$ is introduced assuming the 90° azimuth (12 o'clock direction) as a reference (0°) and assuming that the clockwise direction is positive. Within a range of azimuth $\phi'$ clockwise from 0° to +180° (right half) and a range of azimuth $\phi'$ counterclockwise from 0° to −180° (left half), maximum (or minimum) points having substantially the same magnitude of the CR ratio with respect to the respective curves of different polar angles are compared, and as a result, the difference of $|\phi'|$ (absolute value of azimuth $\phi'$) at both maximum (or minimum) points is preferably 30° or below.

The viewing angle characteristic measured is not particularly limited to the CR ratio, but, as described above, may be light leakage in a light-shielded state or a chromatic change with the shutter section being actually driven.

The above-described 12 or more azimuths are preferably 24 or more azimuths.

Furthermore, the above-described plurality of predetermined polar angles are not particularly limited, but are normally determined within a range greater than 0° and smaller than 90°, preferably determined within a range of 5° to 45° (more preferably 15° to 30°). Furthermore, the number of the above-described plurality of predetermined polar angles is not particularly limited, but is normally 2 or above, 5 or below, and preferably 3 or above and 4 or below.

Furthermore, in the above-described comparison, the difference between the CR ratios at two maximum (or minimum) points where the magnitudes of the CR ratios are nearly equal is preferably 100 or below, and more preferably 50 or below. Furthermore, both of the CR ratios are preferably within a range of ±10% (more preferably ±5%) of an arbitrary CR ratio (e.g., average value of both of the CR ratios).

Furthermore, when there are a plurality of maximum (or minimum) points to be compared, at least one set of maximum (or minimum) points may satisfy the above-described conditions and all the maximum (or minimum) points need not satisfy the above-described conditions.

Except a case where azimuth $\phi'$ is particularly specified, the azimuth of the glasses is assumed to follow the above-described definition (right direction (3 o'clock direction) is 0° and the counterclockwise direction is positive).

The viewing angle characteristic that can be evaluated in the present embodiment can also include the following angle characteristics.

Chromatic change when shutter section is in light transmitting state

Transmissivity characteristic when shutter section is in light transmitting state Transmissivity while shutter section is being actually driven Amount of crosstalk while shutter section is being actually driven To be more specific, examples of a chromatic change include color difference such as $\Delta u'v'$, $\Delta C^*ab$. $\Delta u'v'$ is calculated from a coordinate variation ($=((u'-u'_0)^2+(v'-v'_0)^2)^{0.5}$) in a chromaticity diagram of a 1976CIE UCS color system. On the other hand, $\Delta C^*ab$ is calculated from a coordinate variation ($=((\Delta a^*)^2+(\Delta b^*)^2)^{0.5}$) in a chromaticity diagram in an L*a*b* color system.

Furthermore, as shown in FIG. 2, timing of switching between light transmission and light-shielding (opening/closing) of the right and left shutter sections 121 is in synchronization with an R signal and an L signal. The observer sees the light transmission and light-shielded states, that is, images for the right eye and the left eye by temporally averaging the images. However, when responses of the right and left shutter sections 121 are not sufficiently quick, the proportion of not only times of the light transmission and light-shielded states but also time of the transition state intermediate between these states increases. Therefore, there may be cases where the viewing angle characteristics of the active shutter glasses cannot be sufficiently evaluated from only static characteristics of light transmission and light-shielded states. Such a situation becomes more noticeable when images for the right eye and for the left eye are displayed at a faster frame rate. Therefore, when evaluating the system for viewing a stereoscopic image by displaying images for the right eye and for the left eye on a time-division basis in particular, it is preferable to evaluate the viewing angle characteristic with the active shutter glasses being actually driven.

Figure 8:
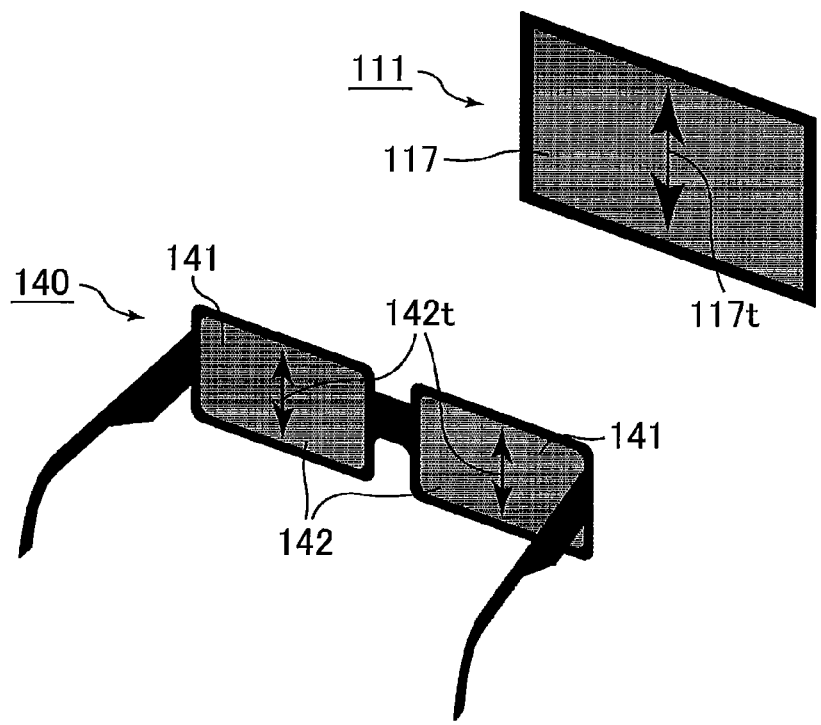
FIG. 8 is a schematic perspective view illustrating the video display device and polarized sunglasses of Embodiment 1.

Latest TV liquid crystal display devices generally adopt a VA mode or IPS mode, and as shown in FIG. 8, many of such devices are designed so that the transmission axis 117t of the linear polarizer 117 provided closer to the observer than the liquid crystal cell is oriented along the longitudinal direction. This is intended to allow the observer wearing the polarized sunglasses to see the screen with no degradation of luminance, without the need for special treatment such as an addition of a new member.

Polarized sunglasses are generally designed so as to absorb a polarized component vibrating in a horizontal direction and allow a polarized component vibrating in a vertical direction to pass. This is because, due to a Fresnel effect, an S wave (polarization vibrating in a direction perpendicular to a plane of incidence) is predominant in intensity of reflected light, and light emitted from a light source (sun light, fluorescent light or the like) and reflected on a horizontal surface such as floor, desk or water surface is mostly vibrating in the horizontal direction. Therefore, as shown in FIG. 8, right and left light transmission sections 141 of polarized sunglasses 140 are each provided with a linear polarizer 142 and a transmission axis 142t of the linear polarizer 142 is set to a longitudinal direction when the polarized sunglasses 140 are worn by the user. As a result, the observer wearing the polarized sunglasses 140 can observe the screen of a liquid crystal display device 111 which is designed so that the transmission axis 117t of the linear polarizer 117 is oriented along the longitudinal direction without being concerned about degradation of luminance.

However, when such a liquid crystal display device 111 is used as the display device 110, brightness may decrease. This is because the transmission axis 124t of the outside polarizer 124 of the active shutter glasses 120 is arranged along a straight line connecting the 135° azimuth and the 315° azimuth as described above. That is, the angle formed between the transmission axes 124t and 117t is around 45°, and as a result, it may not be possible to view a clear stereoscopic image.

Furthermore, if the observer turns his/her face (glasses 120) in this case, the screen brightness varies a great deal. For example, when such a scene is assumed that the observer watches the screen while lying on the floor, such a system does not bear any practical use.

All these are attributable to the fact that transmissivity of the two linear polarizers superimposed at a relative angle of $\theta$ is proportional to the square of $\cos \theta$.

Thus, when the liquid crystal display device 111 is used as the display device 110, following modification example 1 is preferably used.

Figure 9:
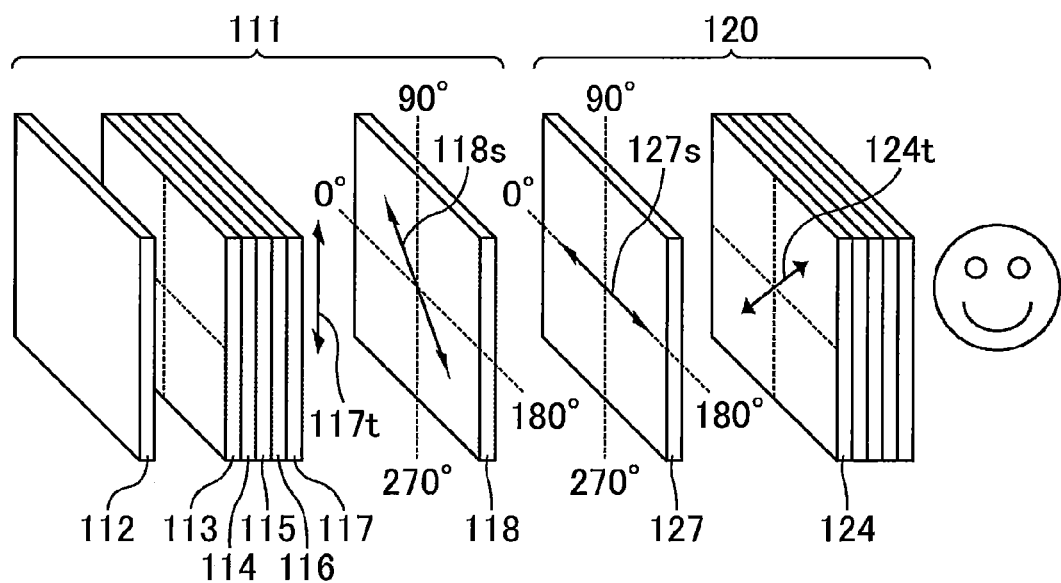
FIG. 9 is a schematic perspective view illustrating a configuration of a stereoscopic image projection system according to Embodiment 1 (modification example 1)

In the present modification example, as shown in FIG. 9, the liquid crystal display device 111 includes a linear polarizer 117 and a $\lambda/4$ plate 118 in the stated order on the observation surface side. The $\lambda/4$ plate 118 is pasted to the linear polarizer 117 at a relative angle of approximately 45° of the axis. On the other hand, the glasses 120 have a $\lambda/4$ plate 127 outside the outside polarizer 124. The $\lambda/4$ plate 127 is pasted to the outside polarizer 124 at a relative angle of approximately 45° of the axis. Thus, the stereoscopic image projection system of the present modification example introduces an optical system including a pair of circularly polarizing plates.

Thus, light emitted from the screen of the liquid crystal display device 111 first becomes linearly polarized light which is parallel to the transmission axis 117t of the linear polarizer 117 and is then changed to circularly polarized light by the $\lambda/4$ plate 118. This circularly polarized light is reconverted to linearly polarized light which is parallel to the transmission axis 124t of the outside polarizer 124 by the $\lambda/4$ plate 127. This linearly polarized light impinges on the outside polarizer 124. Since unaxial circularly polarized light impinges on the $\lambda/4$ plate 127 in this way, unlike the case where no $\lambda/4$ plates 118 and 127 are provided, certain screen brightness is obtained which is constant irrespective of the relative azimuths of the liquid crystal display device 111 and glasses 120. This applies the fact that when two identical chiral circular polarizers are superimposed, transmissivity becomes constant irrespective of the relative angle between those axes.

Components of the present modification example will be described in detail.

The liquid crystal display device 111 is a transmission type liquid crystal display device and is provided with a backlight 112, a linear polarizer (back polarizer film) 113, a viewing angle compensation film 114, a liquid crystal cell 115, a viewing angle compensation film 116, a linear polarizer (front polarizer film) 117 and the $\lambda/4$ plate 118 in the stated order from the back side as shown in FIG. 9.

The polarizers 113 and 117 are disposed in a cross-Nicol state. That is, the angle formed between the transmission axis 113t of the back polarizer film 113 and the transmission axis 117t of the front polarizer film 117 is set to approximately 90°. However, the arrangement relationship in the transmission axis between the back polarizer film 113 and the front polarizer film 117 can be set according to the mode of the liquid crystal cell 115 as appropriate and may also be in a parallel Nicol state.

The liquid crystal cell 115 is not particularly limited and examples thereof include a liquid crystal cell in a display mode such as VA mode, IPS mode, field fringe switching (FFS) mode. The liquid crystal cell 115 is provided with two transparent substrates, a liquid crystal layer interposed between these two substrates, and a transparent electrode formed on at least one of the two substrates. The drive scheme of the liquid crystal cell 115 is not particularly limited and can be a passive matrix scheme, plasma address scheme or the like, and the active matrix scheme is suitable above all.

Figure 10:
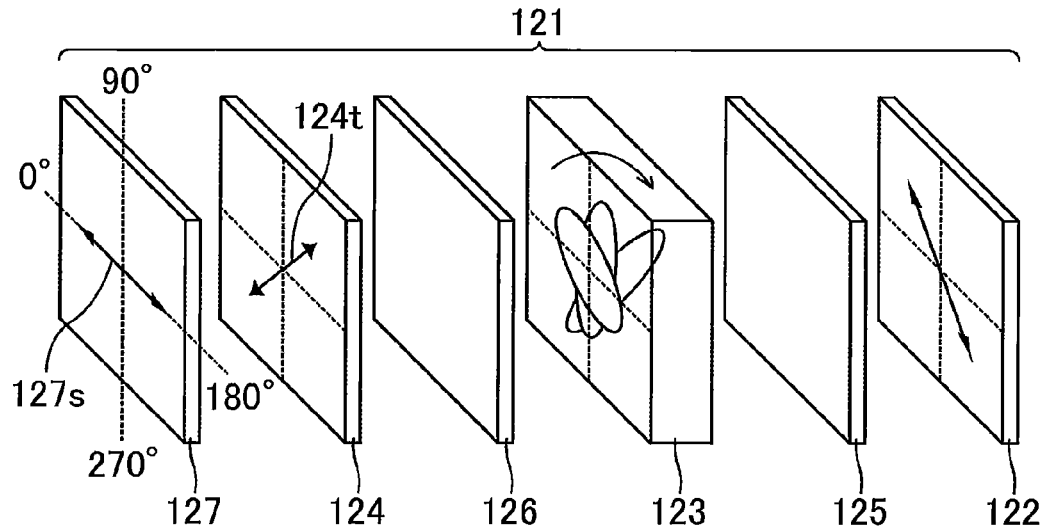
FIG. 10 is a schematic perspective view illustrating the configuration of the active shutter glasses of Embodiment 1 (modification example 1)

Right and left lens sections 121 of the active shutter glasses 120 are each provided with λ/4 plate 127, an outside polarizer 124, a viewing angle compensation film 126, a liquid crystal cell 123, a viewing angle compensation film 125 and an inside polarizer 122 in the stated order from the outside as shown in FIG. 10.

Figure 11:
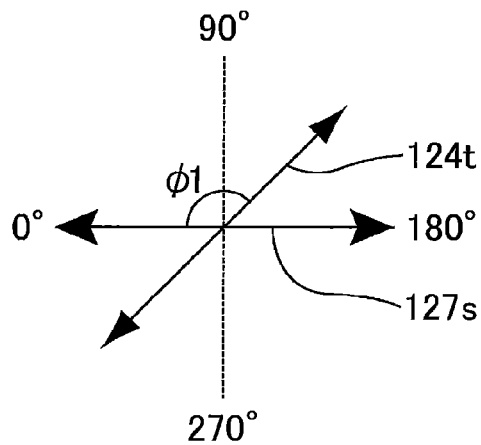
FIG. 11 is a schematic diagram illustrating an arrangement relationship of axes of the active shutter glasses of Embodiment 1 (modification example 1)
Figure 12:
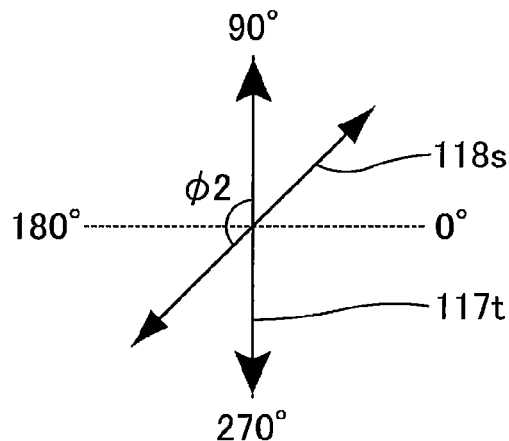
FIG. 12 is a schematic diagram illustrating an arrangement relationship of axes of the video display device of Embodiment 1 (modification example 1)

When the angle formed between a transmission axis 124t of the outside polarizer 124 and an in-plane slow axis 127s of the λ/4 plate 127 is defined as φ1, and the angle formed between the transmission axis 117t of the front polarizer film 117 and the in-plane slow axis 118s of the λ/4 plate 118 is defined as φ2, the stereoscopic image projection system of the present modification example satisfies following equations (1) and (2) or (3) and (4).

$$40° \leq \phi1 \leq 50° \quad (1)$$

$$40° \leq \phi2 \leq 50° \quad (2)$$

$$130° \leq \phi1 \leq 140° \quad (3)$$

$$130° \leq \phi2 \leq 140° \quad (4)$$

where, φ1 is measured as viewed from the λ/4 plate 127 side (outside) as shown in FIG. 11, and its counterclockwise direction is measured to be positive relative to the direction of the transmission axis 124t of the outside polarizer 124. Similarly, as shown in FIG. 12, φ2 is measured as viewed from the λ/4 plate 118 side (front side) and its counterclockwise direction is measured to be positive relative to the direction of the transmission axis 117t of the front polarizer film 117.

A suitable range for φ1 is $42° \leq \phi1 \leq 48°$ or $132° \leq \phi1 \leq 138°$ and a more suitable range is $44° \leq \phi1 \leq 46°$ or $134° \leq \phi1 \leq 136°$. A suitable range for φ2 is $42° \leq \phi2 \leq 48°$ or $132° \leq \phi2 \leq 138°$ and a more suitable range is $44° \leq \phi2 \leq 46°$ or $134° \leq \phi2 \leq 136°$.

As described above, according to the present modification example, a circular polarizer (λ/4 plate 127 and outside polarizer 124) whose transmissivity is constant irrespective of the polarized azimuth of incident light (circularly polarized light) is provided outside the glasses 120 and further the polarized state of light emitted from the liquid crystal display device 111 is optimized to circularly polarized light to maximize transmissivity of the glasses 120. Thus, in the present modification example, circularly polarized light is emitted from the liquid crystal display device 111, and circularly polarized light is impinged on the glasses 120. Therefore, the display is never darkened no matter in which direction the polarizers 122, 124 and the liquid crystal cell 123 are arranged. That is, it is possible to obtain an always clear stereoscopic image without being accompanied by increase of power consumption. Furthermore, it is possible to easily set the viewing angle of the right and left shutter sections 121 so as to be wider on the right and left sides without being concerned about degradation of luminance.

Furthermore, the display is never darkened even when the observer turns his/her head (glasses 120) and it is thereby possible to obtain an always clear stereoscopic image without being accompanied by increase of power consumption.

Furthermore, in the present embodiment and the present modification example, the shutter function is obtained by the linear polarizer 122, liquid crystal cell 123 and linear polarizer 124 of the glasses 120, that is, the glasses 120 themselves. Therefore, it is possible to obtain a shutter effect which is always good irrespective of a relative positional relationship between the glasses 120 and the liquid crystal display device 111.

Hereinafter, the viewing angle characteristic of the active shutter glasses according to references and embodiments will be described.

(Reference 1)

Figure 13:
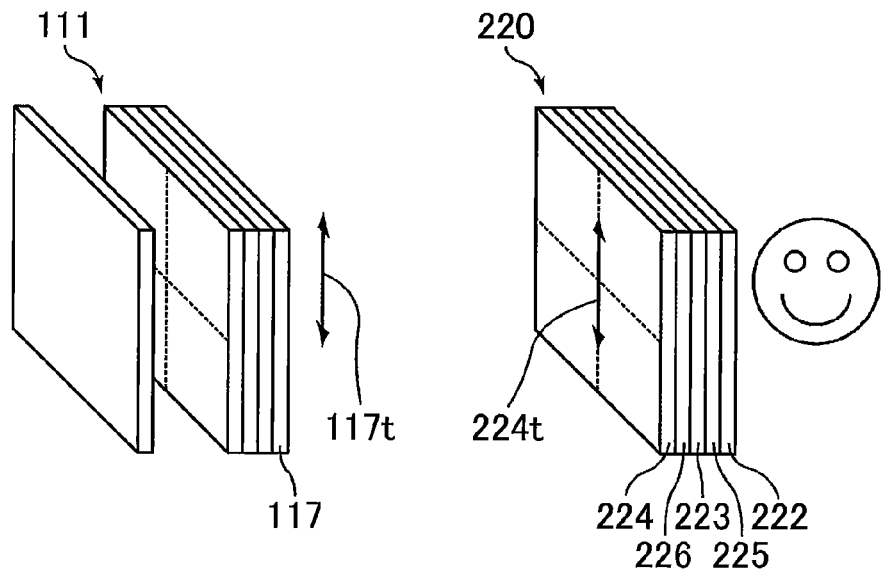
FIG. 13 is a schematic perspective view illustrating a configuration of a stereoscopic image projection system of reference 1.

As shown in FIG. 13, the right and left shutter sections of active shutter glasses 220 according to reference 1 are each provided with a linear polarizer (inside polarizer) 222, a viewing angle compensation film 225, a liquid crystal cell 223, a viewing angle compensation film 226 and a linear polarizer (outside polarizer) 224 in the stated order from the inside.

Figure 14:
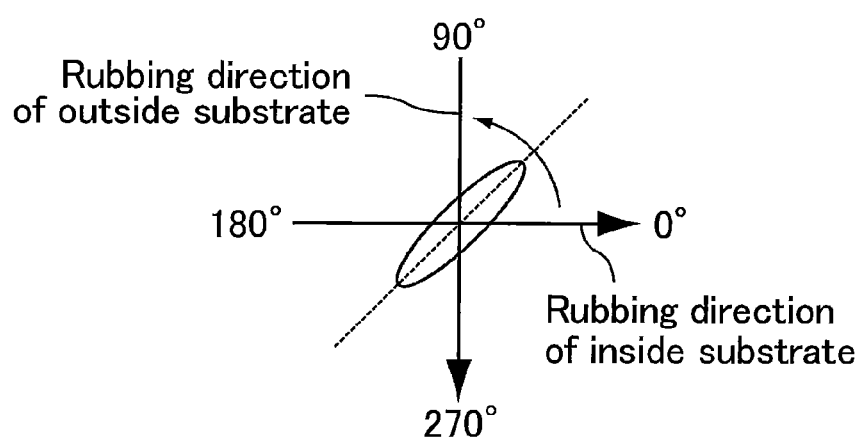
FIG. 14 is a schematic diagram illustrating a relationship between an aligning treatment direction and alignment direction of liquid crystal molecules in the active shutter glasses of reference 1.

The liquid crystal mode of the liquid crystal cell 223 is, for example, a TN or STN mode, and the liquid crystal cell 223 is provided with two transparent substrates, a liquid crystal layer interposed between the two substrates and two transparent electrodes formed on the two substrates respectively. The liquid crystal layer contains nematic liquid crystal molecules whose dielectric anisotropy is positive. The liquid crystal molecules are aligned in an aligning treatment direction (e.g., rubbing direction) on the substrate surface and aligned so as to be twisted by approximately 90° or approximately 270° in a thickness direction of the liquid crystal layer. For example, when viewed from outside, the liquid crystal molecules are twisted by 90° counterclockwise (along the light traveling direction). That is, liquid crystal molecules located at the center in the thickness direction of the liquid crystal cell 223 (central molecules) are aligned in a direction shown by a dotted line in FIG. 14, that is, direction along the 45° azimuth and 225° azimuth. Furthermore, the aligning treatment direction of the outside substrate is substantially orthogonal to the transmission axis 224t of the outside polarizer 224, the aligning treatment direction of the inside substrate is substantially orthogonal to the transmission axis 222t of the inside polarizer 222. Furthermore, as shown in FIG. 14, when the observer is wearing the glasses 220, the rubbing direction of the outside substrate is oriented from the 90° azimuth to the 270° azimuth, and liquid crystal molecules in the vicinity of the outside substrate are aligned tilted by on the order of several degrees so as to slightly rise from this substrate toward the 270° azimuth. On the other hand, the rubbing direction of the inside substrate is oriented from the 180° azimuth to the 0° azimuth and liquid crystal molecules in the vicinity of the inside substrate are aligned so as to rise by on the order of several degrees from this substrate toward the 0° azimuth. Therefore, intermediate molecules (center molecules) in the central area of the cell thickness are aligned tilted by on the order of several degrees as in the case of molecules in the vicinity of the substrate along the direction along the 45° azimuth and 225° azimuth which are intermediate azimuths. The tilt orientation of the center molecules is outside at the 45° azimuth and inside at the 225° azimuth viewed from the observer side.

Furthermore, the transmission axis 224t of the outside polarizer 224 is set to a longitudinal direction when the observer is wearing the glasses 220. This is intended to cause the transmission axis 117t of the front polarizer film 117 of the liquid crystal display device 111 to match the transmission axis 224t.

Table 1 shows a result of measurement of the amount of light leakage (brightness) of the right and left shutter sections of the glasses 220 in a light-shielded state. The light leakage was measured with the glasses 220 arranged on a predetermined backlight provided with a diffuser. Table 1 shows the result of measurement conducted at 5° intervals from polar angle 0° to 60° at 24 azimuths obtained by dividing the entire azimuth range into 24 equal portions.

TABLE 1

| | The amount of light leakage during light-shielding | | | | | | | | | | | | |
|---|---|---|---|---|---|---|---|---|---|---|---|---|
| | Average value at all | Azimuths (°) | | | | | | | | | | | |
| Polar angle (°) | measured azimuths | 0 | 15 | 30 | 45 | 60 | 75 | 90 | 105 | 120 | 135 | 150 | 165 |
| 0 | 1.39 | 1.39 | 1.39 | 1.39 | 1.39 | 1.39 | 1.39 | 1.39 | 1.39 | 1.39 | 1.39 | 1.39 | 1.39 |
| 5 | 2.20 | 2.21 | 2.05 | 2.21 | 2.33 | 2.27 | 2.37 | 1.61 | 1.85 | 1.79 | 1.73 | 1.85 | 1.99 |
| 10 | 3.65 | 3.68 | 4.46 | 5.31 | 6.03 | 5.27 | 4.24 | 3.00 | 2.76 | 2.39 | 2.35 | 2.84 | 3.36 |
| 15 | 6.37 | 5.51 | 8.45 | 11.70 | 12.83 | 11.97 | 8.55 | 5.11 | 3.36 | 3.40 | 4.14 | 5.29 | 5.49 |
| 20 | 10.70 | 7.94 | 15.24 | 22.89 | 26.04 | 23.59 | 15.97 | 8.43 | 4.93 | 4.91 | 7.62 | 9.43 | 9.75 |
| 25 | 17.03 | 10.98 | 25.44 | 40.82 | 47.78 | 41.19 | 26.99 | 11.54 | 4.99 | 8.12 | 13.88 | 17.03 | 15.81 |
| 30 | 25.03 | 13.94 | 37.59 | 64.31 | 76.58 | 66.28 | 41.21 | 16.31 | 5.29 | 10.42 | 20.61 | 26.41 | 23.51 |
| 35 | 35.12 | 17.46 | 55.75 | 98.16 | 116.68 | 100.65 | 61.10 | 22.00 | 4.44 | 13.41 | 30.87 | 39.28 | 34.31 |
| 40 | 47.71 | 19.61 | 77.12 | 140.71 | 168.95 | 142.77 | 83.96 | 28.20 | 4.63 | 18.62 | 44.20 | 55.95 | 45.89 |
| 45 | 59.32 | 23.89 | 99.49 | 183.49 | 219.47 | 184.35 | 107.15 | 35.15 | 3.16 | 20.43 | 53.33 | 68.13 | 57.12 |
| 50 | 73.68 | 26.20 | 124.91 | 238.39 | 282.77 | 231.25 | 131.70 | 40.06 | 2.65 | 26.59 | 69.68 | 86.72 | 69.92 |
| 55 | 83.23 | 29.88 | 143.57 | 277.93 | 327.94 | 264.47 | 146.59 | 45.73 | 3.56 | 29.08 | 75.64 | 93.01 | 74.09 |
| 60 | 90.78 | 32.82 | 160.10 | 316.66 | 362.31 | 282.25 | 149.84 | 44.67 | 4.65 | 34.89 | 87.62 | 100.61 | 77.45 |
| Average value within 90° range (polar angle 20°) | | 17.16 | | | | | | 7.75 | | | | | |
| Direction of glasses | | Upward | | | | | | Left | | | | | |

| | The amount of light leakage during light-shielding | | | | | | | | | | | | |
|---|---|---|---|---|---|---|---|---|---|---|---|---|
| | Average value at all | Azimuths (°) | | | | | | | | | | | |
| Polar angle (°) | measured azimuths | 180 | 195 | 210 | 225 | 240 | 255 | 270 | 285 | 300 | 315 | 330 | 345 |
| 0 | 1.39 | 1.39 | 1.39 | 1.39 | 1.39 | 1.39 | 1.39 | 1.39 | 1.39 | 1.39 | 1.39 | 1.39 | 1.39 |
| 5 | 2.20 | 2.61 | 2.41 | 2.88 | 2.51 | 2.82 | 2.61 | 2.49 | 2.23 | 1.61 | 2.31 | 1.95 | 2.05 |
| 10 | 3.65 | 3.20 | 4.14 | 4.73 | 4.91 | 4.40 | 4.26 | 4.04 | 3.12 | 2.17 | 2.33 | 1.91 | 2.65 |
| 15 | 6.37 | 6.01 | 6.74 | 7.14 | 7.88 | 7.52 | 6.64 | 5.71 | 4.57 | 4.04 | 3.68 | 3.34 | 3.80 |
| 20 | 10.70 | 9.21 | 9.31 | 10.98 | 11.74 | 11.34 | 8.77 | 6.52 | 7.12 | 7.98 | 6.96 | 5.19 | 5.19 |
| 25 | 17.03 | 12.79 | 11.48 | 13.39 | 15.73 | 14.14 | 11.72 | 10.36 | 11.50 | 14.82 | 13.37 | 9.03 | 5.79 |
| 30 | 25.03 | 16.67 | 13.92 | 17.17 | 19.49 | 18.06 | 14.10 | 12.77 | 17.50 | 23.73 | 23.15 | 14.72 | 7.10 |
| 35 | 35.12 | 22.70 | 16.01 | 18.08 | 21.20 | 19.79 | 15.26 | 15.12 | 25.26 | 34.73 | 33.50 | 19.93 | 7.10 |
| 40 | 47.71 | 28.01 | 16.27 | 18.74 | 23.17 | 20.75 | 14.92 | 17.50 | 34.73 | 52.55 | 52.11 | 28.36 | 7.38 |
| 45 | 59.32 | 32.82 | 17.92 | 18.32 | 24.07 | 21.60 | 16.29 | 20.67 | 43.64 | 66.75 | 65.10 | 34.37 | 6.96 |
| 50 | 73.68 | 39.24 | 17.68 | 17.72 | 23.55 | 20.35 | 14.14 | 23.85 | 55.22 | 87.70 | 85.67 | 45.43 | 6.98 |
| 55 | 83.23 | 40.38 | 18.68 | 18.04 | 24.62 | 21.70 | 14.92 | 25.02 | 63.89 | 101.82 | 98.12 | 51.10 | 7.66 |
| 60 | 90.78 | 43.20 | 17.44 | 14.28 | 21.90 | 18.18 | 12.29 | 26.02 | 71.59 | 115.72 | 113.34 | 60.21 | 10.68 |
| Average value within 90° range (polar angle 20°) | | 9.67 | | | | | | 6.70 | | | | | |
| Direction of glasses | | Downward | | | | | | Right | | | | | |

As a result, when compared at a predetermined polar angle (here, for example, polar angle 20°), the amount of light leakage of the glasses 220 was greater in the left and right directions rather than in a diagonal direction, for example, the 135° azimuth or 315° azimuth.

Figure 15:
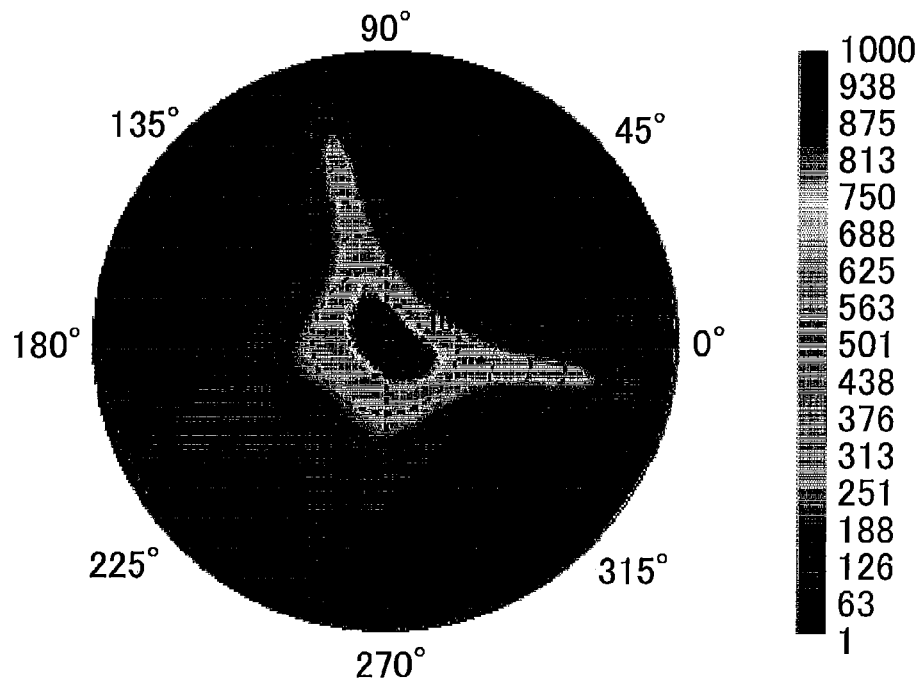
FIG. 15 is a diagram illustrating a viewing angle characteristic (CR ratio) of the active shutter glasses of reference 1.
Figure 16:
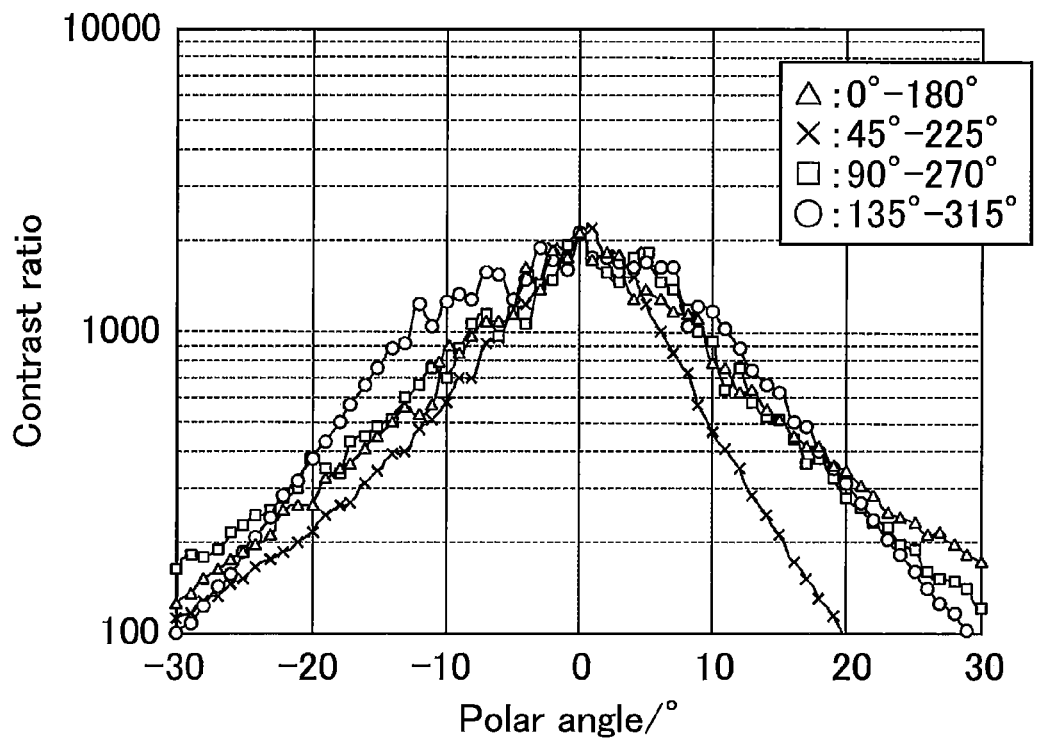
FIG. 16 is a graph illustrating a viewing angle characteristic (CR ratio) of the active shutter glasses of reference 1.

FIGS. 15 and 16, and Table 2 show results of measurement of CR ratios of the right and left shutter sections of the glasses 220. The CR ratios were calculated between when no voltage was applied and when 15 V was applied, and measured with the glasses 220 arranged on a TV backlight. Table 2 shows the result of measurement conducted at 5° intervals from polar angle 0° to 60° at 24 azimuths obtained by dividing the entire azimuth range into 24 equal portions.

TABLE 2

| | CR ratio | | | | | | | | | | | | |
|---|---|---|---|---|---|---|---|---|---|---|---|---|
| | Average value at all | Azimuths (°) | | | | | | | | | | | |
| Polar angle (°) | measured azimuths | 0 | 15 | 30 | 45 | 60 | 75 | 90 | 105 | 120 | 135 | 150 | 165 |
| 0 | 2102 | 2102 | 2102 | 2102 | 2102 | 2102 | 2102 | 2102 | 2102 | 2102 | 2102 | 2102 | 2102 |
| 5 | 1267 | 1373 | 1423 | 1320 | 1246 | 1285 | 1228 | 1842 | 1561 | 1604 | 1684 | 1560 | 1453 |
| 10 | 910 | 785 | 647 | 544 | 468 | 537 | 655 | 916 | 1009 | 1165 | 1174 | 985 | 832 |
| 15 | 539 | 513 | 331 | 237 | 211 | 222 | 305 | 515 | 768 | 759 | 630 | 495 | 485 |
| 20 | 332 | 342 | 175 | 114 | 97 | 106 | 151 | 280 | 480 | 485 | 313 | 256 | 253 |
| 25 | 216 | 234 | 100 | 60 | 50 | 56 | 83 | 188 | 438 | 270 | 161 | 133 | 145 |
| 30 | 148 | 173 | 63 | 36 | 29 | 31 | 49 | 120 | 370 | 190 | 97 | 76 | 88 |
| 35 | 112 | 124 | 39 | 21 | 17 | 18 | 29 | 79 | 395 | 131 | 58 | 45 | 53 |
| 40 | 89 | 99 | 26 | 14 | 11 | 12 | 19 | 56 | 339 | 85 | 36 | 28 | 34 |
| 45 | 73 | 72 | 18 | 9 | 7 | 8 | 13 | 39 | 438 | 69 | 27 | 20 | 23 |
| 50 | 63 | 59 | 13 | 7 | 5 | 6 | 10 | 30 | 466 | 48 | 19 | 14 | 16 |

TABLE 2-continued

| | | | | | | | | | | | | |
|---|---|---|---|---|---|---|---|---|---|---|---|---|
| 55 | 50 | 45 | 10 | 5 | 4 | 5 | 8 | 23 | 293 | 39 | 15 | 11 | 12 |
| 60 | 42 | 36 | 8 | 4 | 3 | 4 | 6 | 19 | 187 | 27 | 12 | 8 | 9 |
| Average value within 90° range (polar angle 15°) | | | | 333 | | | | | | 585 | | | |
| Direction of glasses | | | | Upward | | | | | | Left | | | |

| | CR ratio | | | | | | | | | | | | |
|---|---|---|---|---|---|---|---|---|---|---|---|---|---|
| | Average value at all | | | | | | Azimuth (°) | | | | | | |
| Polar angle (°) | measured azimuths | 180 | 195 | 210 | 225 | 240 | 255 | 270 | 285 | 300 | 315 | 330 | 345 |
| 0 | 2102 | 2102 | 2102 | 2102 | 2102 | 2102 | 2102 | 2102 | 2102 | 2102 | 2102 | 2102 | 2102 |
| 5 | 1267 | 1134 | 1203 | 1021 | 1164 | 1036 | 1113 | 1167 | 1326 | 1816 | 1269 | 1501 | 1453 |
| 10 | 910 | 878 | 685 | 601 | 581 | 646 | 669 | 707 | 916 | 1358 | 1256 | 1525 | 1098 |
| 15 | 539 | 446 | 400 | 380 | 346 | 359 | 411 | 480 | 603 | 688 | 762 | 847 | 745 |
| 20 | 332 | 269 | 279 | 231 | 217 | 223 | 287 | 383 | 358 | 327 | 378 | 513 | 521 |
| 25 | 216 | 185 | 207 | 178 | 151 | 166 | 199 | 227 | 207 | 164 | 185 | 279 | 440 |
| 30 | 148 | 127 | 156 | 128 | 112 | 118 | 150 | 166 | 124 | 94 | 100 | 161 | 336 |
| 35 | 112 | 83 | 121 | 108 | 90 | 95 | 122 | 125 | 76 | 57 | 62 | 106 | 304 |
| 40 | 89 | 58 | 106 | 92 | 73 | 80 | 111 | 97 | 50 | 35 | 37 | 69 | 264 |
| 45 | 73 | 42 | 82 | 82 | 61 | 67 | 89 | 71 | 35 | 24 | 27 | 51 | 245 |
| 50 | 63 | 30 | 72 | 75 | 56 | 64 | 90 | 53 | 24 | 17 | 19 | 35 | 217 |
| 55 | 50 | 23 | 58 | 64 | 47 | 52 | 73 | 44 | 18 | 13 | 15 | 28 | 167 |
| 60 | 42 | 18 | 53 | 70 | 47 | 54 | 75 | 35 | 14 | 10 | 12 | 20 | 103 |
| Average value within 90° range (polar angle 15°) | | | | 403 | | | | | | 663 | | | |
| Direction of glasses | | | | Downward | | | | | | Rght | | | |

As a result, when compared at a predetermined polar angle (here, for example, polar angle 15°), the CR ratio of the glasses 220 was lower in the left and right directions rather than in a diagonal direction, for example, the 135° azimuth or 315° azimuth.

Furthermore, Table 3 shows the results extracted from FIG. 16 of the CR ratio in the lateral direction (direction along the 0° azimuth and 180° azimuth) and at polar angle ±17°, CR ratio in the longitudinal direction (direction along the 90° azimuth and 270° azimuth) and at polar angle ±17°, CR ratio in the direction along the 45° azimuth and 225° azimuth and at polar angle ±17° and CR ratio in the direction along the 135° azimuth and 315° azimuth and at polar angle ±17°.

TABLE 3

| | Polar angle | |
|---|---|---|
| Azimuths | −17° | +17° |
| 0°-180° | 363 | 419 |
| 45°-225° | 273 | 153 |

TABLE 3-continued

| | Polar angle | |
|---|---|---|
| Azimuths | −17° | +17° |
| 90°-270° | 436 | 367 |
| 135°-315° | 574 | 483 |

As a result, compared to a predetermined polar angle (here, polar angle 17°, for example), the CR ratio of the glasses 220 was lower in the left and right directions than in a diagonal direction, for example, the 135° azimuth or 315° azimuth. The front CR ratio was 2100.

Figure 17:
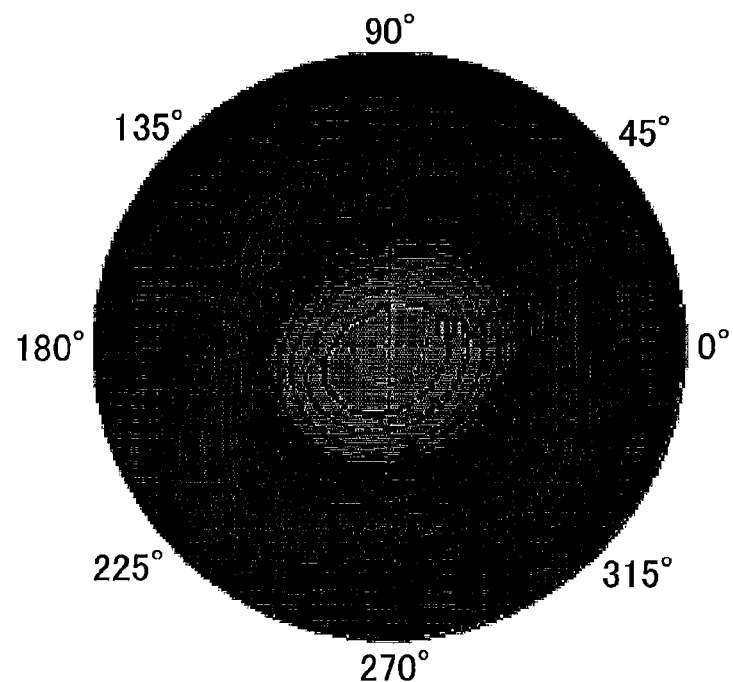
FIG. 17 is a diagram illustrating a viewing angle characteristic (chromatic change) of the active shutter glasses of reference 1.

FIG. 17 and Table 4 show results of measurement of a chromatic change when the right and left shutter sections of the glasses 220 were actually driven. The chromatic change was measured with the glasses 220 arranged on a predetermined backlight provided with a diffuser. Here, Δu'v' was measured as a chromatic change. In FIG. 17, the chromatic change is smaller when curve intervals are wider as in the case of contours. Table 4 shows the result of measurement conducted at 5° intervals from polar angle 0° to 60° at 24 azimuths obtained by dividing the entire azimuth range into 24 equal portions.

TABLE 4

| Chromatic changes during actual drive | | | | | | | | | | | | | | |
|---|---|---|---|---|---|---|---|---|---|---|---|---|---|---|
| | Average value at all measured | | | | | | Azimuths (°) | | | | | | | |
| Polar angle (°) | azimuths | 0 | 15 | 30 | 45 | 60 | 75 | 90 | 105 | 120 | 135 | 150 | 165 | 180 |
| 0 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 5 | 0.0029 | 0.0020 | 0.0019 | 0.0026 | 0.0030 | 0.0034 | 0.0056 | 0.0046 | 0.0050 | 0.0049 | 0.0065 | 0.0052 | 0.0036 | 0.0010 |
| 10 | 0.0061 | 0.0068 | 0.0051 | 0.0063 | 0.0073 | 0.0067 | 0.0079 | 0.0103 | 0.0099 | 0.0105 | 0.0095 | 0.0090 | 0.0068 | 0.0067 |
| 15 | 0.0090 | 0.0092 | 0.0073 | 0.0094 | 0.0091 | 0.0092 | 0.0097 | 0.0110 | 0.0107 | 0.0123 | 0.0126 | 0.0125 | 0.0111 | 0.0098 |
| 20 | 0.0105 | 0.0123 | 0.0088 | 0.0098 | 0.0094 | 0.0090 | 0.0093 | 0.0120 | 0.0110 | 0.0153 | 0.0132 | 0.0125 | 0.0123 | 0.0099 |
| 25 | 0.0115 | 0.0112 | 0.0096 | 0.0073 | 0.0087 | 0.0084 | 0.0084 | 0.0106 | 0.0149 | 0.0158 | 0.0155 | 0.0156 | 0.0148 | 0.0121 |
| 30 | 0.0115 | 0.0108 | 0.0077 | 0.0068 | 0.0057 | 0.0077 | 0.0081 | 0.0101 | 0.0138 | 0.0148 | 0.0175 | 0.0171 | 0.0139 | 0.0123 |
| 35 | 0.0133 | 0.0120 | 0.0078 | 0.0075 | 0.0072 | 0.0093 | 0.0081 | 0.0118 | 0.0158 | 0.0190 | 0.0194 | 0.0171 | 0.0131 | 0.0106 |

TABLE 4-continued

| | | | | | | | | | | | | | | |
|---|---|---|---|---|---|---|---|---|---|---|---|---|---|---|
| 40 | 0.0163 | 0.0125 | 0.0077 | 0.0076 | 0.0075 | 0.0089 | 0.0069 | 0.0099 | 0.0197 | 0.0253 | 0.0251 | 0.0193 | 0.0165 | 0.0121 |
| 45 | 0.0189 | 0.0127 | 0.0068 | 0.0068 | 0.0063 | 0.0065 | 0.0080 | 0.0103 | 0.0251 | 0.0325 | 0.0331 | 0.0282 | 0.0169 | 0.0123 |
| 50 | 0.0225 | 0.0125 | 0.0087 | 0.0058 | 0.0101 | 0.0073 | 0.0054 | 0.0122 | 0.0346 | 0.0391 | 0.0376 | 0.0327 | 0.0231 | 0.0117 |
| 55 | 0.0257 | 0.0151 | 0.0066 | 0.0130 | 0.0200 | 0.0133 | 0.0072 | 0.0185 | 0.0463 | 0.0456 | 0.0401 | 0.0405 | 0.0268 | 0.0107 |
| 60 | 0.0277 | 0.0196 | 0.0062 | 0.0214 | 0.0279 | 0.0247 | 0.0166 | 0.0294 | 0.0602 | 0.0488 | 0.0357 | 0.0372 | 0.0303 | 0.0106 |
| Average value within 90° range (polar angle 20°) | 0.011 | | | | 0.010 | | | | | | 0.012 | | | |
| Direction of glasses | Downward | | | | Right | | | | | | Upward | | | |

| Chromatic changes during actual drive | | | | | | | | | | | | | |
|---|---|---|---|---|---|---|---|---|---|---|---|---|---|
| | Average value at all | | | | | Azimuths (°) | | | | | | | |
| Polar angle (°) | measured azimuths | 195 | 210 | 225 | 240 | 255 | 270 | 285 | 300 | 315 | 330 | 345 |
| 0 | 0.0000 | 0.0000 | 0.0000 | 0.0000 | 0.0000 | 0.0000 | 0.0000 | 0.0000 | 0.0000 | 0.0000 | 0.0000 | 0.0000 |
| 5 | 0.0029 | 0.0005 | 0.0019 | 0.0026 | 0.0014 | 0.0009 | 0.0016 | 0.0028 | 0.0029 | 0.0022 | 0.0018 | 0.0023 |
| 10 | 0.0061 | 0.0036 | 0.0013 | 0.0015 | 0.0011 | 0.0020 | 0.0050 | 0.0044 | 0.0057 | 0.0069 | 0.0057 | 0.0064 |
| 15 | 0.0090 | 0.0058 | 0.0047 | 0.0026 | 0.0043 | 0.0059 | 0.0074 | 0.0095 | 0.0095 | 0.0107 | 0.0113 | 0.0102 |
| 20 | 0.0105 | 0.0102 | 0.0077 | 0.0075 | 0.0078 | 0.0075 | 0.0088 | 0.0095 | 0.0128 | 0.0126 | 0.0110 | 0.0108 |
| 25 | 0.0115 | 0.0095 | 0.0081 | 0.0086 | 0.0086 | 0.0074 | 0.0113 | 0.0122 | 0.0139 | 0.0157 | 0.0151 | 0.0137 |
| 30 | 0.0115 | 0.0108 | 0.0113 | 0.0103 | 0.0084 | 0.0074 | 0.0077 | 0.0134 | 0.0143 | 0.0157 | 0.0177 | 0.0134 |
| 35 | 0.0133 | 0.0118 | 0.0147 | 0.0162 | 0.0141 | 0.0099 | 0.0087 | 0.0123 | 0.0169 | 0.0188 | 0.0211 | 0.0168 |
| 40 | 0.0163 | 0.0149 | 0.0190 | 0.0203 | 0.0182 | 0.0127 | 0.0093 | 0.0154 | 0.0230 | 0.0278 | 0.0276 | 0.0236 |
| 45 | 0.0189 | 0.0178 | 0.0231 | 0.0248 | 0.0233 | 0.0173 | 0.0068 | 0.0157 | 0.0266 | 0.0318 | 0.0338 | 0.0274 |
| 50 | 0.0225 | 0.0209 | 0.0239 | 0.0250 | 0.0238 | 0.0202 | 0.0105 | 0.0230 | 0.0354 | 0.0391 | 0.0406 | 0.0374 |
| 55 | 0.0257 | 0.0204 | 0.0223 | 0.0211 | 0.0221 | 0.0184 | 0.0117 | 0.0244 | 0.0405 | 0.0421 | 0.0439 | 0.0453 |
| 60 | 0.0277 | 0.0175 | 0.0167 | 0.0165 | 0.0143 | 0.0153 | 0.0114 | 0.0281 | 0.0427 | 0.0389 | 0.0440 | 0.0513 |
| Average value within 90° range (polar angle 20°) | | | | 0.008 | | | | | | 0.011 | | | |
| Direction of glasses | | | | Left | | | | | | Downward | | | |

As a result, compared to a predetermined polar angle (here, polar angle 20°, for example), the chromatic change of the glasses 220 was greater in the left and right directions than in a diagonal direction, for example, the 45° azimuth or 225° azimuth.

EXAMPLE 1

Active shutter glasses of Example 1 have a configuration similar to that of the active shutter glasses 220 of reference 1. However, the present Example rotates the respective configurations of the right and left shutter sections of the glasses 220 by a predetermined angle with reference to the results of Table 1. To be more specific, each component was rotated so that at polar angle 20°, the azimuth at which the amount of light leakage was smaller than the average amount of light leakage at all measured azimuths (10.70 cd/m²), for example, the 135° azimuth (7.62 cd/m²) became a lateral direction. Furthermore, the 315° azimuth which is an azimuth opposite to the 135° azimuth was arranged in the lateral direction on the opposite side. Furthermore, the 45° azimuth and 225° azimuth of the glasses 220 were arranged in a longitudinal direction. Any one of the 45° azimuth and 225° azimuth may be arranged so as to face downward, but the 225° azimuth with less light leakage was arranged in the downward direction. That is, with the active shutter glasses of Example 1, the 135° azimuth of the glasses 220 was the left direction, the 315° azimuth of the glasses 220 was the right direction, the 225° azimuth of the glasses 220 was the downward direction and the 45° azimuth of the glasses 220 at which light leakage was largest was the upward direction. Furthermore, in the present Example, both the right and left shutter sections of the glasses 220 were rotated in the same direction and by the same angle.

When images for the right eye and the left eye were displayed on a 3D display device which was long in the lateral direction and the images were observed using the active shutter glasses of Example 1, it was possible to view clear stereoscopic images with less double image on the entire screen. This is because since light leakage was small on the right and left sides of the right and left shutter sections, when one shutter section was closed, an image displayed for the other shutter section was possibly hardly mixed in from the right and left sides of the shutter section (one shutter section).

Regarding stereoscopic images, a phenomenon that an image displayed for one shutter section is mixed in another image for the other shutter section is called "crosstalk." For a stereoscopic image projection system, it is a problem how to reduce this crosstalk to provide a clear and accurate stereoscopic image.

The present Example determined the axial directions of the right and left shutter sections with reference to a value at polar angle 20°. This is because as described using FIG. 5, the viewing angle of the observer who observes an image at a viewing distance of 3 H was assumed to be approximately ±20° in the lateral direction. However, since there are individual differences in the viewing distance, values at other than polar angle 20° may also be referenced, and since the viewing angle of the observer whose observes the image at a viewing distance of, for example, 1.5 H is on the order of ±30° in the lateral direction, the axial directions of the right and left shutter sections may be determined with reference to the value at polar angle 30°.

Figure 18:
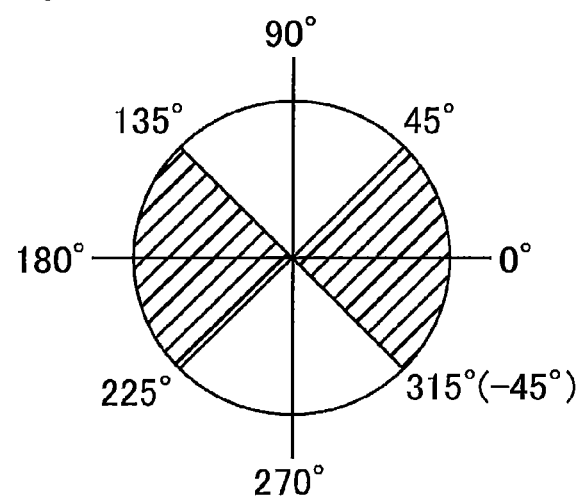
FIG. 18 is a schematic diagram illustrating azimuths of the active shutter glasses according to Embodiments 1, 2 and 4.

Furthermore, for the active shutter glasses of Example 1, the entire azimuth (360°) was divided into four equal regions and an average amount of light leakage value in each region was calculated. To be more specific, as shown in FIG. 18, an average amount of light leakage value at each of the −45° to 45° azimuth, 45° to 135° azimuth, 135° to 225° azimuth and 225° to 315° azimuth was calculated. For these calculations, the result of Table 1 and the value at polar angle 20° were used. As a result, the average value at the 45° to 135° azimuth (upward direction) was 17.16 cd/m², and the average value at the 225° to 315° azimuth (downward direction) was 9.67 cd/m², whereas the average value at the 135° to 225° azimuth (left direction) was 7.75 cd/m² and the average value at the −45° to 45° azimuth (right direction) was 6.70 cd/m². Thus, it was possible to confirm that light leakage during light-shielding was smaller in the average value within a 90° range centered on the lateral direction than the average value within a 90° range centered on the longitudinal direction. It was also possible to confirm that light leakage (average value) during light-shielding in a 90° range of the 45° to 135° azimuth centered on the upward direction was greater than light leakage (average value) during light-shielding in another 90° range and the greatest among the four average values.

EXAMPLE 2

Figure 19:
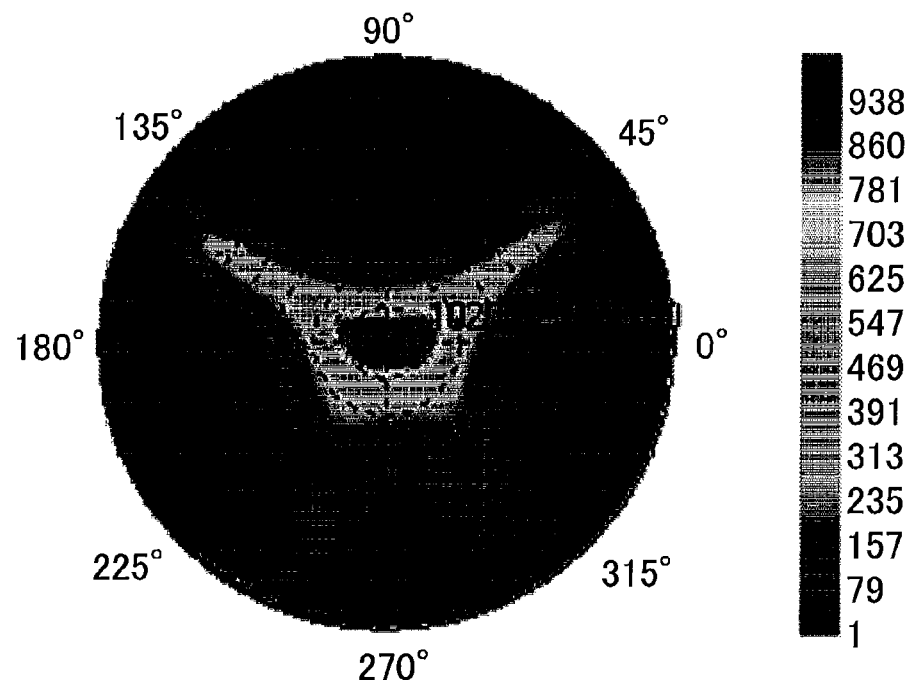
FIG. 19 is a diagram illustrating a viewing angle characteristic (CR ratio) of active shutter glasses of Embodiment 2.

Active shutter glasses according to Example 2 have a configuration similar to that of the active shutter glasses 220 of reference 1. However, the present Example rotated each component of the right and left shutter sections of the glasses 220 by a predetermined angle with reference to the results of Table 2. To be more specific, each component was rotated so that an azimuth at which the CR ratio was higher than the average of CR ratios (539) at the measured entire azimuth range at polar angle 15°, for example, the 135° azimuth (630) became the lateral direction. Furthermore, the 315° azimuth which is an azimuth opposite to the 135° azimuth was arranged in the lateral direction on the opposite side. Furthermore, the 45° azimuth and 225° azimuth of the glasses 220 were arranged in the longitudinal direction. Any one of the 45° azimuth and 225° azimuth may be arranged so as to face downward, but the 225° azimuth at which the CR ratio was higher was arranged in the downward direction. That is, for the active shutter glasses of Example 2, the 135° azimuth of the of the glasses 220 was the left direction, the 315° azimuth of the glasses 220 was the right direction, the 225° azimuth of the glasses 220 was the downward direction and the 45° azimuth of the glasses 220 at which the contrast ratio was the lowest was the upward direction. As a result, the viewing angle characteristic relating to the contrast ratio of the active shutter glasses of Example 2 was substantially symmetric in the horizontal direction as shown in FIG. 19. That is, the viewing angle characteristic became substantially symmetric with respect to the axis along the 90° azimuth and 270° azimuth. Furthermore, in the present Example, both the right and left shutter sections of the glasses 220 were rotated in the same direction and by the same angle.

When images for the right eye and the left eye are displayed on a 3D display device which was long in the lateral direction and the images are observed using the active shutter glasses of Example 2, it was possible to view clear stereoscopic images with less double image on the entire screen. This is because since the CR ratios on the right and left sides of the right and left shutter sections were high and light leakage was small, when one shutter section was closed, an image displayed for the other shutter section was hardly mixed in from the right and left sides of the shutter section (one shutter section). Furthermore, no double image was observed at the left end or the right end of the screen, and this is because the viewing angle characteristics of the right and left shutter sections were substantially symmetric with respect to the axis along the 90° azimuth and 270° azimuth respectively, that is, symmetric in the horizontal direction. From such a standpoint, the shutter sections each are preferably arranged so that the viewing angle characteristic is symmetric with respect to the axis along the 90° azimuth and 270° azimuth.

Furthermore, for the active shutter glasses of Example 2, the entire azimuth range (360°) was divided into four equal regions and an average value of CR ratios in each region was calculated. To be more specific, as shown in FIG. 18, average values of CR ratios at the −45° to 45° azimuth, 45° to 135° azimuth, 135° to 225° azimuth and 225° to 315° azimuth were calculated respectively. For these calculations, the results in Table 2 and the value at polar angle 15° were used. As a result, the average value at the 45° to 135° azimuth (upward direction) was 333, the average value at the 225° to 315° azimuth (downward direction) was 403, whereas the average value at the 135° to 225° azimuth (left direction) was 585 and the average value at the −45° to 45° azimuth (right direction) was 663. Thus, it was possible to confirm that the average value of CR ratios was higher within a 90° range centered on the lateral direction than the average value within a 90° range centered on the longitudinal direction. Furthermore, it was also possible to confirm that the contrast ratio (average value) within a 90° range at the 45° to 135° azimuth centered on the upward direction was lower than the contrast ratio (average value) within another 90° range and was the lowest among the four average values.

Figure 37:
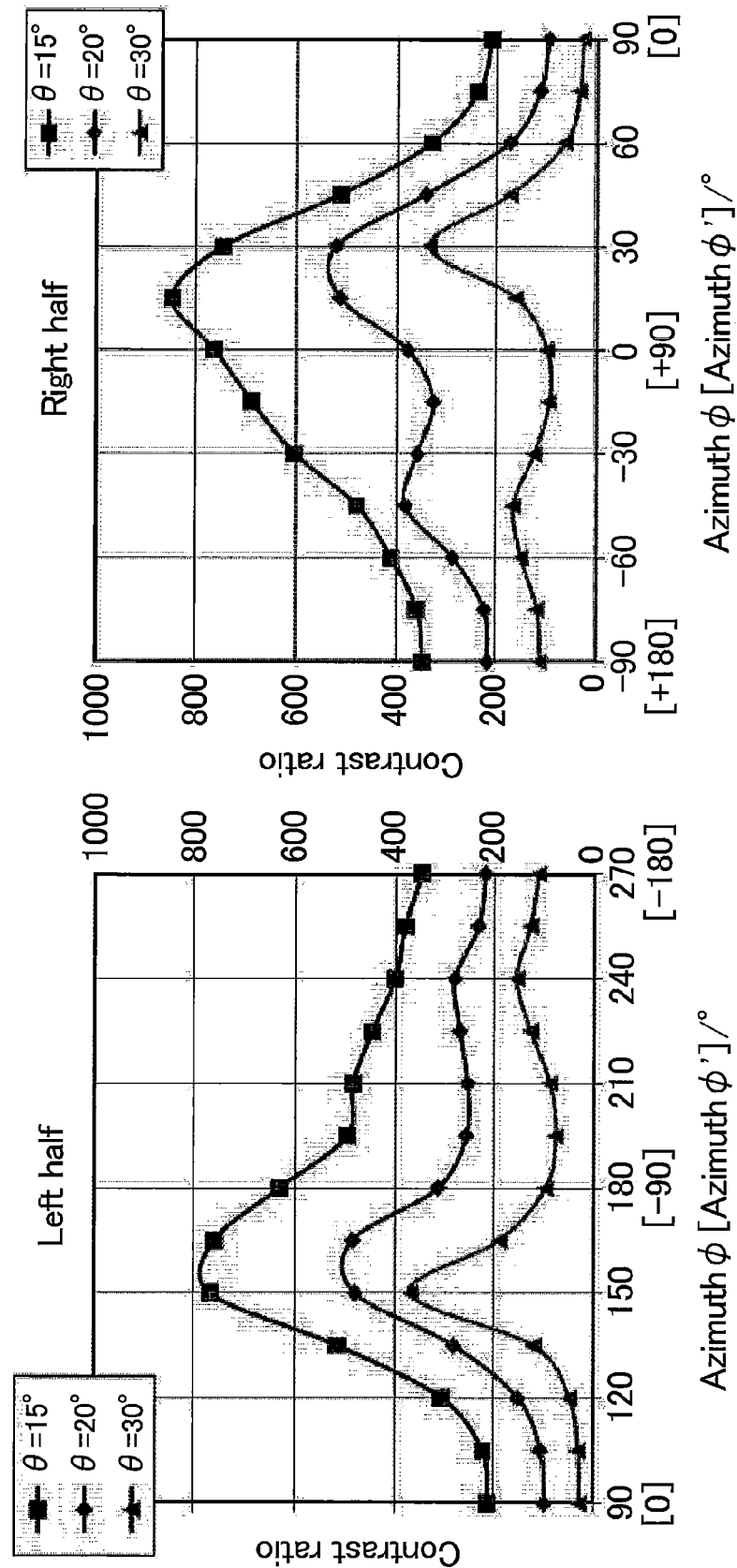
FIG. 37 is a graph illustrating CR ratio curves corresponding to the azimuths φ and φ' at polar angle θ=15°, 20° and 30° calculated from FIG. 19 with the upper row illustrating results of the right half (azimuth φ=90° to −90°, φ'=0° to +180°) and the lower row illustrating results of the left half (azimuth φ=90° to 270°, φ'=0° to −180°)

FIG. 37 is a graph illustrating CR ratio curves with respect to azimuths ϕ and ϕ' at polar angle θ=15°, 20° and 30° calculated from FIG. 19. The upper row in FIG. 37 shows results of the right half (azimuth ϕ=90° to −90°, azimuth ϕ'=0° to +180°) and the lower row shows results of the left half (azimuth ϕ=90° to 270°, azimuth ϕ'=0° to −180°). The curves in FIG. 37 were determined based on values of CR ratios at 24 azimuths obtained by dividing the entire azimuth range into 24 equal portions. When the viewing angle characteristic is substantially symmetric with respect to an axis along the 90° azimuth and 270° azimuth, that is symmetric in the horizontal direction, both curves of the viewing angle characteristics in the right half and left half are symmetric at an arbitrary identical polar angle θ. The "symmetry in the horizontal direction" is determined by the magnitude of the maximum value (or minimum value) of curves at a plurality of polar angles θ, the number thereof, position [azimuth ϕ'] or the like. When maximum (minimum) points of both curves of substantially the same magnitude exist within a range of absolute value ±15° of an arbitrary [azimuth ϕ'] at a plurality of polar angles θ, the curves are determined to be symmetric in the horizontal direction. That is, even when the viewing angle characteristic is substantially symmetric with respect to an axis along the 90° azimuth and 270° azimuth, both curves need not be exactly symmetric. In the example of FIG. 37, there are maximum points on the same order of magnitude within a range in which absolute values of [azimuth ϕ'] are 75°±15° at θ=15° and θ=20° and within a range in which absolute values of [azimuth ϕ'] are 60°±15° at θ=30°. Therefore, the magnitude of maximum points, number thereof and position can be said to be the same at a plurality of polar angles θ and the right and left shutter sections are determined to have symmetric viewing angle characteristics in the horizontal direction.

Figure 38:
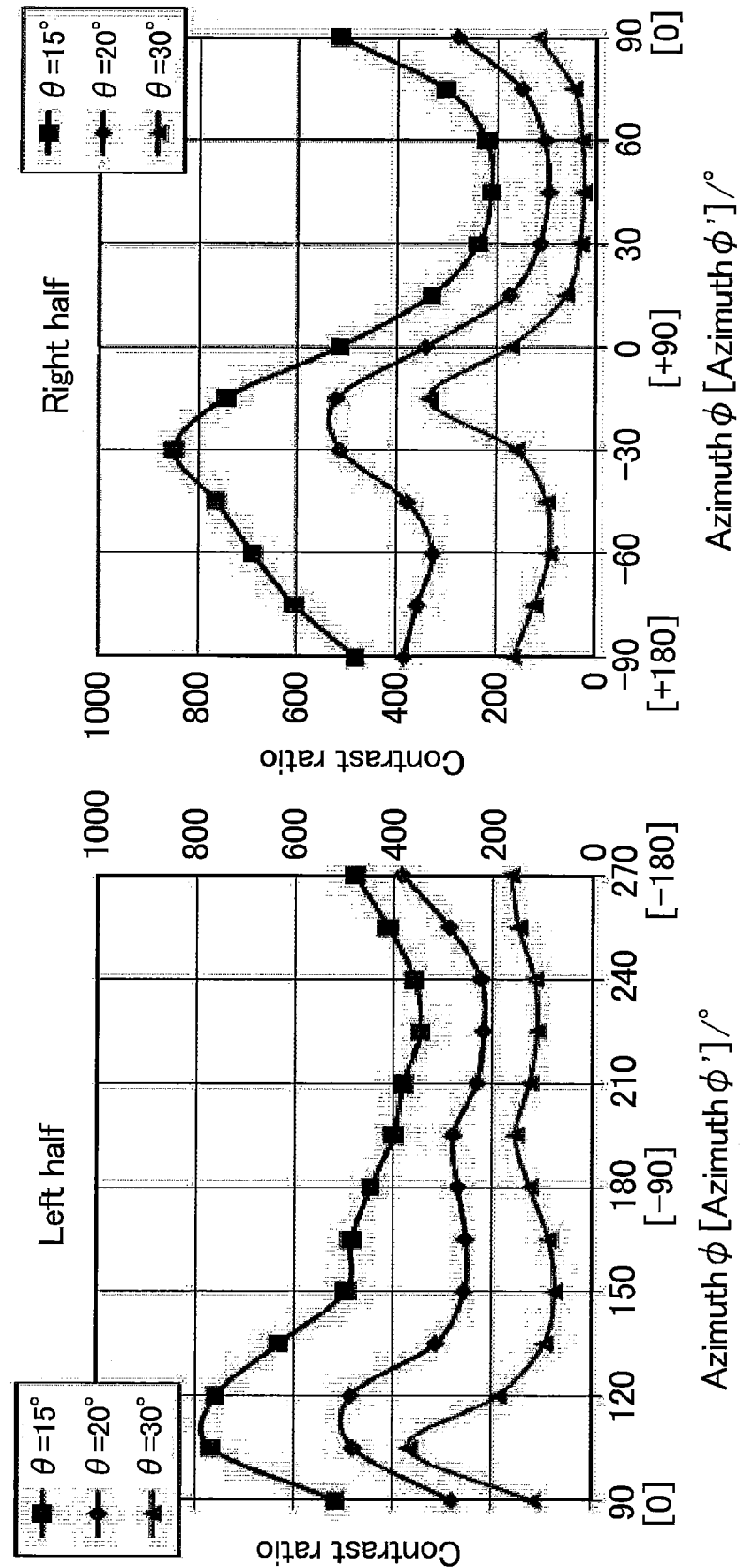
FIG. 38 is a graph illustrating CR ratio curves corresponding to the azimuths φ and φ' at polar angle θ=15°, 20° and 30° calculated from FIG. 15 with the upper row illustrating results of the right half (azimuth φ=90° to −90°, φ'=0° to +180°) and the lower row illustrating results of the left half (azimuth φ=90° to 270°, φ'=0° to −180°)

For reference, in the case of an asymmetric viewing angle characteristic as shown in FIG. 15, a graph similar to that in FIG. 37 is created, and this graph is shown in FIG. 38. Two curves at an arbitrary identical polar angle θ have random maximum values, numbers thereof and positions [azimuth ϕ'] and there is no symmetry in the shapes of both curves.

EXAMPLE 3

Active shutter glasses according to Example 3 have a configuration similar to that of the active shutter glasses 220 of reference 1. However, the present Example rotated the respective components of the right and left shutter sections of the glasses 220 by a predetermined angle with reference to the results of FIG. 16 and Table 3. To be more specific, the present Example rotated the respective components so that the 135° azimuth and 315° azimuth having high CR ratios at polar angle ±17° became the lateral direction. In TN or STN alignment, this caused center molecules to be aligned along the longitudinal direction. In this case, the 45° azimuth and 225° azimuth which are orthogonal to the axis along the 135° azimuth and 315° azimuth become the longitudinal direction, and the right and left shutter sections are preferably arranged such that the 45° azimuth having a lower contrast ratio becomes the upward direction.

When images for the right eye and the left eye were displayed on a 3D display device which was long in the lateral direction and the images were observed using the active shutter glasses of Example 3, it was possible to view clear stereoscopic images with less double image on the entire screen. This is because since the CR ratios on the right and left sides of the right and left shutter sections were high and light leakage was small, when one shutter section was closed, an image displayed for the other shutter section was hardly mixed in from the right and left sides of the shutter section (one shutter section).

EXAMPLE 4

Active shutter glasses according to Example 4 have a configuration similar to that of the active shutter glasses 220 of reference 1. However, the present Example rotated each component of the right and left shutter sections of the glasses 220 by a predetermined angle with reference to the results of Table 4. To be more specific, each component was rotated so that an azimuth at which a chromatic change was smaller than an average of chromatic changes (0.0105) during actual drive at all measured azimuths at polar angle 20°, for example, 45° azimuth (0.0094) became the lateral direction. Furthermore, the 225° azimuth which is an azimuth opposite to the 45° azimuth was arranged in the lateral direction which was the opposite side. Furthermore, the 135° azimuth and 315° azimuth of the glasses 220 were arranged in the longitudinal direction. Any one of the 135° azimuth and 315° azimuth may be arranged so as to face downward, but the 315° azimuth with a smaller chromatic change was arranged in the downward direction. That is, with the active shutter glasses of Example 4, the 225° azimuth of the glasses 220 became the left direction, the 45° azimuth of the glasses 220 became the right direction, the 315° azimuth of the glasses 220 became the downward direction and the 135° azimuth of the glasses 220 became the upward direction. Furthermore, the present Example rotated both the right and left shutter sections of the glasses 220 in the same direction and by the same angle.

When images for the right eye and the left eye were displayed on a 3D display device which was long in the lateral direction and the images were observed using the active shutter glasses of Example 4, it was possible to view clear stereoscopic images with less chromatic change on the entire screen. This is because since the chromatic changes on the right and left sides of the right and left shutter sections were small, even when the right and left eyes were moved more drastically in the lateral direction, the chromatic change was suppressed.

Furthermore, with the active shutter glasses of Example 4, the entire azimuth range (360°) was divided into four equal regions and an average amount of light leakage value in each region was calculated. To be more specific, averages of chromatic change values were calculated at the −45° to 45° azimuth, 45° to 135° azimuth, 135° to 225° azimuth and 225° to 315° azimuth respectively as shown in FIG. 18. For these calculations, the results of Table 4 and the value at polar angle 20° were used. As a result, the average value at the 45° to 135° azimuth (upward direction) was 0.012 and the average value at the 225° to 315° azimuth (downward direction) was 0.011, whereas the average value at the 135° to 225° azimuth (left direction) was 0.008 and the average value at the −45° to 45° azimuth (right direction) was 0.006. Thus, it was possible to confirm that a chromatic change during actual drive in the average value within the 90° range centered on the lateral direction was smaller than the average value in the 90° range centered on the longitudinal direction. Furthermore, it was also possible to confirm that a chromatic change (average value) in the 90° range of the 45° to 135° azimuth centered on the upward direction was greater than a chromatic change (average value) in another 90° range and was the greatest among the four average values.

When the CR ratio of the active shutter glasses is sufficient or when characteristics other than the chromatic change have a greater influence on the image quality, the axial directions of the right and left shutter sections may be determined with attention focused on those characteristics.

A case has been described in Examples 1 to 4 above where the active shutter glasses were not provided with any λ/4 plate. Since the glasses in Examples 1 to 4 are the glasses 220 of reference 1 rotated by a predetermined angle, when the liquid crystal display device 111 is used as a 3D display device, the direction of the transmission axis 224*t* of the outside polarizer 224 does not normally match the direction of the transmission axis 117*t* of the front polarizer film 117 of the liquid crystal display device 111. Thus, when the liquid crystal display device 111 is used as the 3D display device, the glasses of Examples 1 to 4 are preferably provided with a λ/4 plate outside the outside polarizer 224 as in the case of modification example 1 above. According to this mode, a circular polarizer (λ/4 plate and outside polarizer 224) whose transmissivity is constant irrespective of the polarization azimuth of incident light (circularly polarized light) is provided outside the glasses of Examples 1 to 4, and further, the polarized state of light emitted from the liquid crystal display device 111 is optimized to circularly polarized light to maximize transmissivity of the glasses of Examples 1 to 4. Thus, in this mode, circularly polarized light is emitted from the liquid crystal display device 111 and circularly polarized light is impinged on the glasses of Examples 1 to 4. Therefore, the display is never darkened no matter in which direction the polarizers 222, 224 and liquid crystal cell 223 are arranged. That is, an always clear stereoscopic image is obtained without being accompanied by increase of power consumption. Furthermore, it is possible to easily set the viewing angle of the right and left shutter sections so as to be wider on the right and left sides without being concerned about degradation of luminance. Furthermore, the display is never darkened even when the observer turns his/her head (glasses in Examples 1 to 4) and it is thereby possible to obtain an always clear stereoscopic image without being accompanied by increase of power consumption. Furthermore, an always good shutter effect can be obtained irrespective of relative positional relationships between the glasses of Examples 1 to 4 and the liquid crystal display device 111.

(Embodiment 2)

Figure 20:
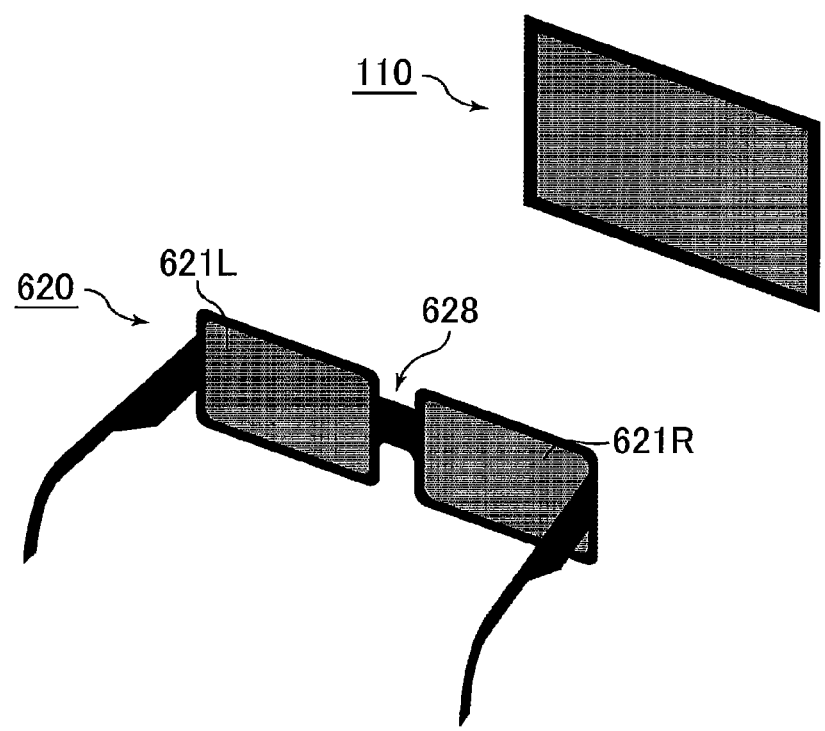
FIG. 20 is a schematic perspective view illustrating a configuration of a stereoscopic image projection system of Embodiment 2.

The active stereoscopic image projection system according to the present embodiment is configured by including the same video display device (3D display device) 110 as Embodiment 1 and active shutter glasses 620 as shown in FIG. 20. Thus, the present embodiment is different from Embodiment 1 only in the configuration of the active shutter glasses, and therefore description of other parts will be omitted.

The glasses 620 include a shutter section for the right eye 621R and a shutter section for the left eye 621L. Light transmission and light-shielding (opening/closing) of the shutter sections 621R and 621L are alternately switched. As shown in FIG. 2, the switching timing is in synchronization with an R signal and an L signal.

Figure 21:
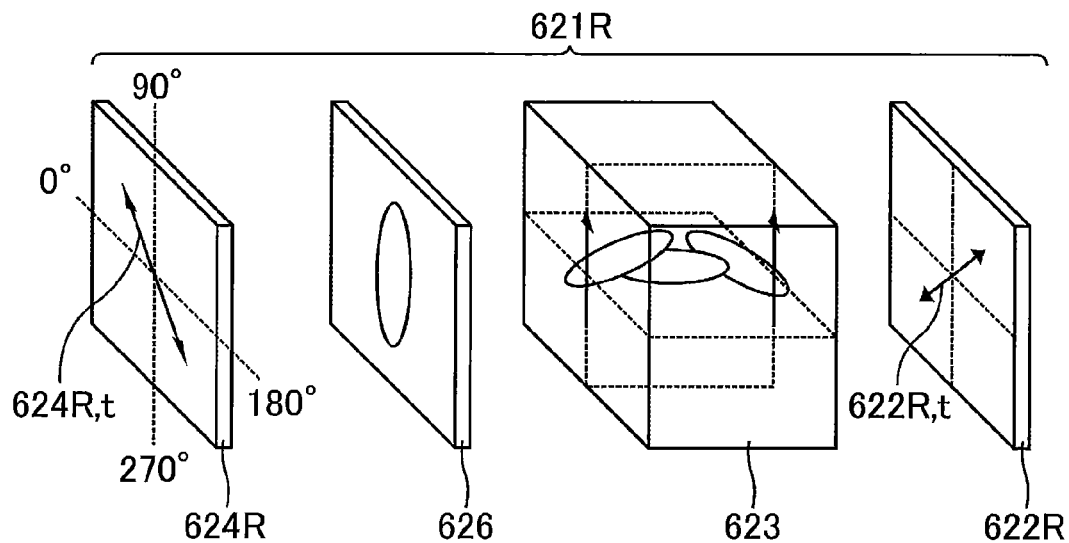
FIG. 21 is a schematic perspective view illustrating a configuration of active shutter glasses of Embodiment 2.

The shutter section 621R is provided with a linear polarizer (inside polarizer) 622R, a liquid crystal cell 623, a viewing angle compensation film 626 and a linear polarizer (outside polarizer) 624R in the stated order from the inside as shown in FIG. 21.

Figure 22:
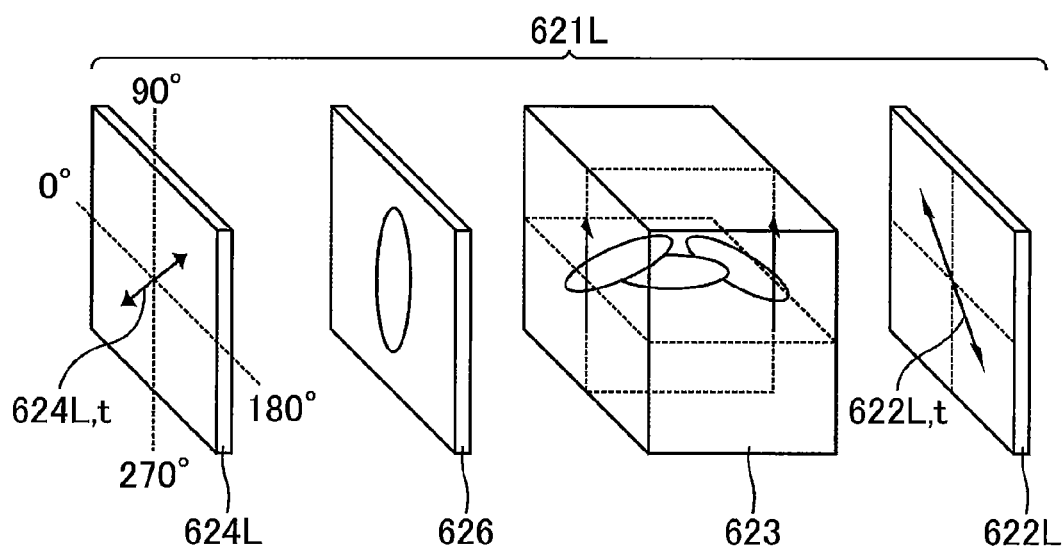
FIG. 22 is a schematic perspective view illustrating a configuration of the active shutter glasses of Embodiment 2.

On the other hand, the shutter section 621L is provided with a linear polarizer (inside polarizer) 622L, a liquid crystal cell 623, a viewing angle compensation film 626 and a linear polarizer (outside polarizer) 624L in the stated order from the inside as shown in FIG. 22.

Thus, the only difference between the shutter section 621L and the shutter section 621R lies in the directions of the axes of the inside polarizer and the outside polarizer.

The polarizers 622R and 624R may be disposed in a parallel-Nicol state with each other, but they are normally disposed in a cross-Nicol state with each other. To be more specific, the angle formed between a transmission axis 622R,t of the inside polarizer 622R and a transmission axis 624R,t of the outside polarizer 624R is set to be within a range of 90°±15° (preferably 90°±5°). The transmission axis 622R,t of the inside polarizer 622R is set to be within a range of ±15° (preferably ±5°) from the direction along the 135° azimuth and 315° azimuth and the transmission axis 624R,t of the outside polarizer 624R is set to be within a range of ±15° (preferably ±5°) from the direction along the 45° azimuth and 225° azimuth. These numerical value ranges include boundary values.

The polarizers 622L and 624L may be disposed in a parallel-Nicol state with each other, but they are normally disposed in a cross-Nicol state with each other. To be more specific, the angle formed between a transmission axis 622L,t of the inside polarizer 622L and a transmission axis 624L,t of the outside polarizer 624L is set to be within a range of 90°±15° (preferably 90°±5°). The transmission axis 622L,t of the inside polarizer 622L is set to be within a range of ±15° (preferably ±5°) from the direction along the 45° azimuth and 225° azimuth and the transmission axis 624L,t of the outside polarizer 624L is set to be within a range of ±15° (preferably ±5°) from the direction along the 135° azimuth and 315° azimuth. These numerical value ranges include boundary values.

The liquid crystal mode of the liquid crystal cell 623 is an OCB mode and the liquid crystal cell 623 is provided with two transparent substrates, a liquid crystal layer interposed between these two substrates and two transparent electrodes formed on the two substrates respectively. The liquid crystal layer includes nematic liquid crystal molecules whose dielectric anisotropy is negative. The major axes of the liquid crystal molecules are inclined in the aligning treatment direction (e.g., rubbing direction) on the substrate surface, and the liquid crystal molecules are in a bend-alignment state in the liquid crystal layer as a whole. The aligning treatment directions of the two substrates are both set to a 90°±15° azimuth (preferably 90°±5° azimuth). These numerical value ranges include boundary values.

In the shutter section 621R, the aligning treatment direction of the outside substrate forms an angle of approximately 45° with the transmission axis 624R,t of the outside polarizer 624R, and the aligning treatment direction of the inside substrate forms an angle of approximately 45° with the transmission axis 622R,t of the inside polarizer 622R. To be more specific, the angle formed between the aligning treatment direction of the outside substrate and the transmission axis 624R,t of the outside polarizer 624R is set to be within a range of 45°±15° (preferably 45°±5°) and the angle formed between the aligning treatment direction of the inside substrate and the transmission axis 622R,t of the inside polarizer 622R is set to be within a range of 45°±15° (preferably 45°±5°). These numerical value ranges include boundary values.

In the shutter section 621L, the aligning treatment direction of the outside substrate forms an angle of approximately 45° with the transmission axis 624L,t of the outside polarizer 624L and the aligning treatment direction of the inside substrate forms an angle of approximately 45° with the transmission axis 622L,t of the inside polarizer 622L. To be more specific, the angle formed between the aligning treatment direction of the outside substrate and the transmission axis 624L,t of the outside polarizer 624L is set to be within a range of 45°±15° (preferably 45°±5°) and the angle formed between the aligning treatment direction of the inside substrate and the transmission axis 622L,t of the inside polarizer 622L is set to be within a range of 45°±15° (preferably 45°±5°). These numerical value ranges include boundary values.

The liquid crystal cell 623 is not particularly limited as long as it is possible to secure a degree of response time that allows synchronization with the frame rate of the display device 110. The liquid crystal mode of the liquid crystal cell 623 may be a TN mode, STN mode, VA mode, IPS mode, FLC mode or the like in addition to the OCB mode.

The viewing angle compensation film 626 has a function of compensating the viewing angle during light-shielding of the shutter sections 621R and 621L, and includes, for example, a biaxial retardation film.

As described above, the shutter sections 621R and 621L have substantially symmetric configurations. To be more specific, the transmission axis 622R,t of the inside polarizer 622R and the transmission axis 622L,t of the inside polarizer 622L are arranged substantially symmetrically to each other, and the transmission axis 624R,t of the outside polarizer 624R and the transmission axis 624L,t of the outside polarizer 624L are arranged substantially symmetrically to each other, the alignment (alignment direction) of the liquid crystal layer of the shutter section 621R and the alignment (alignment direction) of the liquid crystal layer of the shutter section 621L are arranged substantially symmetrically to each other, and the optic axis of the viewing angle compensation film 626 of the shutter section 621R and the optic axis of the viewing angle compensation film 626 of the shutter section 621L are arranged substantially symmetrically to each other. Here, the center line running in the longitudinal direction between the shutter sections 621R and 621L serves as an axis of symmetry. Thus, the shutter section 621R and the shutter section 621L are the same except that elements affecting their viewing angle characteristics are set to be symmetric and arranged so as to have configurations symmetric to each other. Furthermore, liquid crystal molecules of the liquid crystal layer of the shutter section 621R are aligned symmetrically to liquid crystal molecules of the liquid crystal layer of the shutter section 621L.

Figure 23:
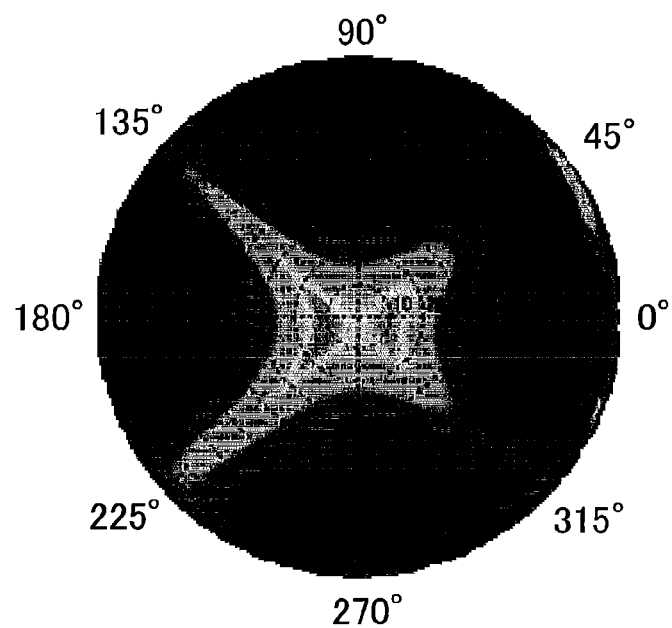
FIG. 23 is a diagram illustrating a viewing angle characteristic (CR ratio) of the active shutter glasses of Embodiment 2.
Figure 24:
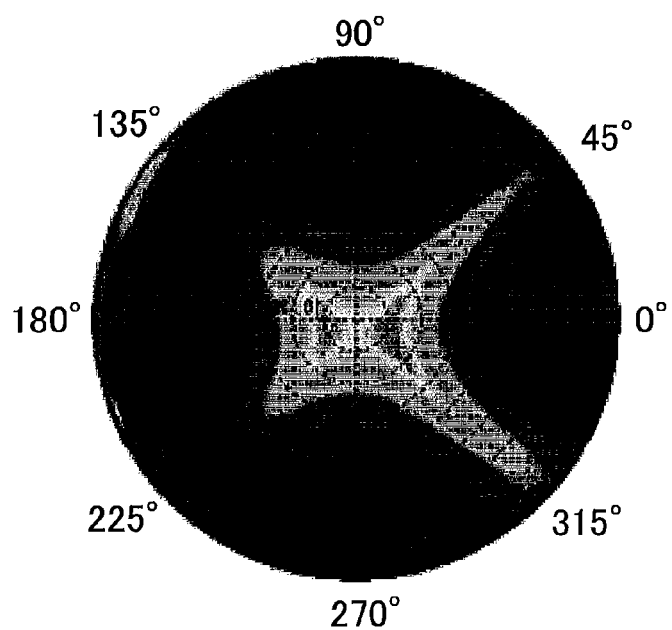
FIG. 24 is a diagram illustrating a viewing angle characteristic (CR ratio) of the active shutter glasses of Embodiment 2.

Active shutter glasses using liquid crystal generally have a viewing angle characteristic asymmetric in the vertical and horizontal directions caused by asymmetry of liquid crystal alignment. In the present embodiment, the shutter section 621R also has a viewing angle characteristic (CR characteristic) asymmetric in the vertical and horizontal directions as shown, for example, in FIG. 23, and the shutter section 621L has a viewing angle characteristic (CR characteristic) asymmetric in the vertical and horizontal directions as shown, for example, in FIG. 24.

Figure 25:
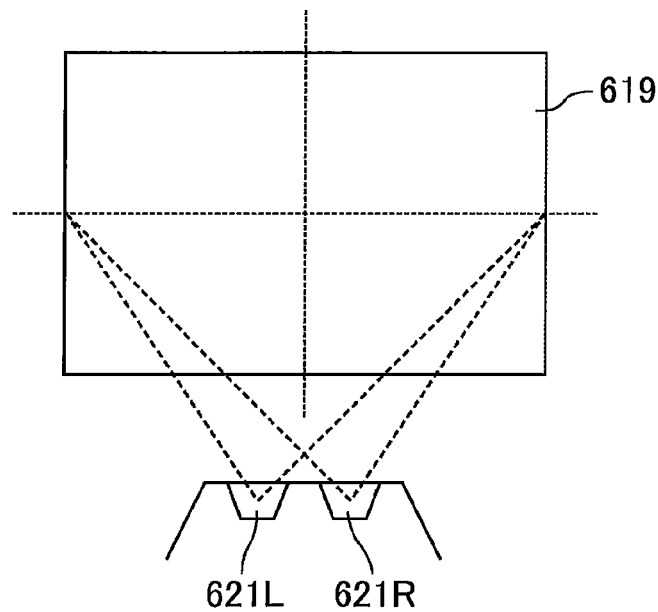
FIG. 25 is a schematic plan view illustrating a configuration of the video display device of Embodiment 2.

The display device 110 is generally provided with a landscape oriented screen 619 such as TV, movie theater screens or the like as shown in FIG. 25. Furthermore, when the observer observes a stereoscopic image from the front, the shutter sections 621R and 621L are required to have viewing angle characteristics wide and symmetric in the lateral direction.

Thus, according to the present embodiment, when the glasses 620 are worn, the viewing angles of the shutter sections 621R and 621L each are wider on the right and left sides than on the upper and lower sides. Furthermore, the viewing angles of the shutter sections 621R and 621L each are wider on opposite sides (outside) of a connecting part 628 between the shutter sections 621R and 621L, that is, the temple side of the glasses 620 than the connecting part 628 side, that is, the bridge side and nose pad side of the glasses 620. Furthermore, the viewing angle characteristic of the shutter section 621R is substantially symmetric to the viewing angle characteristic of the shutter section 621L. That is, the shutter section 621R and the shutter section 621L are arranged so that both viewing angle characteristics are symmetric. Therefore, according to the present embodiment, it is possible to satisfy the viewing angle characteristic required when the observer observes a stereoscopic image from the front.

Furthermore, when light leakage of the shutter sections 621R and 621L in a light-shielded state is measured at four or more azimuths and at a predetermined polar angle, an average amount of light leakage at the −90° to 90° azimuth of the shutter section 621R is preferably smaller than an average amount of light leakage at the 90° to 270° azimuth of the shutter section 621R, and an average amount of light leakage at the 90° to 270° azimuth of the shutter section 621L is preferably smaller than an average amount of light leakage at the −90° to 90° azimuth of the shutter section 621L.

Furthermore, when light leakage of the shutter section 621R and 621L in the light-shielded state is measured at eight or more azimuths and at a predetermined polar angle, an average amount of light leakage at the −45° to 45° azimuth of the shutter section 621R is preferably smaller than an average amount of light leakage at the 45° to 135° azimuth and 225° to 315° azimuth of the shutter section 621R, that is, an average amount of light leakage at the 45° to 135° azimuth of the shutter section 621R and an average amount of light leakage at the 225° to 315° azimuth of the shutter section 621R, and an average amount of light leakage at the 135° to 225° azimuth of the shutter section 621L is preferably smaller than an average amount of light leakage at the 45° to 135° azimuth and 225° to 315° azimuth of the shutter section 621L, that is, an average amount of light leakage at the 45° to 135° azimuth of the shutter section 621L and an average amount of light leakage at the 225° to 315° azimuth of the shutter section 621L.

In this way, it is possible to view clear stereoscopic images with less double image on the entire screen.

Furthermore, when contrast ratios of the shutter sections 621R and 621L are measured at four or more azimuths and at a predetermined polar angle, an average of contrast ratios of the shutter section 621R at the −90° to 90° azimuth is preferably higher than an average of contrast ratios of the shutter section 621R at the 90° to 270° azimuth and an average of contrast ratios of the shutter section 621L at the 90° to 270° azimuth is preferably higher than an average of contrast ratios of the shutter section 621L at the −90° to 90° azimuth.

Furthermore, when the contrast ratios of the shutter sections 621R and 621L are measured at eight or more azimuths and at a predetermined polar angle, an average of contrast ratios of the shutter section 621R at the −45° to 45° azimuth is preferably higher than an average of contrast ratios of the shutter section 621R at the 45° to 135° azimuth and 225° to 315° azimuth, that is, an average of contrast ratios of the shutter section 621R at the 45° to 135° azimuth and an average of contrast ratios of the shutter section 621R at the 225° to 315° azimuth, and an average of contrast ratios of the shutter section 621L at the 135° to 225° azimuth is preferably higher than an average of contrast ratios of the shutter section 621L at the 45° to 135° azimuth and 225° to 315° azimuth, that is, an average of contrast ratios of the shutter section 621L at the 45° to 135° azimuth and an average of contrast ratios of the shutter section 621L at the 225° to 315° azimuth.

In this way, it is possible to view clear stereoscopic images with less double image on the entire screen.

Furthermore, when a chromatic change of the shutter sections 621R and 621L is measured, with the shutter sections 621R and 621L being actually driven at four or more azimuths and at a predetermined polar angle, an average of chromatic changes of the shutter section 621R at the −90° to 90° azimuth is preferably smaller than an average of chromatic changes of the shutter section 621R at the 90° to 270° azimuth and an average of chromatic changes of the shutter section 621L at the 90° to 270° azimuth is preferably smaller than an average of chromatic changes of the shutter section 621L at the −90° to 90° azimuth.

Furthermore, when a chromatic change of the shutter sections 621R and 621L is measured, with the shutter section 621R and 621L being actually driven at eight or more azimuths and at a predetermined polar angle, an average of chromatic changes of the shutter section 621R at the −45° to 45° azimuth is preferably smaller than an average of chromatic changes of the shutter section 621R at the 45° to 135° azimuth and 225° to 315° azimuth, that is, an average of chromatic changes of the shutter section 621R at the 45° to 135° azimuth and an average of chromatic changes of the shutter section 621R at the 225° to 315° azimuth, and an average of chromatic changes of the shutter section 621L at the 135° to 225° azimuth is preferably smaller than an average of chromatic changes of the shutter section 621L at the 45° to 135° azimuth and 225° to 315° azimuth, that is, an average of chromatic changes of the shutter section 621L at the 45° to 135° azimuth and an average of chromatic changes of the shutter section 621L at the 225° to 315° azimuth.

Thus, it is possible to view clear stereoscopic images with less chromatic change on the entire screen.

However, the above-described four or more azimuths and eight or more azimuths are arranged uniformly among all azimuths.

The above-described four or more azimuths are preferably, eight or more azimuths, more preferably 12 or more azimuths and further preferably 24 or more azimuths.

Furthermore, the above-described eight or more azimuths are preferably 12 or more azimuths and more preferably 24 or more azimuths.

Furthermore, the above-described predetermined polar angle is not particularly limited, but normally determined within a range greater than 0° and smaller than 90°, and preferably determined within a range of 5° to 45° (more preferably 8° to 30°).

The viewing angle characteristic that can be evaluated in the present embodiment can also include the following angle characteristics.

Chromatic change when shutter section is in light transmission state

Transmissivity characteristic when shutter section is in light transmission state Transmissivity while shutter section is being actually driven Amount of crosstalk while shutter section is being actually driven As in the case of Embodiment 1, specific examples of the chromatic change include color difference such as Δu'v' and ΔC*ab.

Furthermore, when evaluating a system for viewing a stereoscopic image by displaying images for the right eye and the left eye on a time-division basis in particular, it is preferable to evaluate its viewing angle characteristic with the active shutter glasses being actually driven.

Furthermore, when using the liquid crystal display device 111 described in Embodiment 1 as the display device 110, it is preferable to adopt modification example 2 shown below from the same standpoint as that of Embodiment 1.

As shown in FIG. 9, the liquid crystal display device 111 is provided with a backlight 112, a linear polarizer (back polarizer film) 113, a viewing angle compensation film 114, a liquid crystal cell 115, a viewing angle compensation film 116, a linear polarizer (front polarizer film) 117 and a λ/4 plate 118 in the stated order from the back side.

Figure 26:
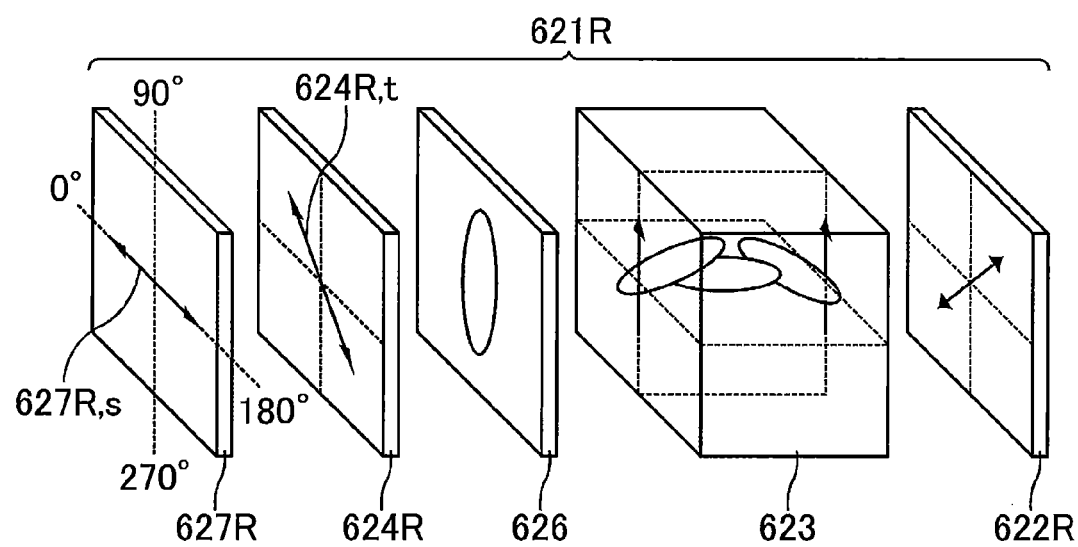
FIG. 26 is a schematic perspective view illustrating a configuration of active shutter glasses of Embodiment 2 (modification example 2)
Figure 27:
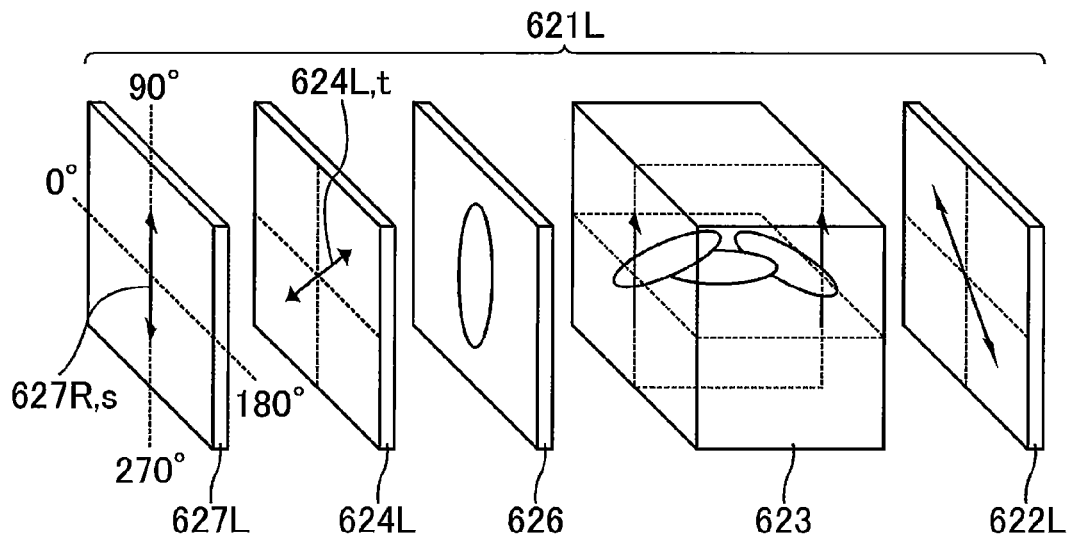
FIG. 27 is a schematic perspective view illustrating a configuration of active shutter glasses of Embodiment 2 (modification example 2)

In the present modification example, as shown in FIGS. 26 and 27, the shutter sections 621R and 621L include λ/4 plates 627R and 627L respectively. The λ/4 plates 627R and 627L are pasted to outside polarizers 624R and 624L respectively at a relative angle of approximately 45° of the axis. An optical system including a pair of circularly polarizing plates is introduced into the stereoscopic image projection system in the present modification example.

In this way, light emitted from the screen of the liquid crystal display device 111 first becomes linearly polarized light which is parallel to the transmission axis 117t of the linear polarizer 117 and is changed to circularly polarized light by the λ/4 plate 118. The circularly polarized light that impinges on the shutter section 621R is reconverted to linearly polarized light which is parallel to the transmission axis 624R,t of the outside polarizer 624R by the λ/4 plate 627R. This linearly polarized light impinges on the outside polarizer 624R. On the other hand, the circularly polarized light that impinges on the shutter section 621L is reconverted to linearly polarized light which is parallel to the transmission axis 624L,t of the outside polarizer 624L by the λ/4 plate 624L. This linearly polarized light impinges on the outside polarizer 624L. Thus, since unaxial circularly polarized light impinges on the λ/4 plates 627R and 627L, unlike a case where the λ/4 plates 118, 627R and 627L are not provided, constant screen brightness is obtained irrespective of relative azimuths of the liquid crystal display device 111 and glasses 620.

The shutter section 621R of the glasses 620 according to the present modification example includes the λ/4 plate 627R outside the outside polarizer 624R as shown in FIG. 26. On the other hand, the shutter section 621L of the glasses 620 according to the present modification example includes the λ/4 plate 627L outside the outside polarizer 624L as shown in FIG. 27.

When an angle formed between a transmission axis 624R,t of the outside polarizer 624R and an in-plane slow axis 627R,s of the λ/4 plate 627R, and an angle formed between a transmission axis 624L,t of the outside polarizer 624L and an in-plane slow axis 627L,s of the λ/4 plate 627L are both defined as φ3 and when an angle formed between the transmission axis 117t of the front polarizer film 117 and the in-plane slow axis 118s of the λ/4 plate 118 is defined as φ2, the stereoscopic image projection system of the present modification example satisfies following equations (5) and (6) or (7) and (8).

$$40° \leq \phi3 \leq 50°$$ (5)

$$40° \leq \phi2 \leq 50°$$ (6)

$$130° \leq \phi3 \leq 140°$$ (7)

$$130° \leq \phi2 \leq 140°$$ (8)

where φ3 is measured, viewed from the λ/4 plate 627R or 627L side (outside) and its counterclockwise direction is measured to be positive relative to the directions of the transmission axes 624R,t and 624L,t of the outside polarizers 624R and 624L. Similarly, φ2 is measured, viewed from the λ/4 plate 118 side (front side) and its counterclockwise direction is measured to be positive relative to the direction of the transmission axis 117t of the front polarizer film 117.

Regarding φ3, its suitable range is 42°≤φ3≤48° or 132°≤φ3≤138° and its more suitable range is 44°≤φ3≤46° or 134°≤φ3≤136. Regarding φ2, its suitable range is 42°≤φ2≤48° or 132°≤φ2≤138° and its more suitable range is 44°≤φ2≤46° or 134°≤φ2≤136°.

As described above, according to the present modification example, as in the case of modification example 1 of Embodiment 1, an always clear stereoscopic image is obtained without being accompanied by increase of power consumption. Furthermore, it is possible to easily set the viewing angle characteristics of the shutter sections 621R and 621L without being concerned about degradation of luminance as described above.

Furthermore, the display is never darkened even when the observer turns his/her head (glasses 620) and it is thereby possible to obtain an always clear stereoscopic image without being accompanied by increase of power consumption.

Furthermore, in the present embodiment and the present modification example, the shutter function is obtained by the glasses 620 themselves. Therefore, it is possible to obtain a shutter effect which is always good irrespective of a relative positional relationship between the glasses 620 and the liquid crystal display device 111.

However, the configuration except the λ/4 plate in the present modification example is substantially symmetric between the shutter sections 621R and 621L.

(Embodiment 3)

Figure 28:
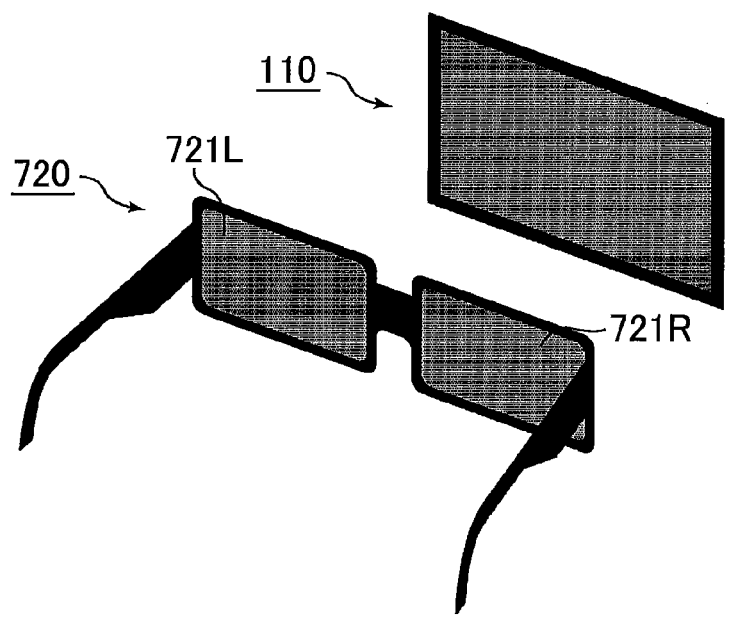
FIG. 28 is a schematic perspective view illustrating a configuration of a stereoscopic image projection system according to Embodiment 3.

An active stereoscopic image projection system according to the present embodiment is configured by including the same video display device (3D display device) 110 as that of Embodiment 1 and active shutter glasses 720 as shown in FIG. 28. The present embodiment is different from Embodiment 1 only in the configuration of the active shutter glasses, and therefore description of other parts will be omitted.

The glasses 720 include a shutter section for the right eye 721R and a shutter section for the left eye 721L. Light transmission and light-shielding (opening/closing) of the shutter sections 721R and 721L are alternately switched. As shown in FIG. 2, the switching timing is in synchronization with an R signal and an L signal.

Figure 29:
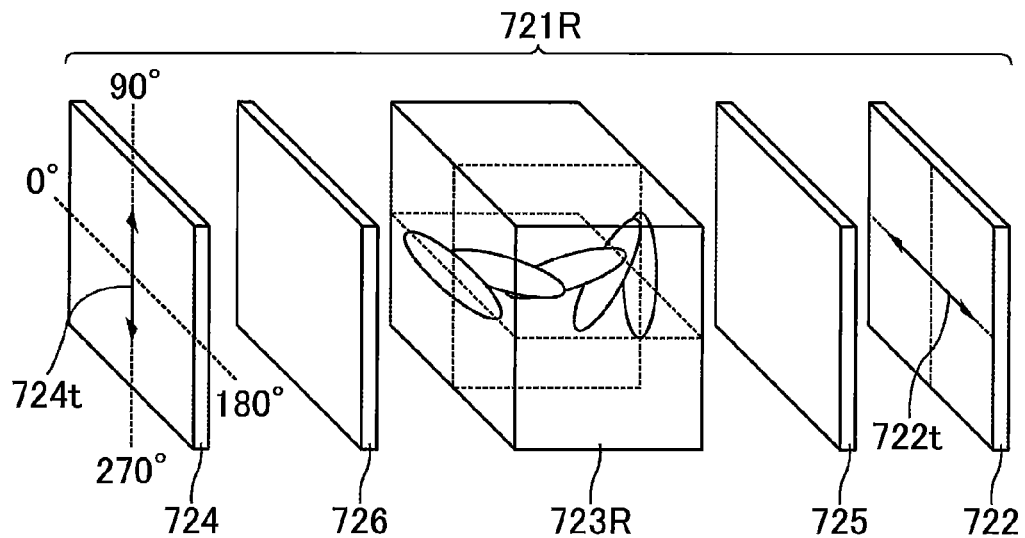
FIG. 29 is a schematic perspective view illustrating a configuration of active shutter glasses of Embodiment 3.

The shutter section 721R is provided with a linear polarizer (inside polarizer) 722, a viewing angle compensation film 725, a liquid crystal cell 723R, a viewing angle compensation film 726 and a linear polarizer (outside polarizer) 724 in the stated order from the inside as shown in FIG. 29.

Figure 30:
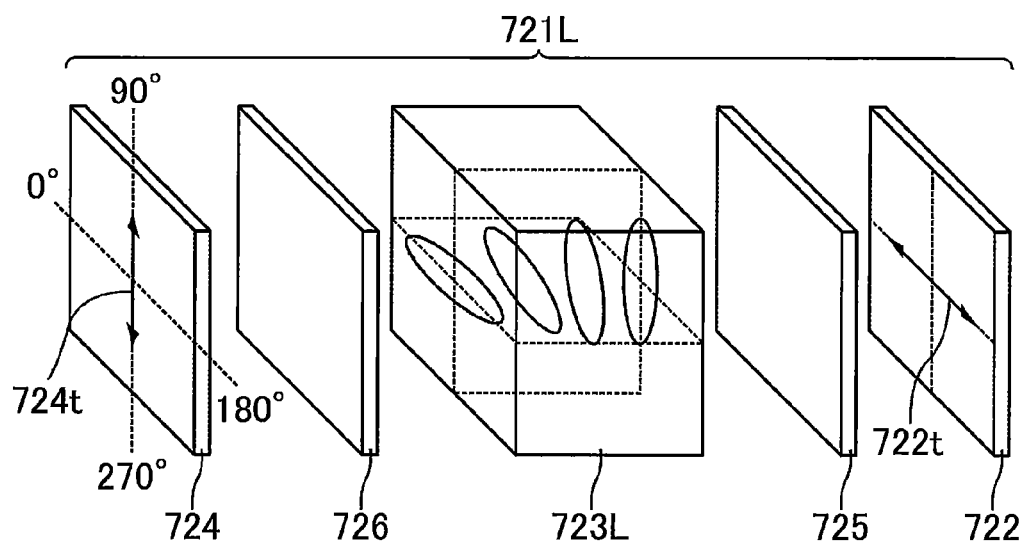
FIG. 30 is a schematic perspective view illustrating a configuration of active shutter glasses of Embodiment 3.

On the other hand, the shutter section 721L is provided with a linear polarizer (inside polarizer) 722, a viewing angle compensation film 725, a liquid crystal cell 723L, a viewing angle compensation film 726 and a linear polarizer (outside polarizer) 724 in the stated order from the inside as shown in FIG. 30.

Thus, the only difference between the shutter section 721L and the shutter section 721R lies in that they include different liquid crystal cells.

In the shutter sections 721R and 721L, the polarizers 722 and 724 may be disposed in a parallel-Nicol state with each other, but they are normally disposed in a cross-Nicol state with each other. To be more specific, the angle formed between a transmission axis 722t of the inside polarizer 722 and a transmission axis 724t of the outside polarizer 724 is set to be within a range of 90°±15° (preferably 90°±5°). The transmission axis 722t of the inside polarizer 722 is set to be within a range of ±15° (preferably ±5°) from the lateral direction, and the transmission axis 724t of the outside polarizer 724 is set to be within a range of ±15° (preferably ±5°) from the longitudinal direction. These numerical value ranges include boundary values.

The liquid crystal mode of the liquid crystal cell 723R is a TN mode and the liquid crystal cell 723R is provided with two transparent substrates, a liquid crystal layer interposed between these two substrates and two transparent electrodes formed on the two substrates respectively. The liquid crystal layer includes nematic liquid crystal molecules whose dielectric anisotropy is positive. The liquid crystal molecules are aligned in the aligning treatment direction (e.g., rubbing direction) on the substrate surface and aligned so as to be twisted by approximately 90° in a thickness direction of the liquid crystal layer. Furthermore, the liquid crystal molecules are twisted counterclockwise when viewed from the outside (along the light traveling direction). Furthermore, the aligning treatment direction of the outside substrate is substantially orthogonal to the transmission axis 724t of the outside polarizer 724 and the aligning treatment direction of the inside substrate is substantially orthogonal to the transmission axis 722t of the inside polarizer 722. To be more specific, the angle formed between the aligning treatment direction of the outside substrate and the transmission axis 724t of the outside polarizer 724 is set to be within a range of 90°±15° (preferably 90°±5°) and the angle formed between the aligning treatment direction of the inside substrate and the transmission axis 722t of the inside polarizer 722 is set to be within a range of 90°±15° (preferably 90°±5°). These numerical value ranges include boundary values.

The liquid crystal cells 723R and 723L are only different in directions in which nematic liquid crystal molecules are twisted. That is, in the liquid crystal cell 723L, nematic liquid crystal molecules are twisted clockwise when viewed from the outside (along the light traveling direction).

The liquid crystal cells 723R and 723L are not particularly limited as long as they can secure a degree of response time that can be in synchronization with the frame rate of the display device 110. In addition to the TN mode, the liquid crystal mode of the liquid crystal cells 723R and 723L may include an OCB mode, STN mode, VA mode, IPS mode or FLC mode or the like.

The viewing angle compensation films 725 and 726 have a function of compensating the viewing angle during light-shielding of the shutter sections 721R and 721L and include, for example, a negative C plate.

As described above, the shutter sections 721R and 721L have configurations substantially symmetric to each other. To be more specific, the alignment (alignment direction) of the liquid crystal layer of the liquid crystal cell 723R is substantially symmetric to the alignment (alignment direction) of the liquid crystal layer of the liquid crystal cell 723L. The center line running between the shutter sections 721R and 721L in the longitudinal direction serves as an axis of symmetry. Thus, the shutter section 721R and the shutter section 721L are the same except that elements affecting their viewing angle characteristics are set to be symmetric and arranged so as to have configurations symmetric to each other. Furthermore, liquid crystal molecules of the liquid crystal layer of the shutter section 721R are aligned symmetrically to liquid crystal molecules of the liquid crystal layer of the shutter section 721L.

Figure 31:
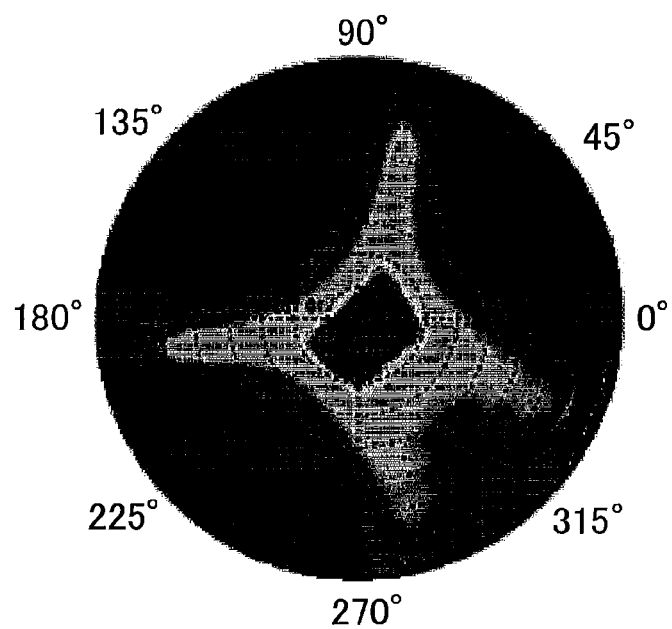
FIG. 31 is a diagram illustrating a viewing angle characteristic (CR ratio) of the active shutter glasses of Embodiment 3.
Figure 32:
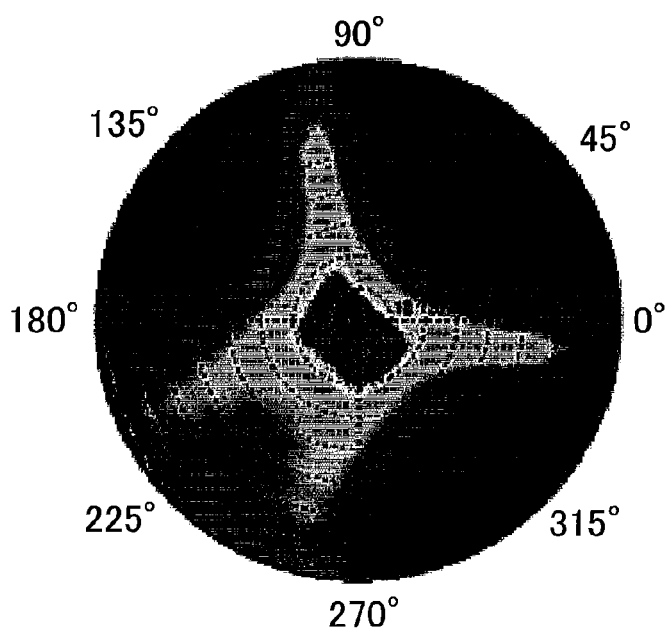
FIG. 32 is a diagram illustrating a viewing angle characteristic (CR ratio) of the active shutter glasses of Embodiment 3.

Active shutter glasses using liquid crystal generally have a viewing angle characteristic asymmetric in the vertical and horizontal directions caused by asymmetry of liquid crystal alignment. In the present embodiment, the shutter section 721R has a viewing angle characteristic (CR characteristic) asymmetric in the vertical and horizontal directions as shown, for example, in FIG. 31, and the shutter section 721L has a viewing angle characteristic (CR characteristic) asymmetric in the vertical and horizontal directions as shown, for example, in FIG. 32.

Figure 33:
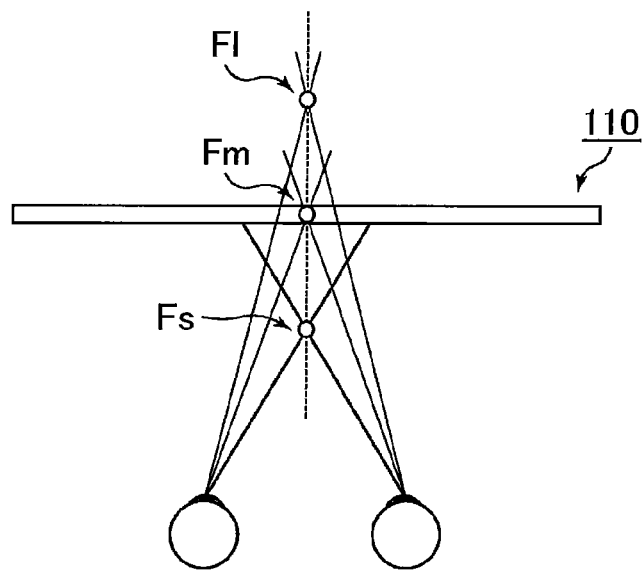
FIG. 33 is a schematic diagram illustrating a principle according to which a person views a stereoscopic image.

The observer feels a stereoscopic sense based on a difference in focal length between both eyes where images of a 3D image supplied is formed. This principle will be described using FIG. 33. An ordinary 2D image is supplied so as to be focused on a display surface Fm of the display device 110. On the other hand, a 3D image is supplied so as to be focused on Fs in front of the display surface of the display device 110, or supplied so as to be focused on Fl behind the display surface. In the former case, the observer feels as if the image were located in front of the display surface, whereas in the latter case, the observer feels as if the image were located behind the display surface. People generally watch an object in front of their faces. Therefore, people often capture the object at which to gaze symmetrically between the right eye and left eye. Therefore, in the glasses 720 arranged in front of both eyes, the viewing angle characteristic of the shutter section 721R is preferably symmetric to the viewing angle characteristic of the shutter section 721L.

Thus, in the present embodiment, the viewing angle characteristics of the glasses 720 are symmetric in the horizontal direction. That is, the viewing angle characteristic of the shutter section 721R is substantially symmetric to the viewing angle characteristic of the shutter section 721L, and is substantially the same as a characteristic obtained by inverting the viewing angle characteristic of the shutter section 721L with respect to the axis along the 90° azimuth and 270° azimuth. The center line running between the shutter sections 721R and 721L in the longitudinal direction serves as an axis of symmetry. When the glasses 720 are worn, the viewing angles of the shutter sections 721R and 721L each are wider on the right and left sides than on the upper and lower sides. Therefore, according to the present embodiment, it is possible to satisfy the viewing angle characteristics required when the observer observes a stereoscopic image from the front.

Whether or not the viewing angle characteristics of the shutter section 721R and the shutter section 721L are substantially symmetric is determined by drawing a graph (curve) similar to the graph (curve) created to determine whether or not the viewing angle characteristic of the shutter section is substantially symmetric with respect to an axis along the 90° azimuth and 270° azimuth. When the viewing angle characteristics of the shutter section 721R and the shutter section 721L are substantially symmetric, the two curves of the right half of the shutter section 721L and the left half of the shutter section 721R are symmetric in the horizontal direction at an arbitrary identical polar angle θ. Furthermore, the two curves of the left half of the shutter section 721L and the right half of the shutter section 721R are symmetric in the horizontal direction at an arbitrary identical polar angle θ. The "symmetric in the horizontal direction" is determined by the magnitude of maximum value (or minimum value) of the curve, the number thereof, position [azimuth φ'] or the like. When there are maximum (minimum) points of both curves having substantially the same magnitude within a range of ±15° of the absolute value of an arbitrary [azimuth φ'] at a plurality of polar angles θ, the two curves are determined to be symmetric in the horizontal direction. That is, even when the viewing angle characteristics of the shutter section 721R and the shutter section 721L are substantially symmetric, both curves need not be exactly symmetric.

From such a standpoint, the viewing angle characteristics of the shutter section 721R and the shutter section 721L preferably satisfy the following conditions, for example.

Figure 39:
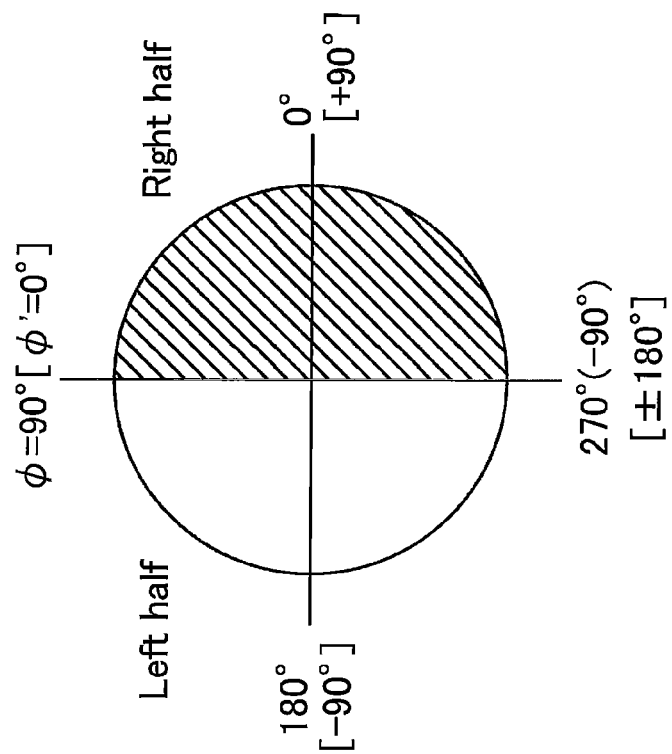
FIG. 39 is a diagram illustrating the azimuths φ and φ' in the right and left shutter sections of the active shutter glasses.
Figure 39:
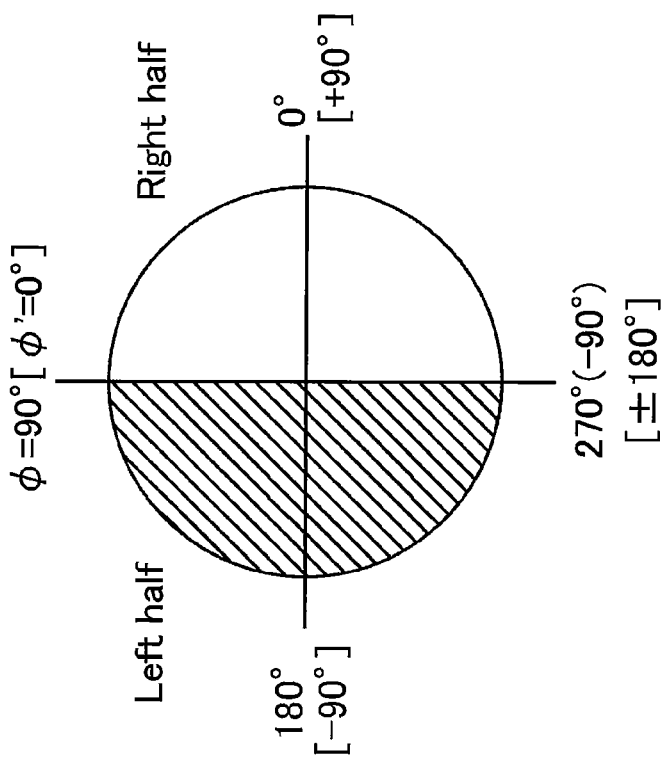

First, CR ratios of the shutter sections 721R and 721L are measured at 12 or more azimuths (these azimuths are arranged uniformly among all azimuths) and at a plurality of predetermined polar angles. Next, a graph for expressing curves of the CR ratios of the shutter sections with respect to the azimuths is created from the measurement result. A comparison is made between maximum (or minimum) points on the curves at the respective polar angles where the magnitudes of the CR ratios are nearly equal in the right half of the shutter section for the right eye 721R (range of azimuth φ' from 0° to +180° clockwise) and the left half of the shutter section for the left eye 721L (range of azimuth φ' from 0° to −180° counterclockwise) as shown in FIG. 39, and as a result, the difference in |φ'| (absolute value of azimuth φ') between both maximum (or minimum) points is preferably 30° or below. Furthermore, a comparison is made between maximum (or minimum) points on the curves at the respective polar angles where the magnitudes of the CR ratios are nearly equal in the right half of the shutter section for the right eye 721L and the left half of the shutter section for the left eye 721R, and as a result, the difference in |φ'| (absolute value of azimuth φ') between both maximum (or minimum) points is preferably 30° or below.

The viewing angle characteristic measured is not particularly limited to the CR ratio.

Furthermore, the above-described 12 or more azimuths are preferably 24 or more azimuths.

The above-described plurality of predetermined polar angles are not particularly limited, but are determined within a range greater than 0° and smaller than 90° and preferably determined within a range from 5° to 45° (more preferably 15° to 30°). Furthermore, the number of the plurality of predetermined polar angles is not particularly limited, and is normally 2 or above and 5 or below, and preferably 3 or above and 4 or below.

Furthermore, in the above-described comparison, the difference in CR ratios between the two maximum (or minimum) points where the magnitudes of CR ratios are nearly equal is preferably 100 or below and more preferably 50 or below. Furthermore, both of the CR ratios are preferably within a range of ±10% (more preferably ±5%) of an arbitrary CR ratio (e.g., average value of both of the CR ratios).

Furthermore, when there are a plurality of maximum (or minimum) points to be compared, at least one set of maximum (or minimum) points need to satisfy the aforementioned conditions and all maximum (or minimum) points to be compared need not satisfy the aforementioned conditions.

Examples of the viewing angle characteristics that can be evaluated in the present embodiment include the following angle characteristics as in the case of Embodiments 1 and 2.

Light leakage when shutter section is in light-shielded state
  Chromatic change when shutter section is in light transmission state
  Transmissivity characteristic when shutter section is in light transmission state
  CR ratios in light transmission and light-shielded states of shutter section
  Chromatic change while shutter section is being actually driven
  Transmissivity while shutter section is being actually driven
  Amount of crosstalk while shutter section is being actually driven As in the case of Embodiment 1, specific examples of chromatic changes include a color difference such as $\Delta u' v'$, $\Delta C^*ab$.

Furthermore, when evaluating a system for viewing a stereoscopic image by displaying images for the right eye and the left eye on a time-division basis in particular, it is preferable to evaluate its viewing angle characteristic with the active shutter glasses being actually driven.

Furthermore, when using the liquid crystal display device 111 described above in Embodiment 1 as the display device 110, it is preferable to adopt following modification example 3 from the standpoint similar to that in Embodiment 1.

As shown in FIG. 9, the liquid crystal display device 111 is provided with a backlight 112, a linear polarizer (back polarizer film) 113, a viewing angle compensation film 114, a liquid crystal cell 115, a viewing angle compensation film 116, a linear polarizer (front polarizer film) 117 and a λ/4 plate 118 in the stated order from the back side.

Figure 34:
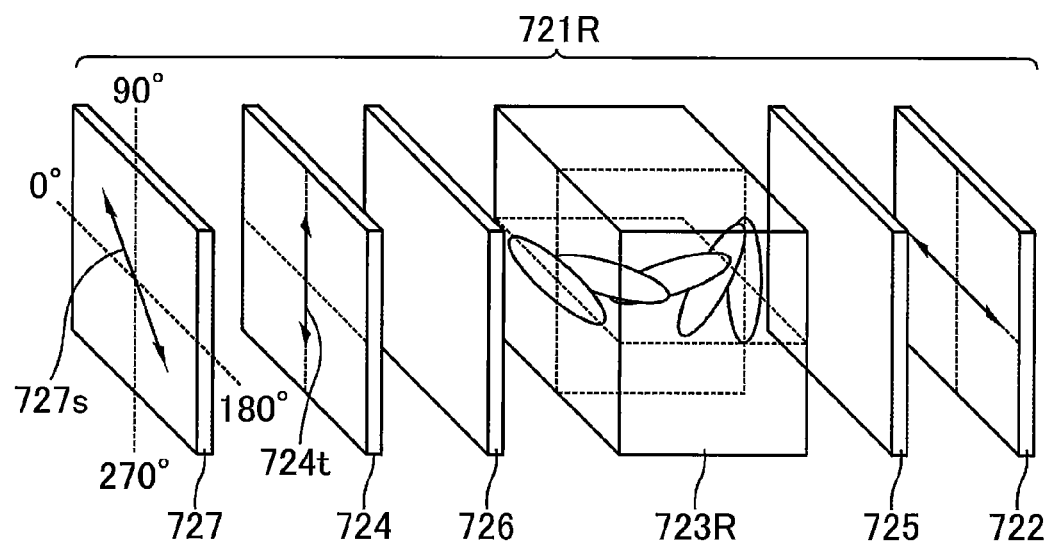
FIG. 34 is a schematic perspective view illustrating a configuration of active shutter glasses of Embodiment 3 (modification example 3)
Figure 35:
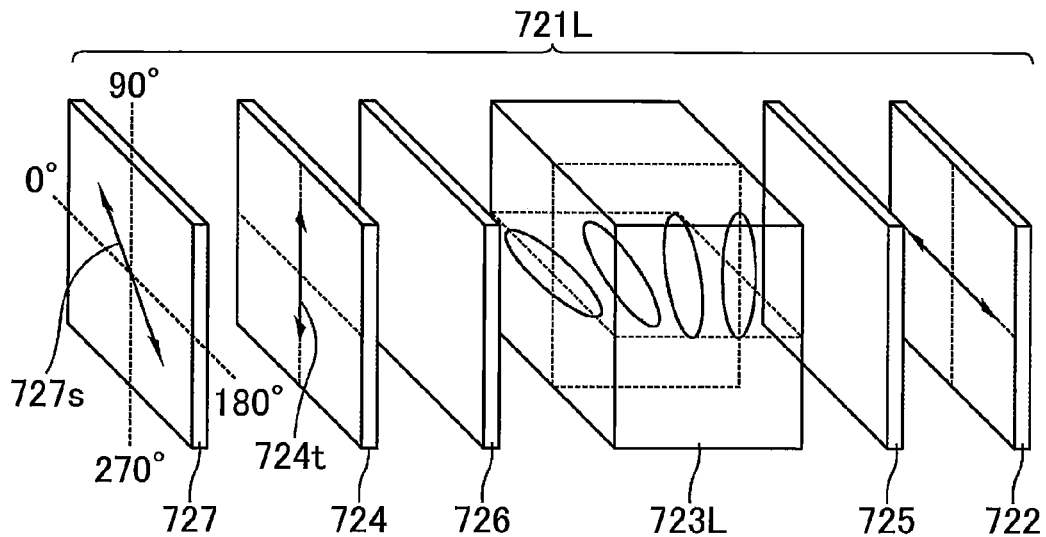
FIG. 35 is a schematic perspective view illustrating a configuration of active shutter glasses of Embodiment 3 (modification example 3)

In the present modification example, the shutter sections 721R and 721L each include a λ/4 plate 727 as shown in FIGS. 34 and 35. The λ/4 plate 727 is pasted to the outside polarizer 724 at a relative angle of approximately 45° of the axis. An optical system including a pair of circularly polarizing plates is introduced into the stereoscopic image projection system of the present modification example.

Thus, light emitted from the screen of the liquid crystal display device 111 first becomes linearly polarized light which is parallel to a transmission axis 117t of linear polarizer 117 and is changed to circularly polarized light by the λ/4 plate 118. The circularly polarized light that impinges on the shutter sections 721R and 721L is reconverted to linearly polarized light which is parallel to a transmission axis 124t of the outside polarizer 724 by the λ/4 plate 727. This linearly polarized light impinges on the outside polarizer 724. Since unaxial circularly polarized light impinges on the λ/4 plate 727, unlike a case where the λ/4 plates 118 and 727 are not provided, constant screen brightness is obtained irrespective of the relative azimuths of the liquid crystal display device 111 and glasses 720.

The shutter sections 721R and 721L of the glasses 720 according to the present modification example each include the λ/4 plate 727 outside the outside polarizer 724 as shown in FIGS. 34 and 35.

When the angle formed between the transmission axis 724t of the outside polarizer 724 and the in-plane slow axis 727s of the λ/4 plate 727 is defined as φ4 and the angle formed between the transmission axis 117t of the front polarizer film 117 and the in-plane slow axis 118s of the λ/4 plate 118 is defined as φ2, the stereoscopic image projection system of the present modification example satisfies following equations (9) and (10) or (11) and (12).

$$40° \leq \phi 4 \leq 50° \tag{9}$$

$$40° \leq \phi 2 \leq 50° \tag{10}$$

$$130° \leq \phi 4 \leq 140° \tag{11}$$

$$130° \leq \phi 2 \leq 140° \tag{12}$$

where φ4 is measured, viewed from the λ/4 plate 727 side (outside) and its value in a counterclockwise direction is measured to be positive relative to the direction of the transmission axis 724*t* of the outside polarizer 724. Similarly, φ2 is measured, viewed from the λ/4 plate 118 side (front side) and its value in a counterclockwise direction is measured to be positive relative to the direction of the transmission axis 117*t* of the front polarizer film 117.

A suitable range of φ4 is 42°≤φ4≤48° or 132°≤φ4≤138° and a more suitable range is 44°≤φ4≤46° or 134°≤φ4≤136°. A suitable range of φ2 is 42°≤φ2≤48° or 132°≤φ2≤138° and a more suitable range is 44°≤φ2≤46° or 134°≤φ2≤136°.

As described above, as in the case of modification example 1 of Embodiment 1, the present modification example can obtain an always clear stereoscopic image without being accompanied by increase of power consumption. The present modification example can also easily set the viewing angle characteristics of the shutter sections 721R and 721L without being concerned about degradation of luminance as described above.

Furthermore, the display is never darkened even when the observer turns his/her head (glasses 720), and it is thereby possible to obtain an always clear stereoscopic image without being accompanied by increase of power consumption.

Furthermore, in the present embodiment and the present modification example, the shutter function is obtained by the glasses 720 themselves. Therefore, it is possible to obtain a shutter effect which is always good irrespective of a relative positional relationship between the glasses 720 and the liquid crystal display device 111.

However, in the present modification example, the configurations except the λ/4 plate of the shutter sections 721R and 721L are substantially symmetric to each other.

Hereinafter, components of Embodiments 1 to 3 will be described in detail.

A typical example of the linear polarizer is one in which an anisotropic material such as iodine complex having dichroic dye is adsorbed and aligned in a polyvinyl alcohol (PVA) film. The linear polarizer is actually put to practical use with a protective film such as a triacetyl cellulose (TAC) film normally laminated on both sides of the PVA film to secure mechanical strength and resistance to moist heat.

The material of the birefringent layer of the λ/4 plate or the like is not particularly limited, and for example, a stretched polymer film may be used. Examples of the polymer include polycarbonate, polysulfone, polyether sulfone, polyethylene terephthalate, polyethylene, polyvinyl alcohol, norbornene, triacetyl cellulose, diacetyl cellulose.

The method for forming a λ/4 plate is not particularly limited, but the λ/4 plate is stacked with the linear polarizer so that the slow axis forms a predetermined angle with the transmission axis of the linear polarizer. Therefore, the λ/4 plate is preferably formed using a diagonal stretching method for causing stretch alignment to be performed in a direction diagonal to the direction in which a roll film flows.

The λ/4 plate is preferably adjacent to the linear polarizer. That is, a birefringent layer is preferably not provided between the λ/4 plate and the linear polarizer. This makes it possible to easily convert the polarized state of linearly polarized light to a desired state. However, in this case, an isotropic film may be arranged between the λ/4 plate and the linear polarizer. Furthermore, even when a birefringent layer is provided between the λ/4 plate and the linear polarizer, by setting the slow axis of the birefringent layer in a direction substantially parallel or substantially orthogonal to the transmission axis of the linear polarizer, it is possible to substantially invalidate the polarized conversion function of the birefringent layer and thereby obtain an effect similar to a case as if no birefringent layer were provided between the λ/4 plate and the linear polarizer.

The "birefringent layer" refers to a layer having optical anisotropy and the birefringent layer means such a layer in which any one of the absolute value of the in-plane phase difference R and the absolute value of the thickness direction phase difference Rth has a value of 10 nm or above and preferably has a value of 20 nm or above.

Furthermore, the "isotropic film" refers to one in which both the absolute value of the in-plane phase difference R and the absolute value of the thickness direction phase difference Rth have a value of 10 nm or below and preferably have a value of 5 nm or below.

The present application claims priority to Patent Application No. 2010-90703 filed in Japan on Apr. 9, 2010 under the Paris convention and provisions of national law in a designated State, the entire contents of which are hereby incorporated by reference.

REFERENCE SIGNS LIST

110: Video display device
111: Liquid crystal display device
112: Backlight
113, 117, 122, 124, 142, 222, 224, 622R, 622L, 624R, 624L, 722, 724: Linear polarizer
114, 116, 125, 126, 225, 226, 626, 725, 726: Viewing angle compensation film
115, 123, 223, 623, 723R, 723L: Liquid crystal cell
118, 127, 627R, 627L, 727: λ/4 plate
119, 619, 719: Screen
120, 220, 620, 720: Active shutter glasses
121, 621R, 621L, 721R, 721L: Shutter section
140: Polarized sunglasses
141: Light transmission section
628: Connecting part

The invention claimed is:

1. Active shutter glasses for a stereoscopic image projection system, the active shutter glasses comprising:
   a shutter section for the right eye and a shutter section for the left eye;
   the shutter section for the right eye and the shutter section for the left eye each comprising a liquid crystal cell;
   wherein when the glasses are worn, viewing angles of the shutter section for the right eye and the shutter section for the left eye each are wider on right and left sides than on an upper and a lower side;
   wherein when light leakage of the shutter section for the right eye and the shutter section for the left eye in a light-shielded state is measured at a predetermined polar angle, the amount of light leakage at a 0° azimuth and a 180° azimuth is smaller than an average amount of light leakage at four or more azimuths, and the four or more azimuths are arranged uniformly among all azimuths.

2. The active shutter glasses according to claim 1, wherein viewing angle characteristics of the shutter section for the right eye and the shutter section for the left eye each are substantially symmetric with respect to an axis along a 90° azimuth and 270° azimuth.

3. The active shutter glasses according to claim 1, wherein when the glasses are worn, the viewing angles of the shutter section for the right eye and the shutter section for the left eye each are wider on the lower side than the upper side.

4. The active shutter glasses according to claim 3, wherein when the glasses are worn, the viewing angles of the shutter section for the right eye and the shutter section for the left eye each are wider at the 270° azimuth than at the 90° azimuth.

5. The active shutter glasses according to claim 1, wherein the shutter section for the right eye and the shutter section for the left eye each comprise a λ/4 plate, and the λ/4 plate is provided outside the liquid crystal cell.

6. The active shutter glasses according to claim 1, wherein the amount of light leakage at the 270° azimuth is smaller than the amount of light leakage at the 90° azimuth.

7. The active shutter glasses according to claim 1, wherein when light leakage of the shutter section for the right eye and the shutter section for the left eye in a light-shielded state is measured at eight or more azimuths and at a predetermined polar angle, an average amount of light leakage at a −45° to 45° azimuth and/or 135° to 225° azimuth is smaller than an average amount of light leakage at a 45° to 135° azimuth and 225° to 315° azimuth, and the eight or more azimuths are arranged uniformly among all azimuths.

8. The active shutter glasses according to claim 7, wherein the average amount of light leakage at the 225° to 315° azimuth is smaller than the average amount of light leakage at the 45° to 135° azimuth.

9. Active shutter glasses for a stereoscopic image projection system, the active shutter glasses comprising:
   a shutter section for the right eye and a shutter section for the left eye;
   the shutter section for the right eye and the shutter section for the left eye each comprising a liquid crystal cell;
   wherein when the glasses are worn, viewing angles of the shutter section for the right eye and the shutter section for the left eye each are wider on right and left sides than on an upper and a lower side;
   wherein when a contrast ratio of the shutter section for the right eye and the shutter section for the left eye is measured at a predetermined polar angle, the contrast ratio at the 0° azimuth and 180° azimuth is higher than the average of contrast ratios at four or more azimuths, and the four or more azimuths are arranged uniformly among all azimuths.

10. The active shutter glasses according to claim 9, wherein viewing angle characteristics of the shutter section for the right eye and the shutter section for the left eye each are substantially symmetric with respect to an axis along a 90° azimuth and 270° azimuth.

11. The active shutter glasses according to claim 9, wherein when the glasses are worn, the viewing angles of the shutter section for the right eye and the shutter section for the left eye each are wider on the lower side than the upper side.

12. The active shutter glasses according to claim 11, wherein when the glasses are worn, the viewing angles of the shutter section for the right eye and the shutter section for the left eye each are wider at the 270° azimuth than at the 90° azimuth.

13. The active shutter glasses according to claim 9, wherein the shutter section for the right eye and the shutter section for the left eye each comprise a λ/4 plate, and the λ/4 plate is provided outside the liquid crystal cell.

14. The active shutter glasses according to claim 9, wherein when light leakage of the shutter section for the right eye and the shutter section for the left eye in a light-shielded state is measured at a predetermined polar angle, the amount of light leakage at a 0° azimuth and a 180° azimuth is smaller than an average amount of light leakage at four or more azimuths, and the four or more azimuths are arranged uniformly among all azimuths.

15. The active shutter glasses according to claim 9, wherein the amount of light leakage at the 270° azimuth is smaller than the amount of light leakage at the 90° azimuth.

16. The active shutter glasses according to claim 9, wherein when light leakage of the shutter section for the right eye and the shutter section for the left eye in a light-shielded state is measured at eight or more azimuths and at a predetermined polar angle, an average amount of light leakage at a −45° to 45° azimuth and/or 135° to 225° azimuth is smaller than an average amount of light leakage at a 45° to 135° azimuth and 225° to 315° azimuth, and the eight or more azimuths are arranged uniformly among all azimuths.

17. The active shutter glasses according to claim 9, wherein the average amount of light leakage at the 225° to 315° azimuth is smaller than the average amount of light leakage at the 45° to 135° azimuth.

18. Active shutter glasses for a stereoscopic image projection system, the active shutter glasses comprising:
   a shutter section for the right eye and a shutter section for the left eye;
   the shutter section for the eye and the shutter section for the left eye each comprising a liquid crystal cell;
   wherein when the glasses are worn, viewing angles of the shutter section for the right eye and the shutter section for the left eye each are wider on right and left sides than on an upper and lower side;
   wherein when a chromatic change is measured, with the shutter section for the right eye and the shutter section for the left eye being driven at a predetermined polar angle, a chromatic change at the 0° azimuth and 180° azimuth is smaller than an average of chromatic changes at four or more azimuths, and the four or more azimuths are arranged uniformly among all azimuths.

19. The active shutter glasses according to claim 18, wherein viewing angle characteristics of the shutter section for the right eye and the shutter section for the left eye each are substantially symmetric with respect to an axis along a 90° azimuth and 270° azimuth.

20. The active shutter glasses according to claim 18, wherein when the glasses are worn, the viewing angles of the shutter section for the right eye and the shutter section for the left eye each are wider on the lower side than the upper side.

21. The active shutter glasses according to claim 20, wherein when the glasses are worn, the viewing angles of the shutter section for the right eye and the shutter section for the left eye each are wider at the 270° azimuth than at the 90° azimuth.

22. The active shutter glasses according to claim 18, wherein the shutter section for the right eye and the shutter section for the left eye each comprise a λ/4 plate, and the λ/4 plate is provided outside the liquid crystal cell.

23. The active shutter glasses according to claim 18, wherein when light leakage of the shutter section for the right eye and the shutter section for the left eye in a light-shielded state is measured at a predetermined polar angle, the amount of light leakage at a 0° azimuth and a 180° azimuth is smaller than an average amount of light leakage at four or more azimuths, and the four or more azimuths are arranged uniformly among all azimuths.

24. The active shutter glasses according to claim 18, wherein the amount of light leakage at the 270° azimuth is smaller than the amount of light leakage at the 90° azimuth.

25. The active shutter glasses according to claim 18, wherein when light leakage of the shutter section for the right eye and the shutter section for the left eye in a light-shielded state is measured at eight or more azimuths and at a predetermined polar angle, an average amount of light leakage at a −45° to 45° azimuth and/or 135° to 225° azimuth is smaller than an average amount of light leakage at a 45° to 135° azimuth and 225° to 315° azimuth, and the eight or more azimuths are arranged uniformly among all azimuths.

26. The active shutter glasses according to claim 18, wherein the average amount of light leakage at the 225° to 315° azimuth is smaller than the average amount of light leakage at the 45° to 135° azimuth.

* * * * *